(12) United States Patent
Katayama et al.

(10) Patent No.: US 10,891,706 B2
(45) Date of Patent: Jan. 12, 2021

(54) ARITHMETIC DEVICE AND SENSOR TO TRACK MOVEMENT OF OBJECT BETWEEN FRAMES

(71) Applicants: SONY CORPORATION, Tokyo (JP); THE UNIVERSITY OF TOKYO, Tokyo (JP)

(72) Inventors: Hironobu Katayama, Tokyo (JP); Shuji Uehara, Tokyo (JP); Yoshinori Muramatsu, Tokyo (JP); Tomohiro Yamazaki, Tokyo (JP); Yoshihiro Watanabe, Tokyo (JP); Masatoshi Ishikawa, Tokyo (JP)

(73) Assignees: SONY CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 11 days.

(21) Appl. No.: 16/325,537

(22) PCT Filed: Aug. 23, 2017

(86) PCT No.: PCT/JP2017/030005
§ 371 (c)(1),
(2) Date: Feb. 14, 2019

(87) PCT Pub. No.: WO2018/047616
PCT Pub. Date: Mar. 15, 2018

(65) Prior Publication Data
US 2019/0206022 A1 Jul. 4, 2019

(30) Foreign Application Priority Data
Sep. 8, 2016 (JP) .................................. 2016-175655

(51) Int. Cl.
*G06T 1/60* (2006.01)
*G06T 7/20* (2017.01)
(Continued)

(52) U.S. Cl.
CPC .................. *G06T 1/20* (2013.01); *G06T 1/60* (2013.01); *G06T 7/20* (2013.01); *G09G 5/393* (2013.01); *G09G 2340/125* (2013.01)

(58) Field of Classification Search
None
See application file for complete search history.

(56) References Cited

U.S. PATENT DOCUMENTS 5,386,241 A * 1/1995 Park .......................... H04N 5/45
348/565
5,812,787 A * 9/1998 Astle ..................... H04N 19/503
348/586

(Continued)

FOREIGN PATENT DOCUMENTS

JP   H10145680 A   5/1998
JP   H11112873 A   4/1999
(Continued)

*Primary Examiner* — Joni Hsu
(74) *Attorney, Agent, or Firm* — Chip Law Group

(57) ABSTRACT

The present disclosure relates to an arithmetic device that reduces a scale of an arithmetic processing unit which performs an arithmetic process between frames in a sensor. A frame memory stores pixel data of a frame that transitions in time sequence. An inter-frame arithmetic processing unit implements a predetermined arithmetic by column parallel in a row unit on the pixel data of a current frame and the pixel data of a past frame stored in the frame memory and updates the pixel data of the past frame stored in the frame memory on the basis of a result of the predetermined arithmetic.

10 Claims, 44 Drawing Sheets

(51) Int. Cl.
*G09G 5/393* (2006.01)
*G06T 1/20* (2006.01)

(56) References Cited

U.S. PATENT DOCUMENTS

| | | | | |
|---|---|---|---|---|
| 2005/0058349 A1* | 3/2005 | Wolf | ............... | G06K 9/56 |
| | | | | 382/209 |
| 2010/0177105 A1* | 7/2010 | Nystad | ............... | G06T 11/40 |
| | | | | 345/522 |
| 2010/0315547 A1* | 12/2010 | Takada | ............... | H04N 19/51 |
| | | | | 348/416.1 |
| 2016/0086565 A1* | 3/2016 | Ryu | ............... | G06F 3/0416 |
| | | | | 345/211 |

FOREIGN PATENT DOCUMENTS

| | | | |
|---|---|---|---|
| JP | 2002218452 A | | 8/2002 |
| JP | 2003218338 A | | 7/2003 |
| JP | 2004157879 A | | 6/2004 |
| JP | 2004362462 A | | 12/2004 |
| JP | 2005209155 A | | 8/2005 |

\* cited by examiner

FIG. 3

<FIRST FRAME>

(SHIFT RIGHTWARD BY ONE PIXEL)

<SECOND FRAME>

(SHIFT DOWNWARD BY ONE PIXEL)

<THIRD FRAME>

FIG. 24
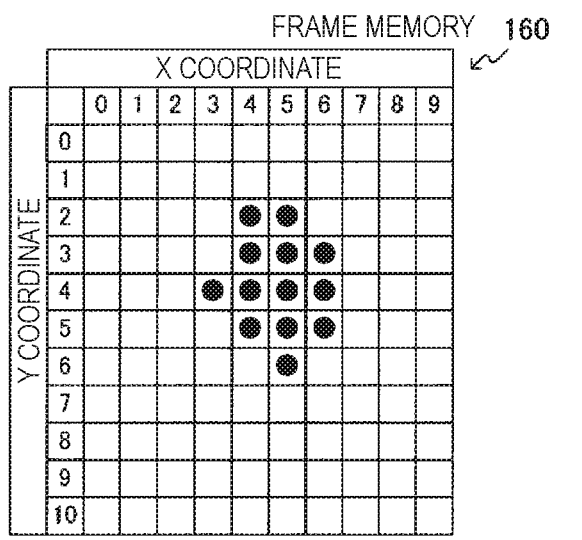
(VERTICAL INVERSION)
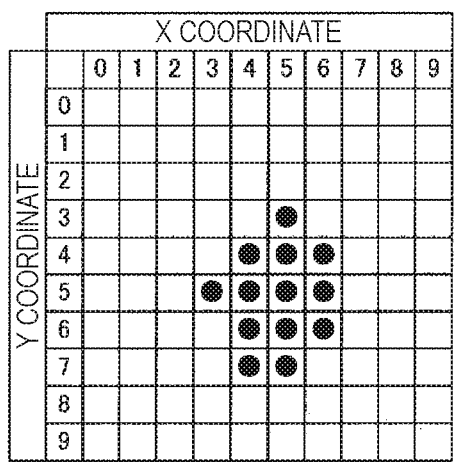

FIG. 25

ARITHMETIC DEVICE AND SENSOR TO TRACK MOVEMENT OF OBJECT BETWEEN FRAMES

CROSS REFERENCE TO RELATED APPLICATIONS

This application is a U.S. National Phase of International Patent Application No. PCT/JP2017/030005 filed on Aug. 23, 2017, which claims priority benefit of Japanese Patent Application No. JP 2016-175655 filed in the Japan Patent Office on Sep. 8, 2016. Each of the above-referenced applications is hereby incorporated herein by reference in its entirety.

TECHNICAL FIELD

The present technology relates to an arithmetic device and a sensor that handle pixel data of a frame that transits in time sequence, and more particularly to an arithmetic device and a sensor that tracks movement of an object between frames.

BACKGROUND ART

A high speed vision sensor realizes a sensing arithmetic by directly referring to accumulated data of a pixel by a circuit being provided which realizes a detection (sensing) function such as a tracking function for tracking an object in a sensor. Therefore, it is possible to output an arithmetic result with less latency. Since it has been possible to promptly output sensing information with change in an image, in recent years, this low latency operation has been an important factor in realizing functions such as danger avoidance in automatic driving of a vehicle, a user interface (UI), or photographing at a definite moment.

In addition, recent imaging sensors have progressed toward higher frame rates (high FPS) and higher resolution, but they also put pressure on the transfer band of an interface output of the sensor. Furthermore, in a case in which signal processing at a subsequent stage that operates in response thereto is also included, this becomes a factor in a system becoming enlarged and power consumption increasing. On the other hand, it is possible to adopt a sensor configuration that outputs only sensing information by directly realizing the sensing function in the sensor, and it is possible to realize the sensing function without transmitting image data. In addition, even though there has been progression to high FPS and higher resolution in order to improve the sensing performance, for example, it is sufficient if an image is transmitted only when the image is necessary for image display, and other images may be used only for sensing calculation. Thereby, it is possible to greatly reduce the load on the interface. That is, it is possible to suppress enlargement or a load on the system by providing the sensing function in the sensor, which can lead to reduction of power consumption.

On the other hand, in a vision sensor used in a related high-speed vision system, arithmetic units that realize a function such as tracking may be disposed in one-to-one correspondence with respective pixels. Alternatively, a frame memory that accumulates a result of analog-to-digital conversion of pixel data may be provided, and arithmetic units are disposed one by one with respect to the frame memory (for example, refer to Patent Literature 1 to 3).

CITATION LIST

Patent Literature

Patent Literature 1: JP 2004-362462A
Patent Literature 2: JP 2003-218338A
Patent Literature 3: JP H10-145680A

DISCLOSURE OF INVENTION

Technical Problem

In the above-described related technique, by providing the sensing function in the sensor, it is sufficient if the image is transmitted only when the image is necessary for the image display, it is possible to suppress enlargement or load on the system, which can also lead to reduction of power consumption. However, in the related art, since the arithmetic units are disposed one by one with respect to each pixel, there is a concern that function realization arithmetic units corresponding to the number of pixels may be required, a circuit scale increases as the number of pixels increases, and improvement of sensing performance is hindered due to the increase of the number of the pixels and the higher resolution.

The present technology has been developed in view of such a situation, and an object of the present technology is to reduce a scale of an arithmetic processing unit which performs an arithmetic process between frames in a sensor.

Solution to Problem

The present technology has been devised to solve the problem described above, and a first aspect thereof is an arithmetic device including: a frame memory that stores pixel data of a frame that transitions in time sequence; and an inter-frame arithmetic processing unit that implements a predetermined arithmetic by column parallel in a row unit on the pixel data of a current frame and the pixel data of a past frame stored in the frame memory and updates the pixel data of the past frame stored in the frame memory on the basis of a result of the predetermined arithmetic. Therefore, there is an effect of realizing the arithmetic between the current frame and the past frame by the arithmetic of column parallel of the row unit.

In addition, according to this first aspect, the pixel data may be binary data indicating any of presence or absence of an object. The predetermined arithmetic may be a tracking arithmetic for tracking the object. Therefore, there is an effect of tracking the object in the frame by the arithmetic of column parallel.

In addition, according to this first aspect, the inter-frame arithmetic processing unit may update the pixel data of the current frame to the frame memory as the pixel data of the past frame in an area where an extension process is implemented on the pixel data of the past frame. Therefore, there is an effect of updating the frame memory by implementing the extension process by the arithmetic of column parallel.

In addition, according to this first aspect, the inter-frame arithmetic processing unit may include, for each of the pixel data of the row unit, an OR circuit that generates an area extended to a periphery of an area where the pixel data of the past frame indicates presence of the object, and an AND circuit that generates a logical product of the extended area and the pixel data of the current frame as new pixel data of the past frame. Therefore, there is an effect of performing the extension process and the extraction process in a self-window method by the OR circuit and the AND circuit.

In addition, according to this first aspect, the OR circuit may refer to the pixel data of an adjacent row in order to generate the extended area. Therefore, there is an effect of realizing the extension process by the arithmetic of column parallel.

In addition, according to this first aspect, the OR circuit may simultaneously refer to p pixel data of a past frame stored in the frame memory in order to generate the extended area for an area of p pixels×p pixels (p is an odd number equal to or greater than 3) in the frame. Therefore, there is an effect of generating the extended area of the area of the p pixels×p pixels with reference to the p pixel data.

In addition, according to this first aspect, the OR circuit may simultaneously refer to q (q is an odd number less than p) pixel data of a past frame stored in the frame memory in order to generate the extended area for an area of p pixels×p pixels (p is an odd number equal to or greater than 3) in the frame. Therefore, there is an effect of generating the extended area of the area of the p pixels×p pixels with reference to the q pixel data.

In addition, according to this first aspect, the inter-frame arithmetic processing unit may further include a selector that selects necessary pixel data among the pixel data of the row unit. The OR circuit may generate an area extended to a periphery of an area where the pixel data selected by the selector indicates the presence of the object. Therefore, there is an effect of performing the extension process in a self-window method by the OR circuit. In this case, the selector may bilaterally-symmetrically determine the presence or absence of the selection when selecting the necessary pixel data. In addition, the selector may bilaterally-asymmetrically determine the presence or absence of the selection when selecting the necessary pixel data.

In addition, a second aspect of the present technology is a sensor including: a pixel array unit that captures an image and generates pixel data of a frame that transits in time sequence; a frame memory that stores the pixel data of the frame; and an inter-frame arithmetic processing unit that implements a predetermined arithmetic by column parallel in a row unit on the pixel data of a current frame and the pixel data of a past frame stored in the frame memory in the frame and updates the pixel data of the past frame stored in the frame memory on the basis of a result of the predetermined arithmetic. Therefore, there is an effect of realizing the arithmetic between the imaged current frame and the past frame by the arithmetic of column parallel of the row unit.

Advantageous Effects of Invention

According to the present technology, it is possible to achieve an excellent effect that it is possible to reduce the scale of the arithmetic processing unit that performs an arithmetic process between the frames in the sensor. Note that the effects described herein are not necessarily limitative and may refer to any one of the effects described in this specification.

BRIEF DESCRIPTION OF DRAWINGS

FIG. 3 is a diagram illustrating an example of transition of pixel data assumed in the vision sensor 100 according to the embodiment of the present technology.

FIG. 24 is a diagram illustrating an example of a content of a frame memory 160 after the process of the ninth row of the third frame according to the embodiment of the present technology.

FIG. 25 is a diagram illustrating an example of a Bayer array of pixels in a pixel array unit 110 according to the embodiment of the present technology.

MODE(S) FOR CARRYING OUT THE INVENTION

Hereinafter, an embodiment for implementing the present technology (hereinafter, referred to as an embodiment) will be described. The description will be given in the following sequence.
1. Overall configuration (vision sensor)
2. Operation example (example of performing object tracking by column parallel arithmetic)
3. First embodiment (example in which three column parallel arithmetic is performed for 3×3 pixel area)
4. Second embodiment (example in which five column parallel arithmetic is performed for 5×5 pixel area)
5. Third embodiment (example in which three column parallel arithmetic is performed for 5×5 pixel area)
6. Fourth embodiment (other examples in which three column parallel arithmetic is performed for 5×5 pixel area)
7. Application example (example of application to moving body control system)

1. Overall Configuration

[Configuration of Vision Sensor]

Figure 1:
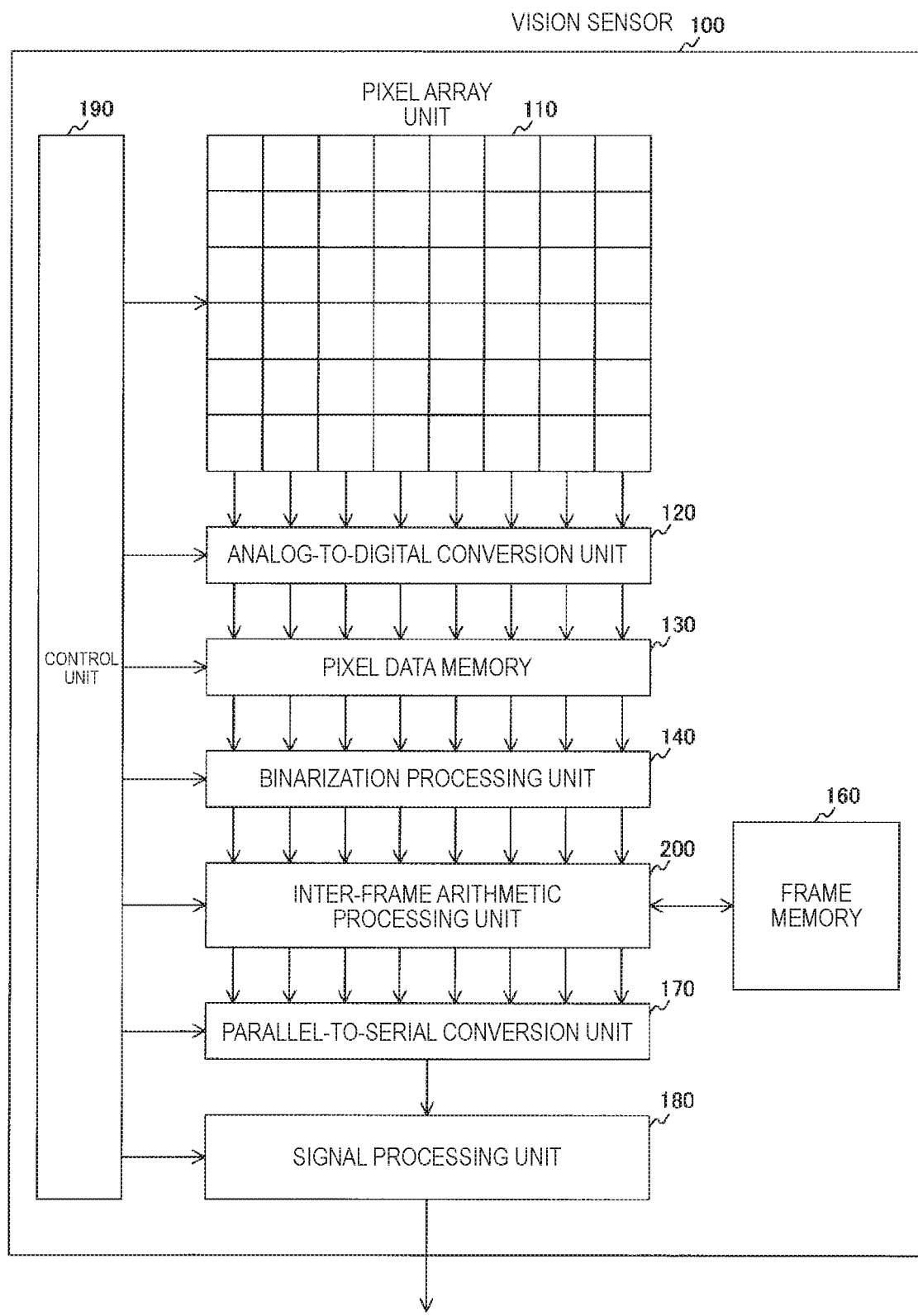
FIG. 1 is a diagram illustrating a configuration example of a vision sensor 100 according to an embodiment of the present technology.

FIG. 1 is a diagram illustrating a configuration example of a vision sensor 100 according to an embodiment of the present technology. The vision sensor 100 is a sensor having a detection (sensing) function such as a tracking function for tracking an object. The vision sensor 100 includes a pixel array unit 110, an analog-to-digital conversion unit 120, a pixel data memory 130, a binarization processing unit 140, a frame memory 160, an inter-frame arithmetic processing unit 200, a parallel-to-serial conversion unit 170, a signal processing unit 180, and a control unit 190.

The pixel array unit 110 is a photoelectric conversion element group in which pixels for generating pixel signals by performing a photo-electric conversion on received light are disposed in a two-dimensional array pattern. The pixel array unit 110 is addressed for each row, and a pixel signal of a row corresponding to an address designated by the control unit 190 is read in column parallel. The read pixel signal is supplied to the analog-to-digital conversion unit 120.

The analog-to-digital conversion unit 120 converts the pixel signals of column parallel for one row supplied from the pixel array unit 110 from analog signals to digital signals. The digital signals converted from the analog signals by the analog-to-digital conversion unit 120 are stored in the pixel data memory 130 as pixel data.

The pixel data memory 130 is a memory that stores the pixel data of column parallel for one row converted into the digital signals by the analog-to-digital conversion unit 120. The pixel data stored in the pixel data memory 130 is read by the binarization processing unit 140.

The binarization processing unit 140 reads the pixel data of column parallel for one row from the pixel data memory 130, determines a magnitude relationship with reference to a threshold value that is set in advance, and outputs either "1" or "0" of binarization data. For example, the binarized data is data indicating either presence or absence of an object, and it is assumed that a pixel determined as the presence of the object indicates "1" and a pixel determined as the absence of the object indicates "0". Note that, in a case in which the pixel data is converted into 1 bit in the above-described analog-to-digital conversion unit 120, the binarization by the binarization processing unit 140 is able to be omitted.

The frame memory 160 is a memory that stores the binarized pixel data of a frame that transits in time sequence. In this embodiment, it is assumed that a moving image is configured of frames that transits in time sequence, and the pixel data configuring the frames is stored in the frame memory 160. When the inter-frame arithmetic processing unit 200 performs an arithmetic process, a frame supplied from the binarization processing unit 140 is set as a current frame, and a frame immediately preceding the current frame in time sequence is set as a past frame. At this time, the frame memory 160 supplies the pixel data of the past frame to the inter-frame arithmetic processing unit 200.

The inter-frame arithmetic processing unit 200 implements a predetermined arithmetic process by column parallel in a row unit for the pixel data of the current frame supplied from the binarization processing unit 140 and the pixel data of the past frame stored in the frame memory 160. In addition, the inter-frame arithmetic processing unit 200 updates the pixel data of the past frame stored in the frame memory 160 on the basis of a result of the arithmetic process. As the predetermined arithmetic process in the inter-frame arithmetic processing unit 200, for example, a tracking arithmetic for tracking an object is assumed. In this case, the inter-frame arithmetic processing unit 200 compares the pixel data of the past frame with the pixel data of the current frame and tracks movement of the object. As will be described later, the inter-frame arithmetic processing unit 200 performs the tracking arithmetic by a self-window method.

The parallel-to-serial conversion unit 170 converts the pixel data, which is an arithmetic result of column parallel for one row by the inter-frame arithmetic processing unit 200, from parallel signals to serial signals. The pixel data converted into the serial signals by the parallel-to-serial conversion unit 170 is supplied to the signal processing unit 180.

The signal processing unit 180 implements a predetermined signal process on the pixel data converted into the serial signals by the parallel-to-serial conversion unit 170. As the predetermined signal process in the signal processing unit 180, for example, a process of obtaining a center of gravity or area of an object, a process of obtaining a motion difference (a motion vector or a motion direction) from the immediately preceding frame, or the like is assumed.

The control unit 190 controls each unit of the vision sensor 100. As control by the control unit 190, for example, address designation of a row to be read in the pixel array unit 110, designation of the pixel data to be read from the frame memory 160 in the inter-frame arithmetic processing unit 200, or the like is assumed. Details of the control by the control unit 190 will be described later.

[Process of Vision Sensor]

Figure 2:
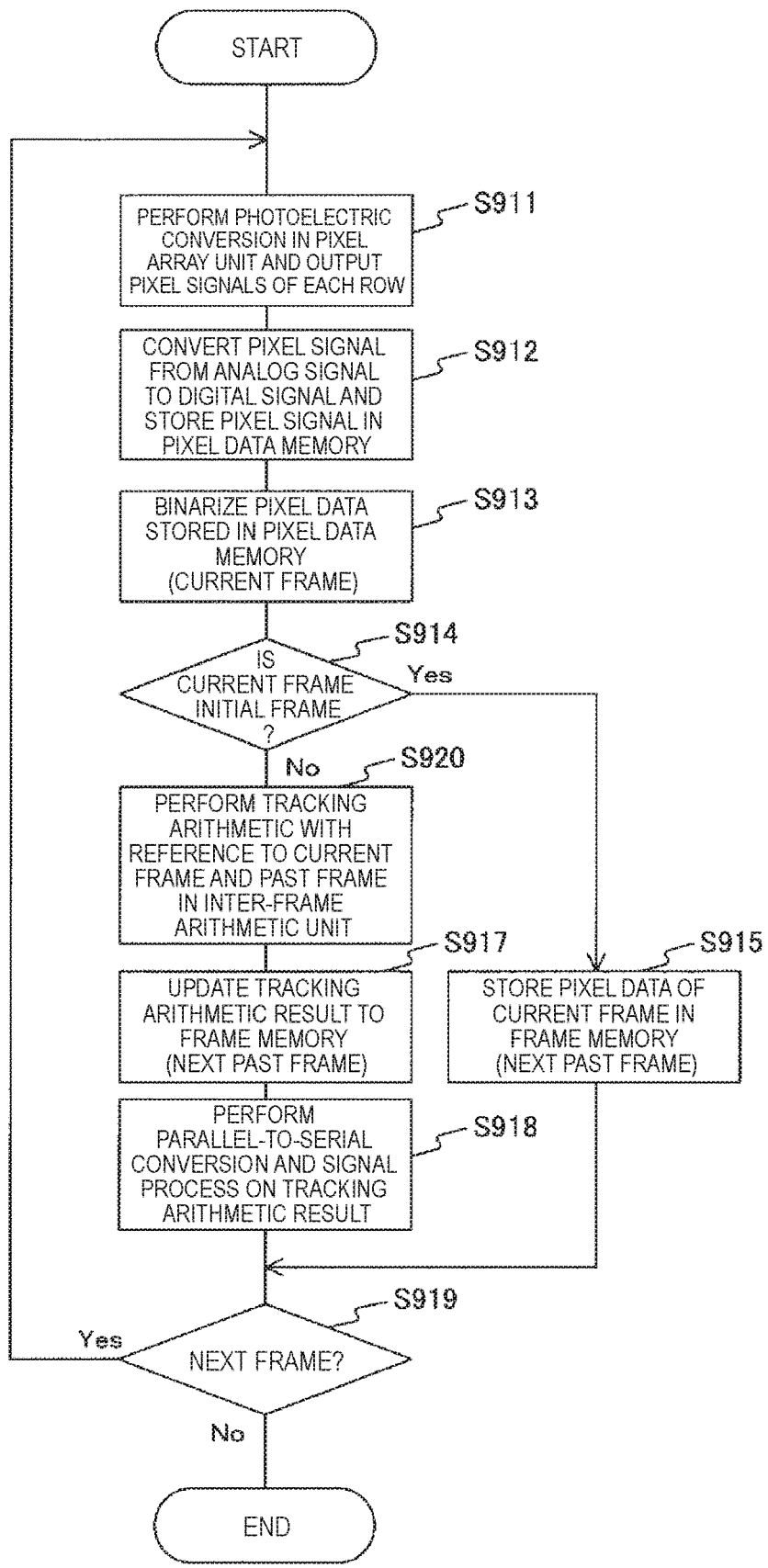
FIG. 2 is a flowchart illustrating an example of a process procedure of the vision sensor 100 according to the embodiment of the present technology.

FIG. 2 is a flowchart illustrating an example of a process procedure of the vision sensor 100 according to the embodiment of the present technology.

First, the pixel array unit 110 performs the photoelectric conversion on the received light and outputs the pixel signals for each row in column parallel (step S911). Here, the address of the row to be output is designated from the control unit 190. The analog-to-digital conversion unit 120 converts the pixel signals of column parallel for one row supplied from the pixel array unit 110 from the analog signals into the digital signals, and stores the pixel signals as the pixel data in the pixel data memory 130 (step S912). The binarization processing unit 140 binarizes the pixel data of column parallel for one row stored in the pixel data memory 130 (step S913). The binarized pixel data obtained by performing the-above described processes configures the current frame.

In a case in which the current frame is an initial frame of the moving image (step S914: Yes), the pixel data of the current frame is stored as it is in the frame memory 160 (step S915). The pixel data stored in the frame memory 160 becomes the pixel data of the past frame by a next frame on the time series.

On the other hand, in a case in which the current frame is not the initial frame of the moving image (step S914: No), the inter-frame arithmetic processing unit 200 performs the tracking arithmetic with reference to the pixel data of each of the current frame and the past frame (step S920). In addition, the inter-frame arithmetic processing unit 200 updates the result of the tracking arithmetic in the frame memory 160 (step S917). The pixel data updated in the frame memory 160 becomes the pixel data of the past frame by the next frame on the time series. In addition, after the result of the tracking arithmetic is converted from the parallel signals into the serial signals by the parallel-to-serial conversion unit 170, the predetermined signal process is implemented in the signal processing unit 180 (step S918).

These processes (steps S911 to S918) are repeatedly executed for each frame (step S919: Yes). In a case in which the next frame is not present (step S919: No), the process is ended.

[Self-Window Method]

In this embodiment, the inter-frame arithmetic processing unit 200 performs the tracking arithmetic by the self-window method. The self-window method is an algorithm that assumes that an amount of object movement between frames is several pixels and tracks an object only within that area. The self-window method tracks the object by repeating an extension process and an extraction process. The extension process is a process of generating an extension window obtained by extending an area of the object in the past frame to the surroundings thereof. The extraction process is a process of extracting an object (target) in the extended area.

These are expressed by the following formulas, where $f_k(i, j)$ is the pixel data of the current frame, $W_k(i, j)$ is data indicating the extended area (extended window), and $g_k(i, j)$ is the pixel data of the past frame. The variable i is an index in a column direction in the frame and is an integer equal to or greater than 0. The variable j is an index in a row direction in the frame and is an integer equal to or greater than 0. The variable k is a time indicating a time series of the frames and is an integer equal to or greater than 1. In addition, a symbol $\cap$ refers to an intersection, and a symbol $\cup$ refers to a union. Note that, in this formula, the extended area (extended window) is generated assuming that the object movement amount between the frames is 1 pixel.

$$g_k(i,j) = W_k(i,j) \cap f_k(i,j) \quad \text{(Extraction process)}$$

$$W_{k+1}(i,j) = g_k(i,j) \cup g_k(i+1,j) \cup g_k(i-1,j)$$
$$\cup g_k(i,j+1) \cup g_k(i,j-1) \quad \text{(Extension process)}$$

2. Operation Example

Next, the operation example of the vision sensor 100 according to the embodiment of the present technology will be described. FIG. 3 is a diagram illustrating an example of transition of the pixel data assumed in the vision sensor 100 according to the embodiment of the present technology.

Here, it is assumed that the transition is performed to a first frame, a second frame, and a third frame in time sequence. Using this assumed transition example, the operation of performing the object tracking by column parallel arithmetic is verified. Note that, in the following example, it is assumed that the object movement amount between the frames is 1 pixel.

The pixel data of the first frame is as shown at the top. A pixel of a black circle in each frame indicates the pixel "1" which is determined as the presence of the object. Other pixels indicate the pixel "0" which is determined as the absence of the object.

The pixel data of the second frame is shifted rightward by one pixel with respect to the pixel data of the first frame. A pixel shown in gray in the second frame indicates the pixel "1" which is determined as the presence of the object in the first frame.

The pixel data of the third frame is shifted downward by one pixel with respect to the pixel data of the second frame. A pixel shown in gray in the third frame indicates the pixel "1" which is determined as the presence of the object in the second frame. In addition, in the pixel data of the third frame, it is assumed that noise is generated in an upper left portion.

[Process of Second Frame]

Figure 4:
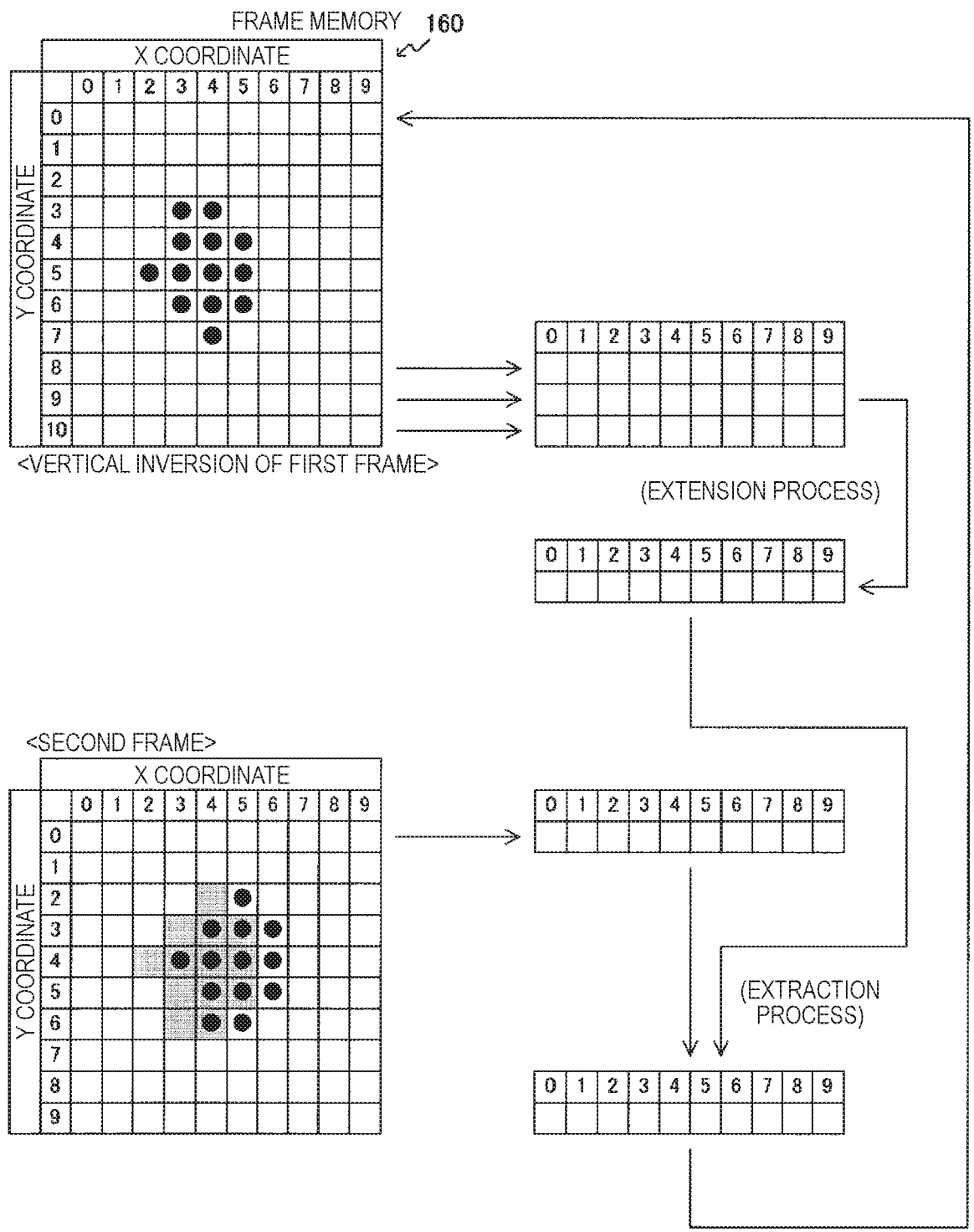
FIG. 4 is a diagram illustrating an example of a process of a 0-th row of a second frame according to the embodiment of the present technology.

FIG. 4 is a diagram illustrating an example of a process of a 0-th row of the second frame according to the embodiment of the present technology. When processing the second frame as the current frame, it is necessary to refer to the pixel data of the first frame as the past frame. At this time point, the pixel data of the first frame is stored in the frame memory 160. That is, in the process procedure described above, it is determined that the first frame is the initial frame (step S914: Yes), and the pixel data thereof is stored as it is in the frame memory 160 (step S915). However, in this embodiment, it is assumed that the frame memory 160 is shifted downward each time a process for one row is performed and the updated pixel data is inserted in an uppermost row. Therefore, at a time point when the process of the 0-th row of the second frame is started, the frame memory 160 stores vertically inverted pixel data of the first frame.

First, the inter-frame arithmetic processing unit 200 performs the extension process on the pixel data of the 0-th row of the past frame stored in the frame memory 160. To this end, rows before and after the 0-th row of the past frame are read. Since the 0-th row of the past frame corresponds to a 9-th row in the frame memory 160, 8-th to 10-th rows of the frame memory 160 are read. Here, since the object is not present in a corresponding range, the extended area obtained as the result of the extension process becomes an empty state.

In addition, the inter-frame arithmetic processing unit 200 reads the pixel data of the 0-th row of the current frame from the binarization processing unit 140. In addition, the extraction process for obtaining an intersection of the 0-th row of the current frame and the extended area is performed. Here, since the object is not present in the pixel data of the current frame and the extended area is also empty, the object is not present in the obtained pixel data. The pixel data for one row is updated to the frame memory 160 as the past frame in preparation for the arithmetic process of the next frame. At that time, as described above, the pixel data stored in the frame memory 160 is shifted downward, and the updated pixel data is inserted into the uppermost row.

Figure 5:
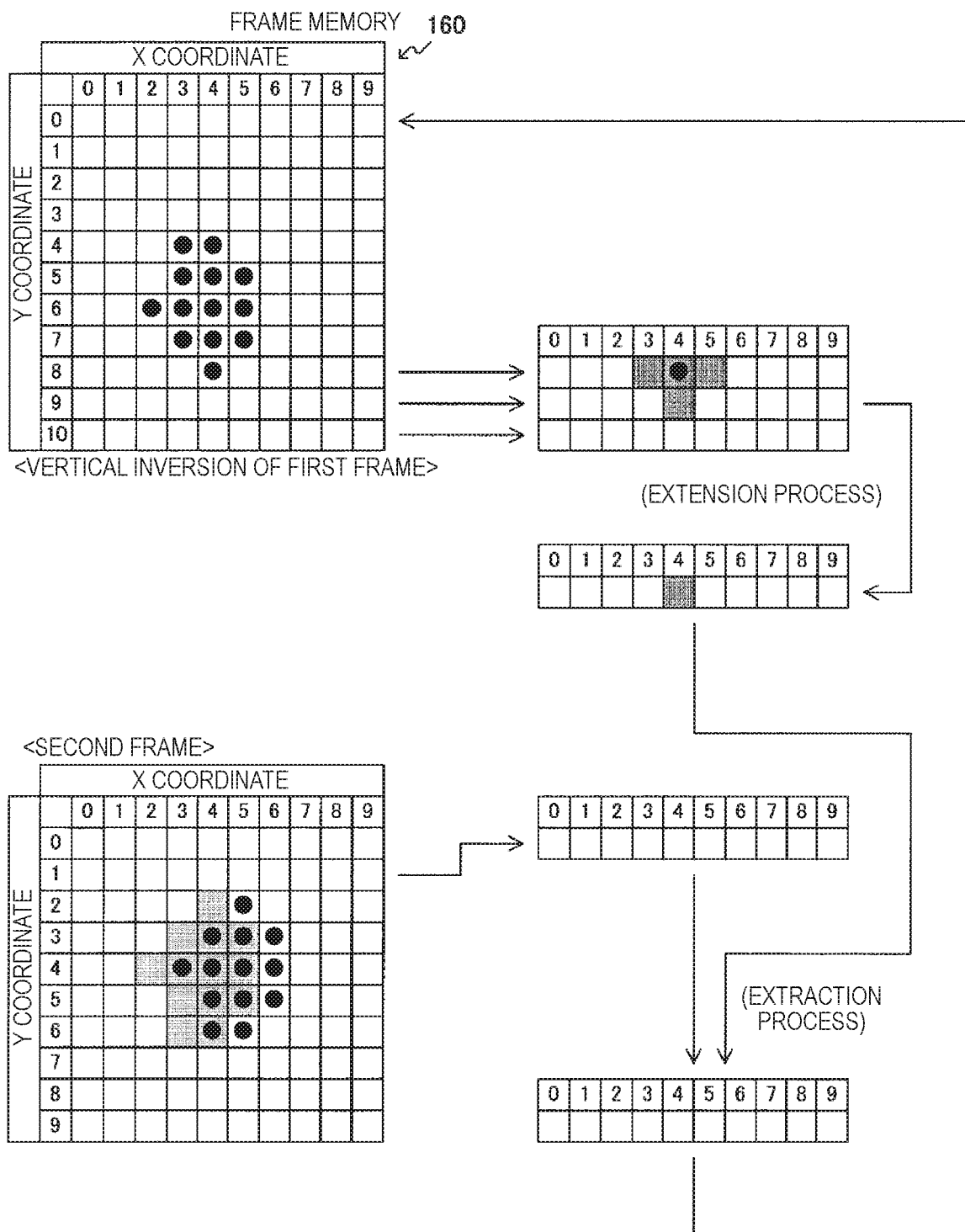
FIG. 5 is a diagram illustrating an example of a process of a first row of a second frame according to the embodiment of the present technology.

FIG. 5 is a diagram illustrating a process example of a first row of the second frame according to the embodiment of the present technology.

The inter-frame arithmetic processing unit 200 performs the extension process on the pixel data of the first row of the past frame stored in the frame memory 160. To this end, rows before and after the first row of the past frame are read. Since the first row of the past frame corresponds to the 9-th row in the frame memory 160, the 8-th to 10-th rows of the frame memory 160 are read. Here, since the object is present in a fourth column of the eighth row, the extended area obtained as the result of the extension process is effective in the fourth column (the area to be extracted).

In addition, the inter-frame arithmetic processing unit 200 reads the pixel data of the first row of the current frame from the binarization processing unit 140. In addition, the extraction process for obtaining an intersection of the first row of the current frame and the extended area is performed. Here, although the extended area is not empty, since the object is not present in the pixel data of the current frame, the object is not present in the obtained pixel data. The pixel data for one row is updated to the frame memory 160 as the past frame in preparation for the arithmetic process of the next frame.

Figure 6:
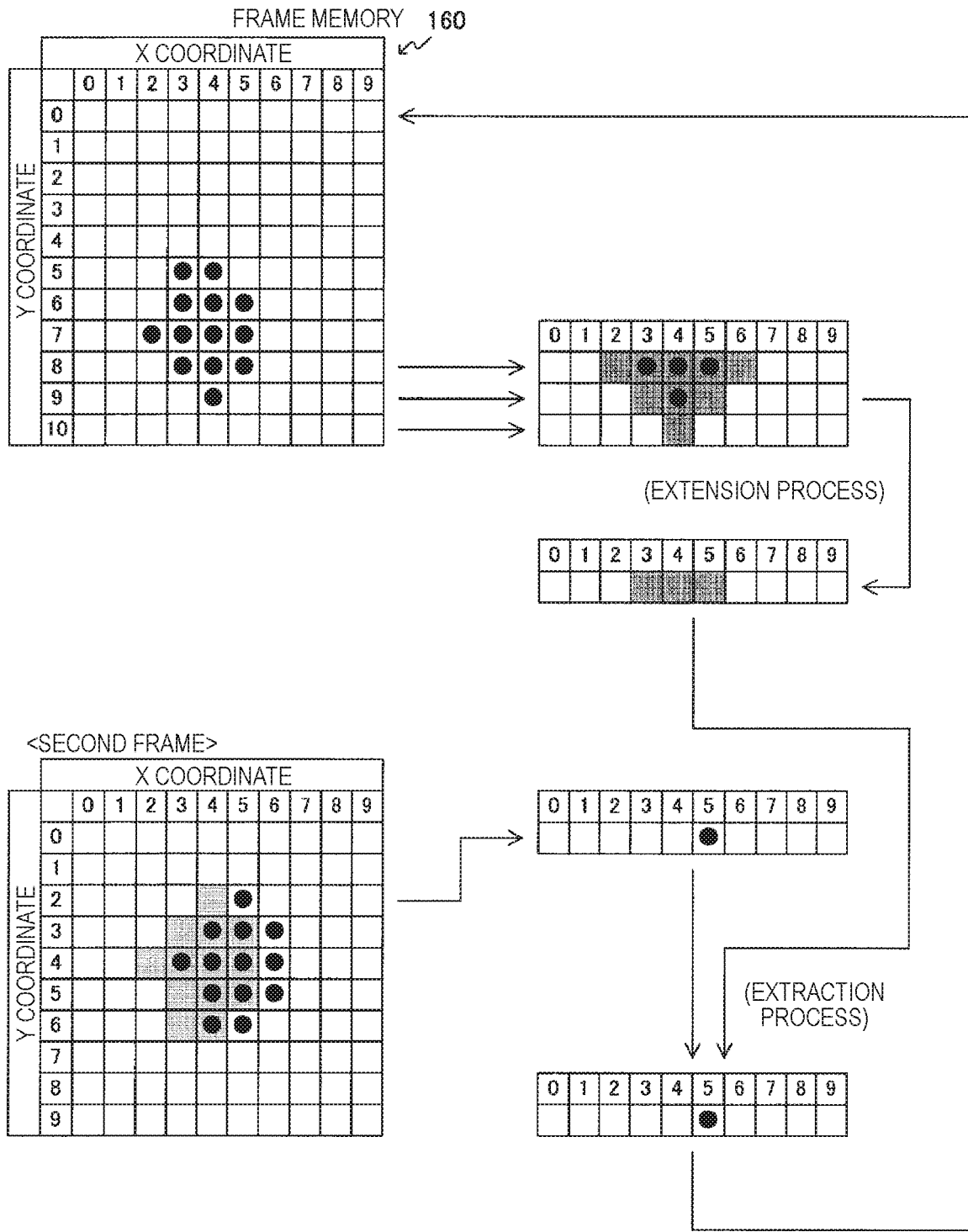
FIG. 6 is a diagram illustrating an example of a process of a second row of a second frame according to the embodiment of the present technology.
Figure 7:
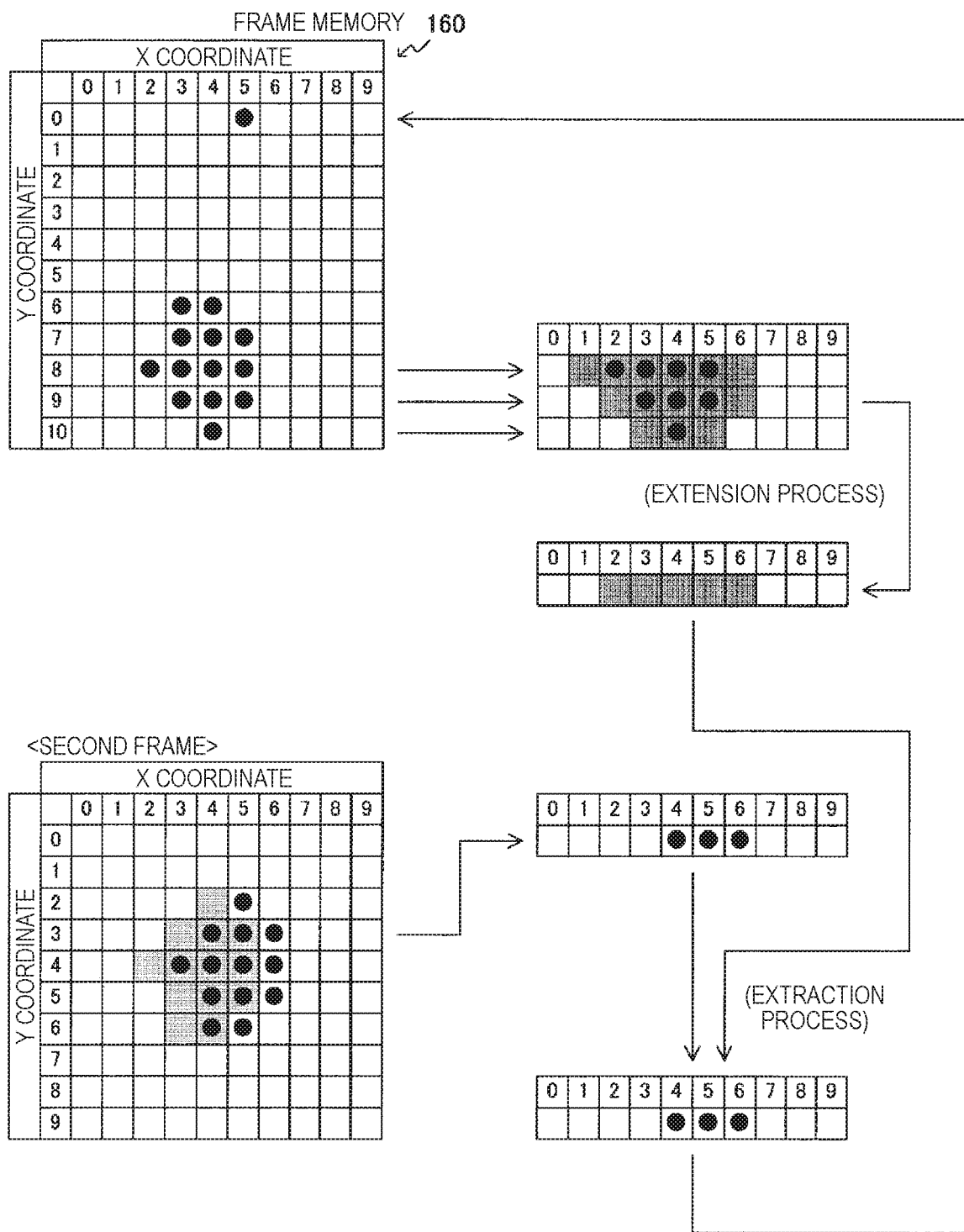
FIG. 7 is a diagram illustrating an example of a process of a third row of a second frame according to the embodiment of the present technology.
Figure 8:
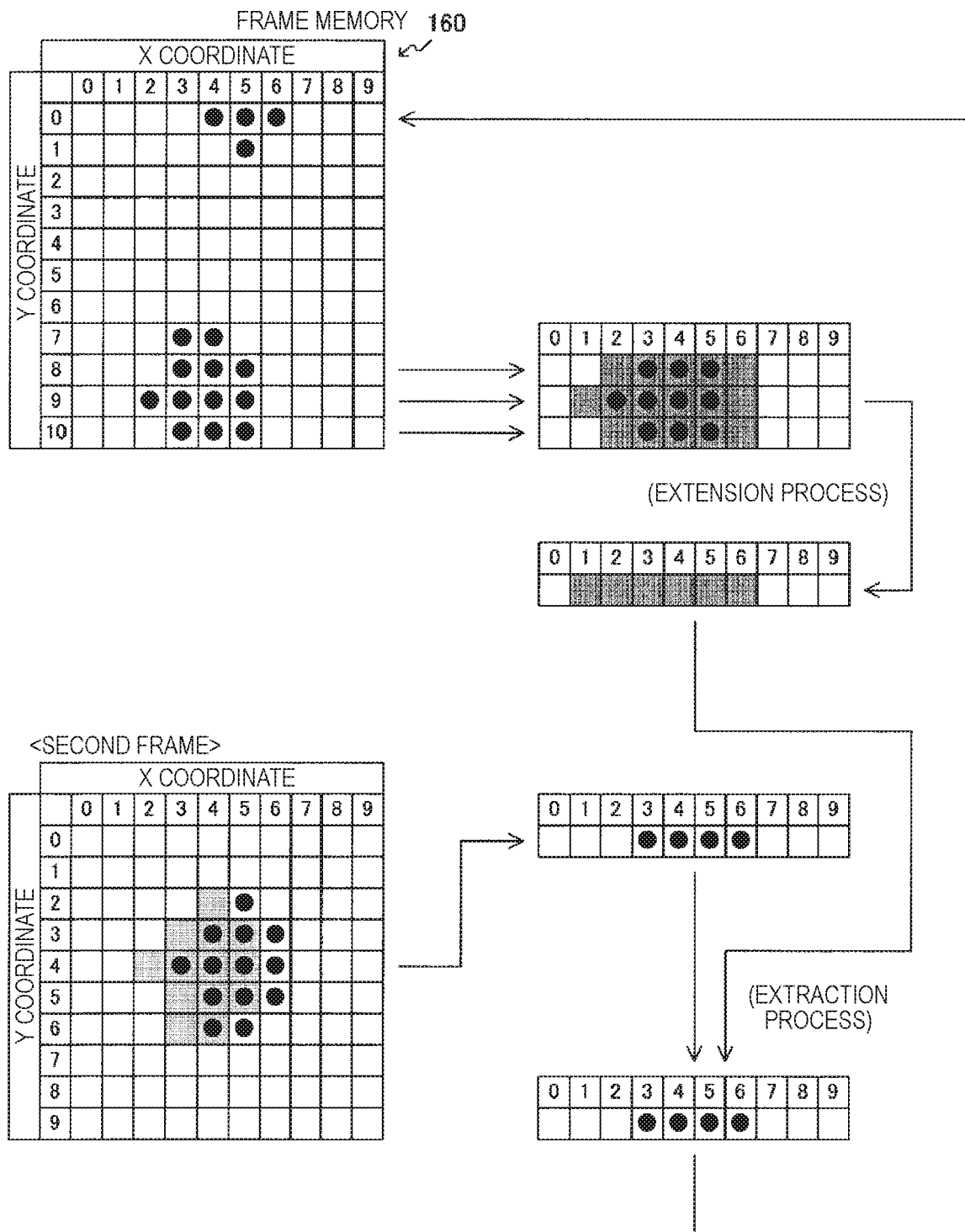
FIG. 8 is a diagram illustrating an example of a process of a fourth row of a second frame according to the embodiment of the present technology.
Figure 9:
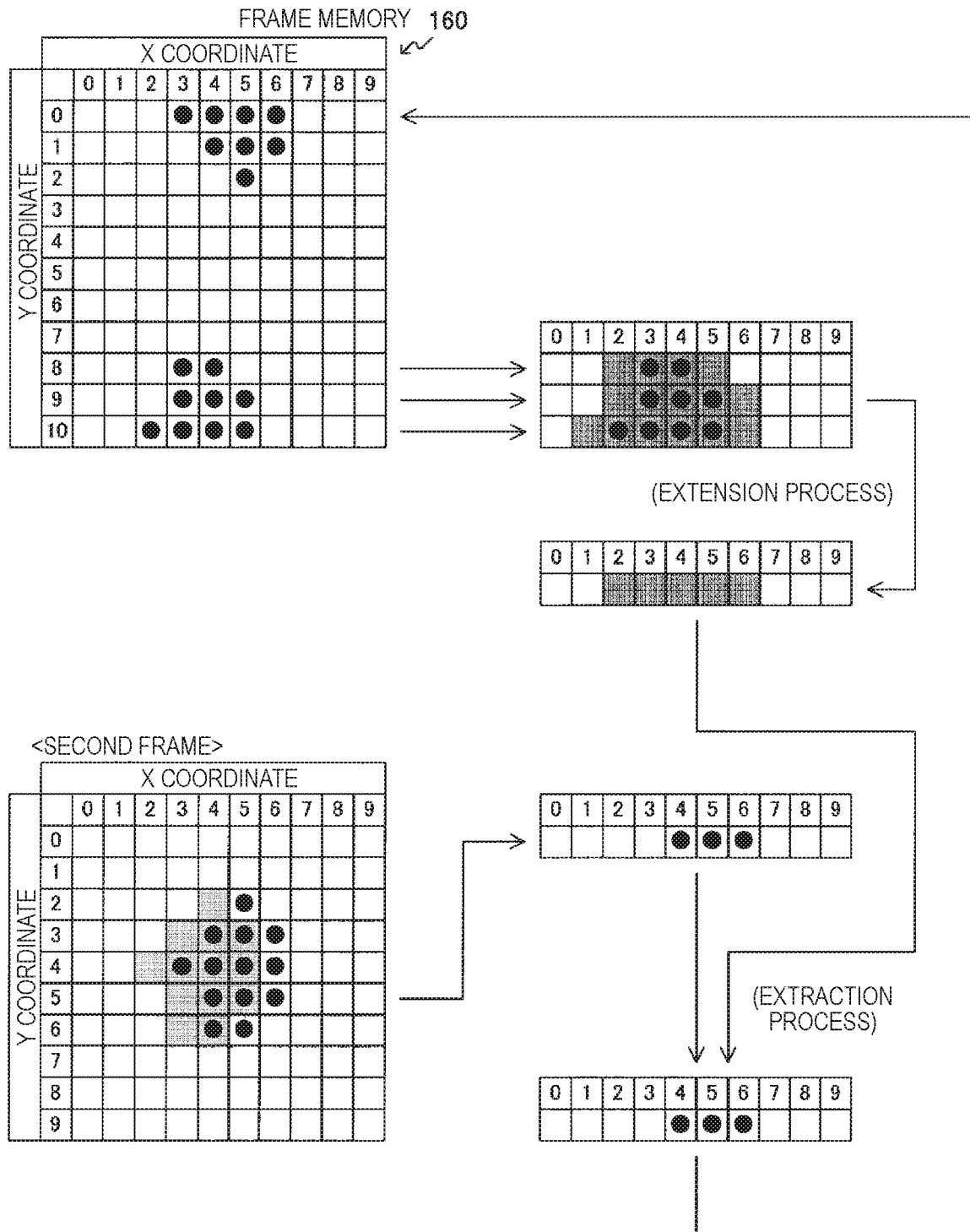
FIG. 9 is a diagram illustrating an example of a process of a fifth row of a second frame according to the embodiment of the present technology.
Figure 10:
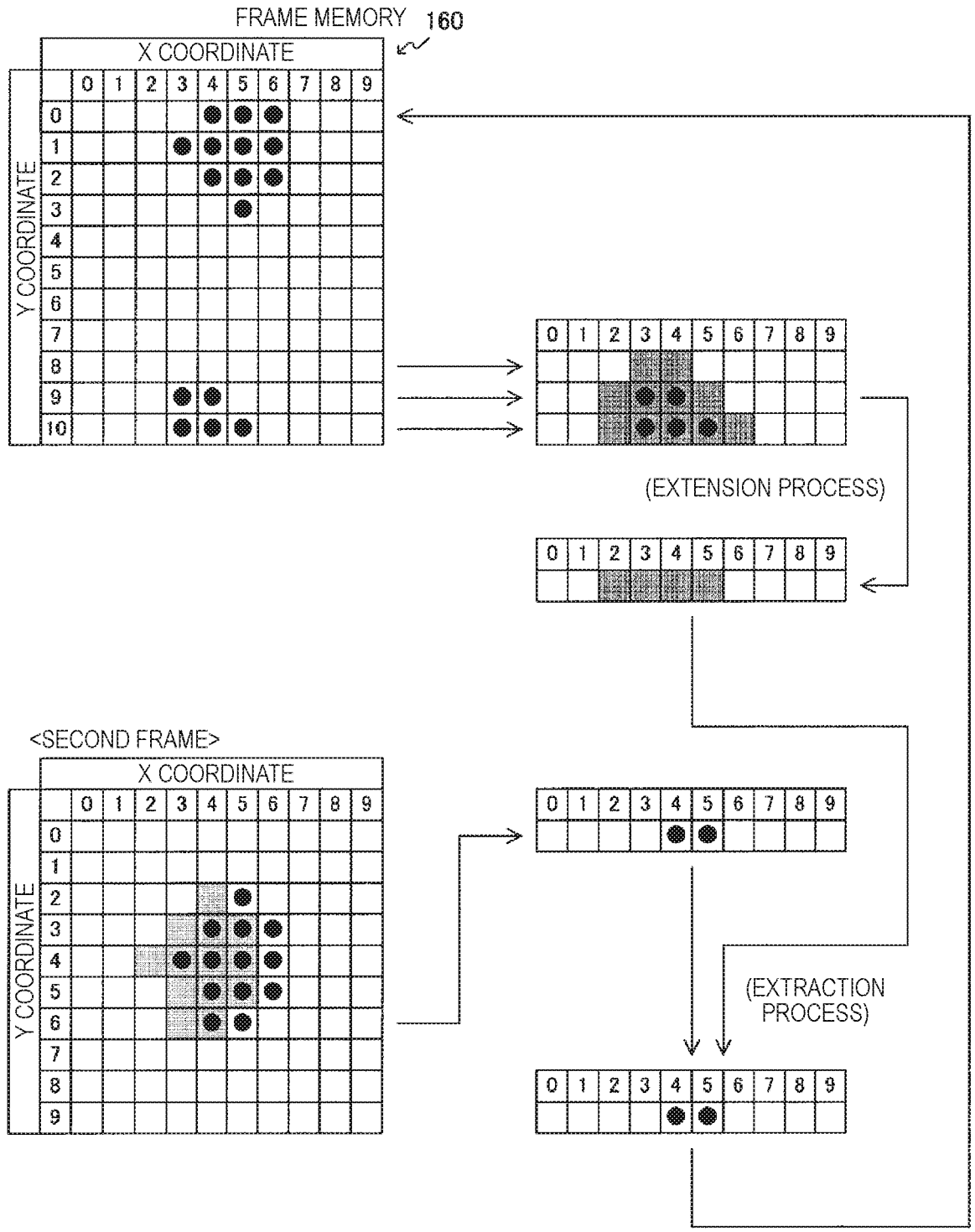
FIG. 10 is a diagram illustrating an example of a process of a sixth row of a second frame according to the embodiment of the present technology.
Figure 11:
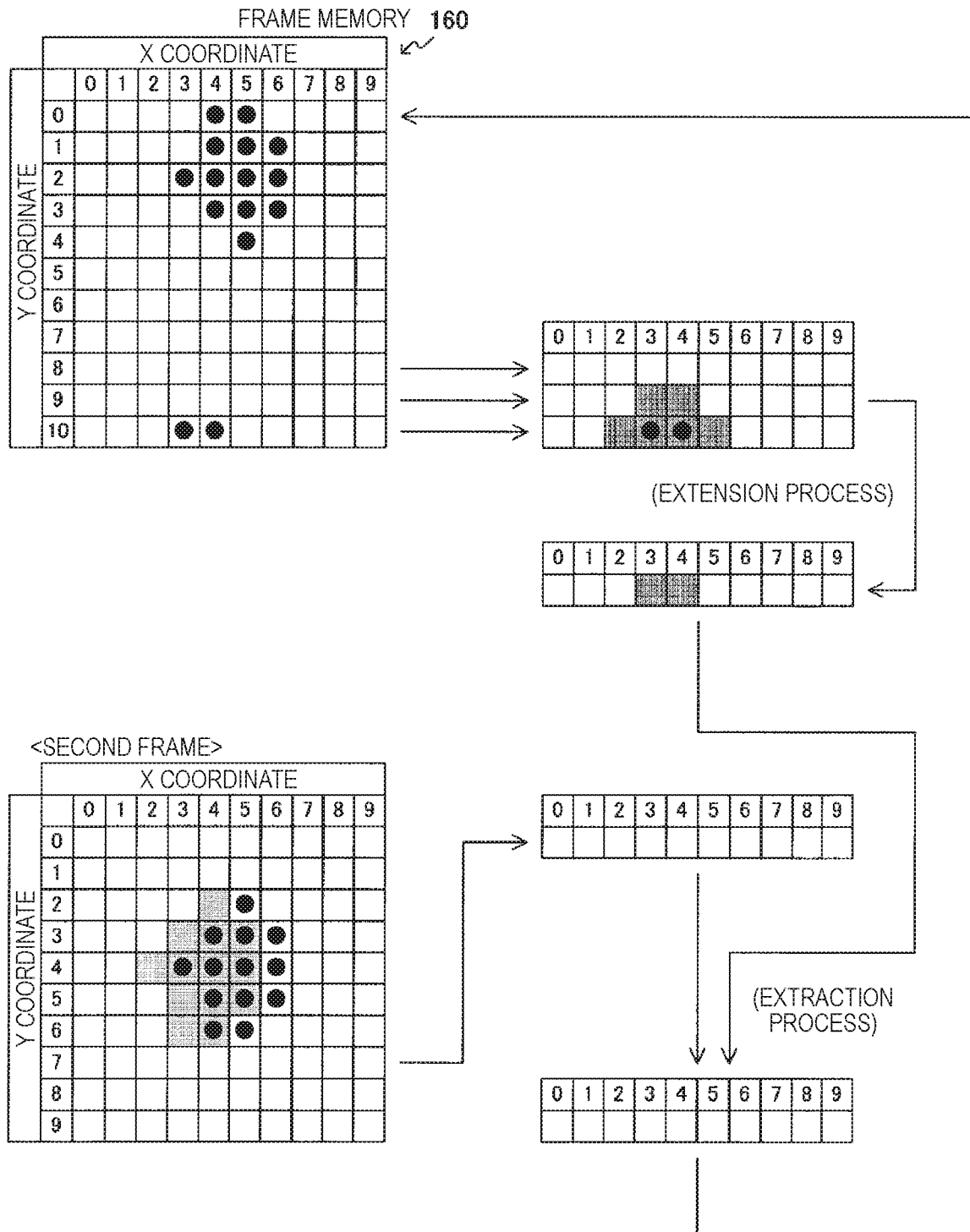
FIG. 11 is a diagram illustrating an example of a process of a seventh row of a second frame according to the embodiment of the present technology.
Figure 12:
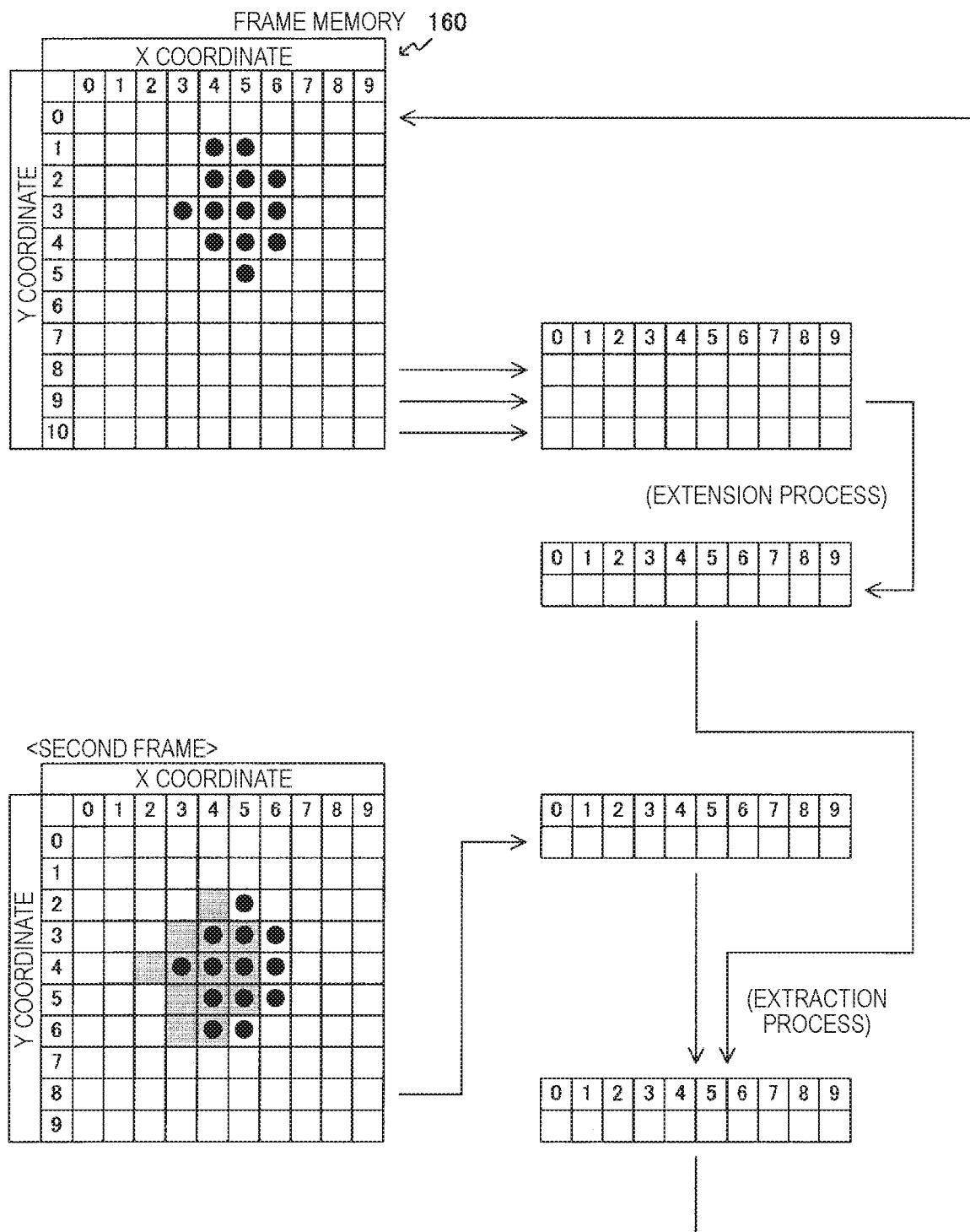
FIG. 12 is a diagram illustrating an example of a process of an eighth row of a second frame according to the embodiment of the present technology.

FIG. 6 is a diagram illustrating a process example of a second row of the second frame according to the embodiment of the present technology.

The inter-frame arithmetic processing unit 200 performs the extension process on the pixel data of the second row of the past frame stored in the frame memory 160. To this end, rows before and after the second row of the past frame are read. Since the second row of the past frame corresponds to the 9-th row in the frame memory 160, the 8-th to 10-th rows of the frame memory 160 are read. Here, since the object is present in third to fifth columns of the eighth row and a fourth column of the ninth row, the extended area obtained as the result of the extension process is effective in the third to fifth columns (the area to be extracted).

In addition, the inter-frame arithmetic processing unit 200 reads the pixel data of the second row of the current frame from the binarization processing unit 140. In addition, the extraction process for obtaining an intersection of the second row of the current frame and the extended area is performed. Here, since the object is present in the fifth column of the pixel data of the current frame and the extended area is effective in the third to fifth columns, as the result of the tracking arithmetic, the pixel data indicating that the object is present in the fifth column is obtained. The pixel data for one row is updated to the frame memory 160 as the past frame in preparation for the arithmetic process of the next frame.

Thereafter, a similar process is performed for each row of the second frame one by one. FIGS. 7 to 12 are diagrams illustrating process examples of third to eighth rows of the second frame according to the embodiment of the present technology.

Figure 13:
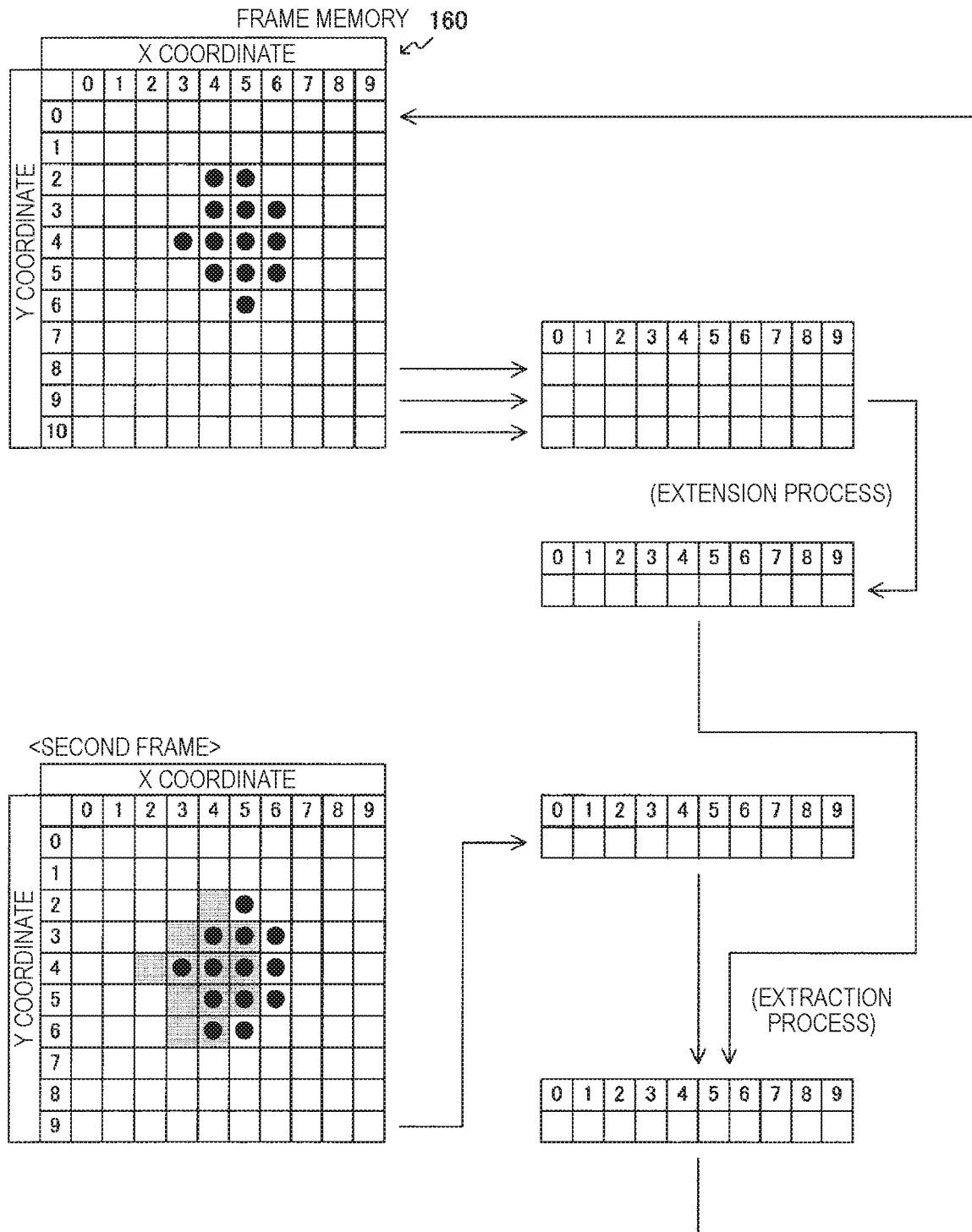
FIG. 13 is a diagram illustrating an example of a process of a ninth row of a second frame according to the embodiment of the present technology.

FIG. 13 is a diagram illustrating a process example of a ninth row of the second frame according to the embodiment of the present technology.

The inter-frame arithmetic processing unit 200 performs the extension process on the pixel data of the ninth row of the past frame stored in the frame memory 160. To this end, rows before and after the ninth row of the past frame are read. Since the ninth row of the past frame corresponds to the 9-th row in the frame memory 160, the 8-th to 10-th rows of the frame memory 160 are read. Here, since the object is not present in a corresponding range, the extended area obtained as the result of the extension process becomes an empty state.

In addition, the inter-frame arithmetic processing unit 200 reads the pixel data of the ninth row of the current frame from the binarization processing unit 140. In addition, the extraction process for obtaining an intersection of the ninth row of the current frame and the extended area is performed. Here, since the object is not present in the pixel data of the current frame and the extended area is also empty, the object is not present in the obtained pixel data. The pixel data for one row is updated to the frame memory 160 as the past frame in preparation for the arithmetic process of the next frame. As a result, at a time point when the update is performed, vertically inverted pixel data of the second frame is stored in the frame memory 160.

[Process of Third Frame]

Figure 14:
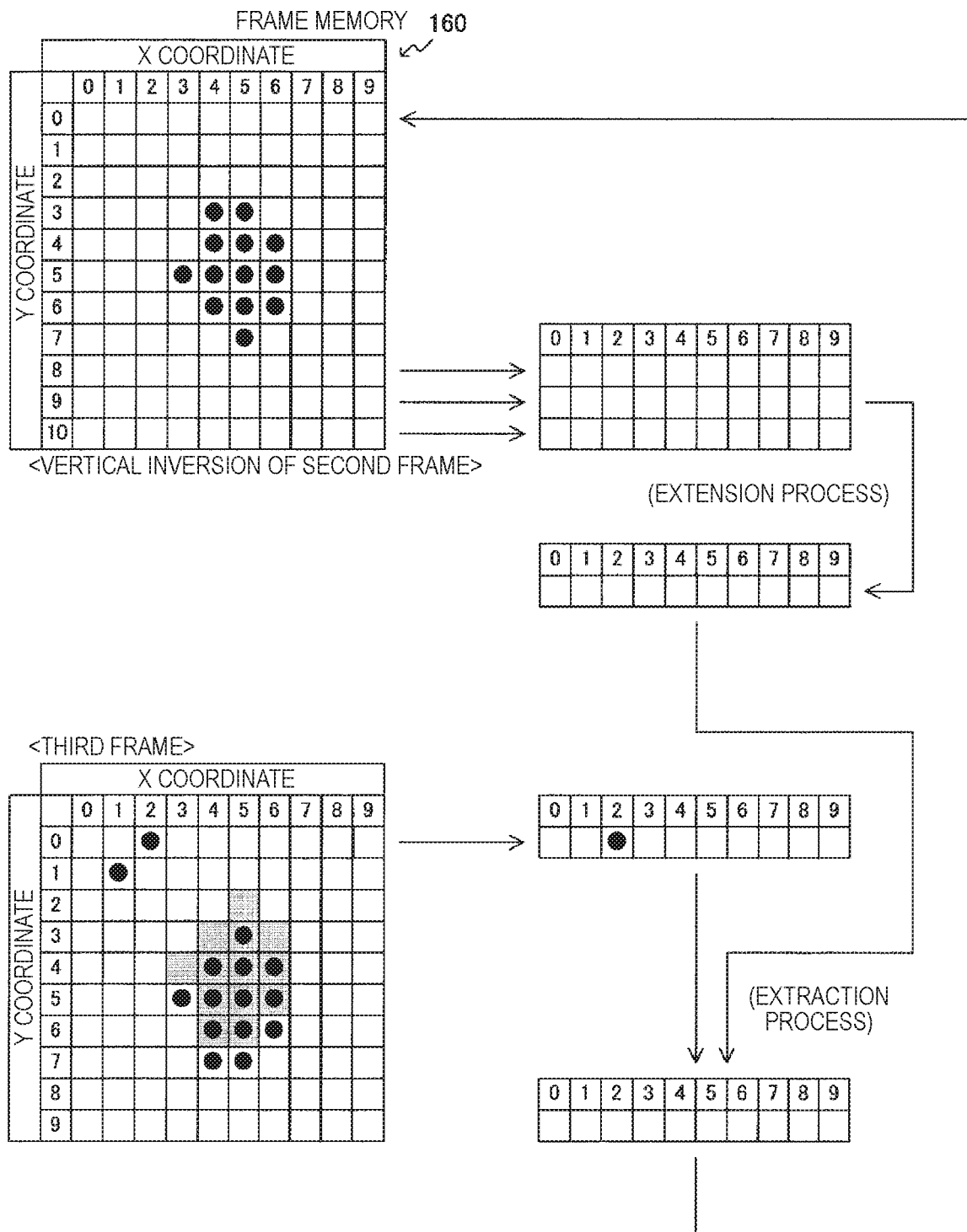
FIG. 14 is a diagram illustrating an example of a process of a 0-th row of a third frame according to the embodiment of the present technology.

FIG. 14 is a diagram illustrating a process example of a 0-th row of the third frame according to the embodiment of the present technology. When processing the third frame as the current frame, the pixel data of the second frame is referred as the past frame. As described above, at the time point when the update is performed by the process of the ninth row of the second frame, the vertically inverted pixel data of the second frame is stored in the frame memory 160.

The inter-frame arithmetic processing unit 200 performs the extension process on the pixel data of the 0-th row of the past frame stored in the frame memory 160. To this end, rows before and after the 0-th row of the past frame are read. Since the 0-th row of the past frame corresponds to a 9-th row in the frame memory 160, 8-th to 10-th rows of the frame memory 160 are read. Here, since the object is not present in a corresponding range, the extended area obtained as the result of the extension process becomes an empty state.

In addition, the inter-frame arithmetic processing unit 200 reads the pixel data of the 0-th row of the current frame from the binarization processing unit 140. In addition, the extraction process for obtaining an intersection of the 0-th row of the current frame and the extended area is performed. Here, although it is shown that the object is present in the second column in the pixel data of the current frame, since the extended area is empty, the object is not present in the obtained pixel data. That is, the data in the second column of the 0-th row is handled as noise, and the object is not present. The pixel data for one row is updated to the frame memory 160 as the past frame in preparation for the arithmetic process of the next frame.

Figure 15:
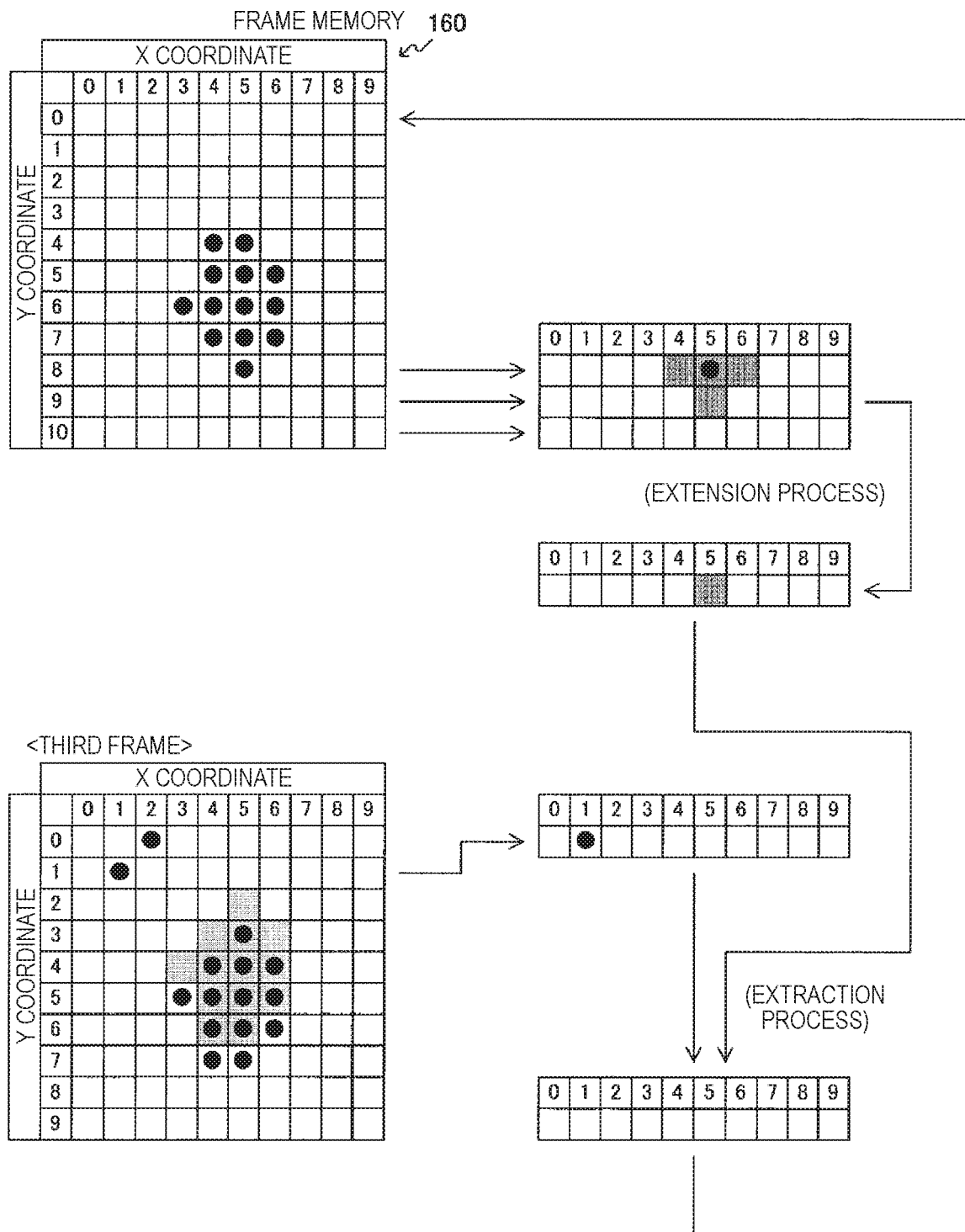
FIG. 15 is a diagram illustrating an example of a process of a first row of a third frame according to the embodiment of the present technology.
Figure 16:
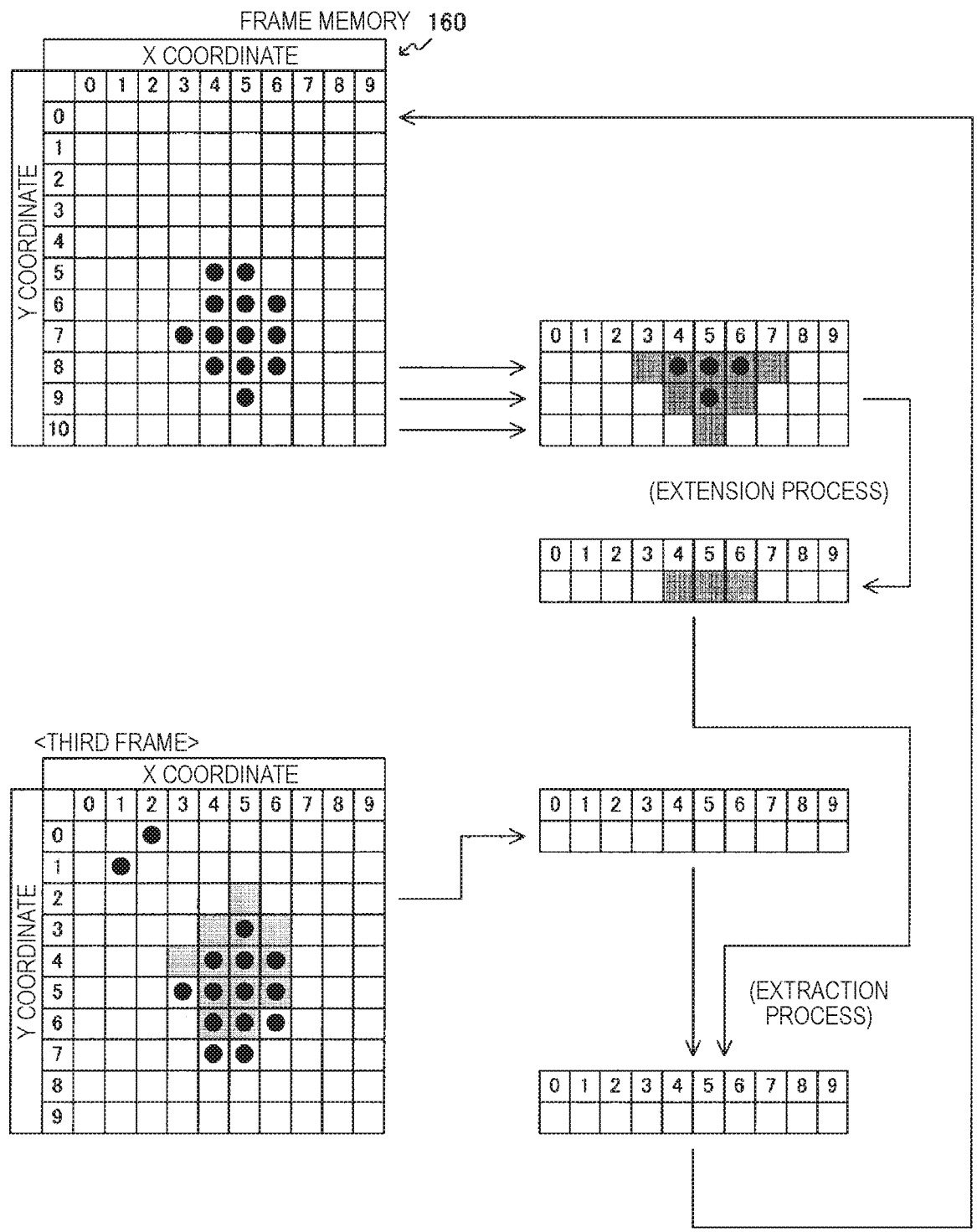
FIG. 16 is a diagram illustrating an example of a process of a second row of a third frame according to the embodiment of the present technology.
Figure 17:
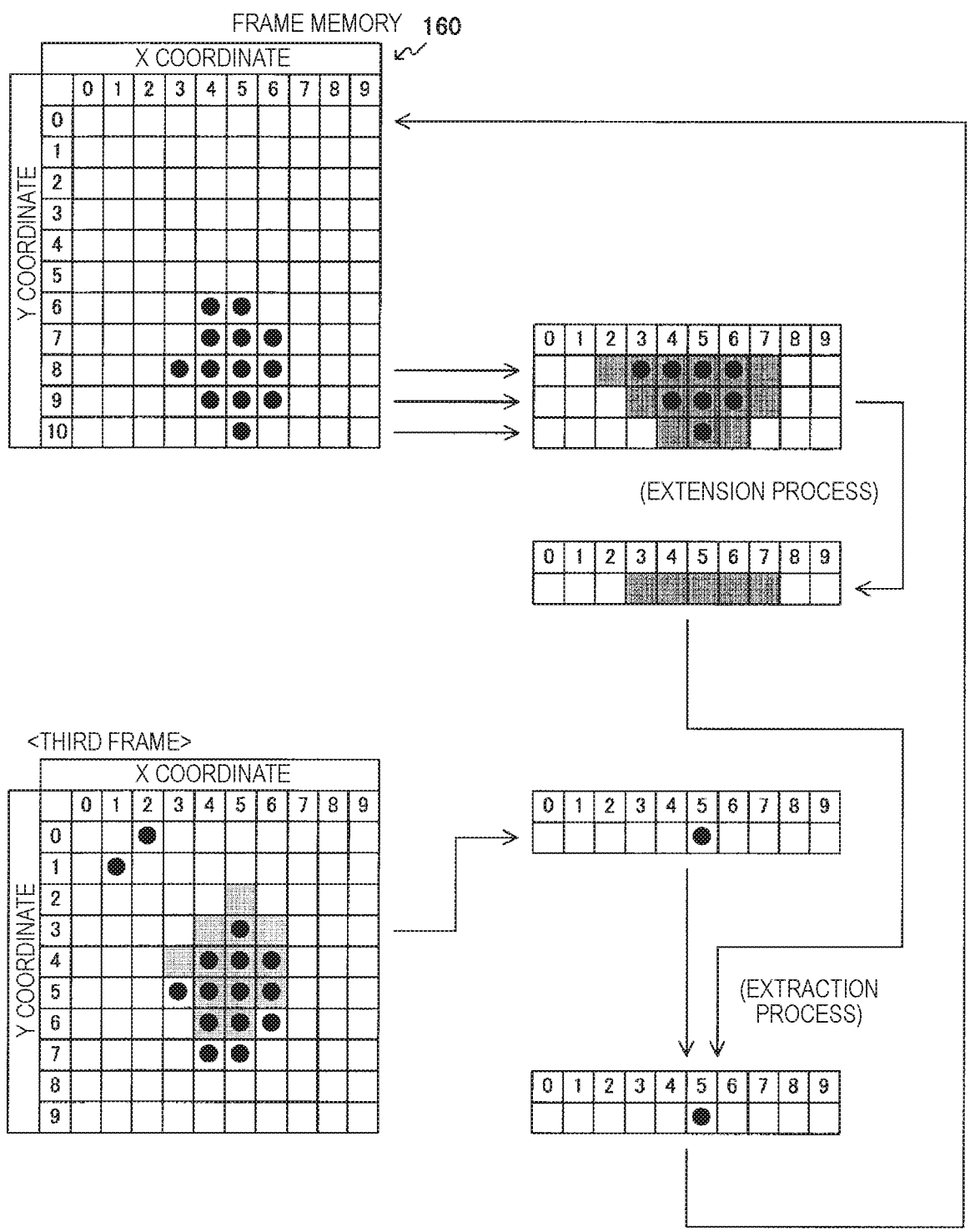
FIG. 17 is a diagram illustrating an example of a process of a third row of a third frame according to the embodiment of the present technology.
Figure 18:
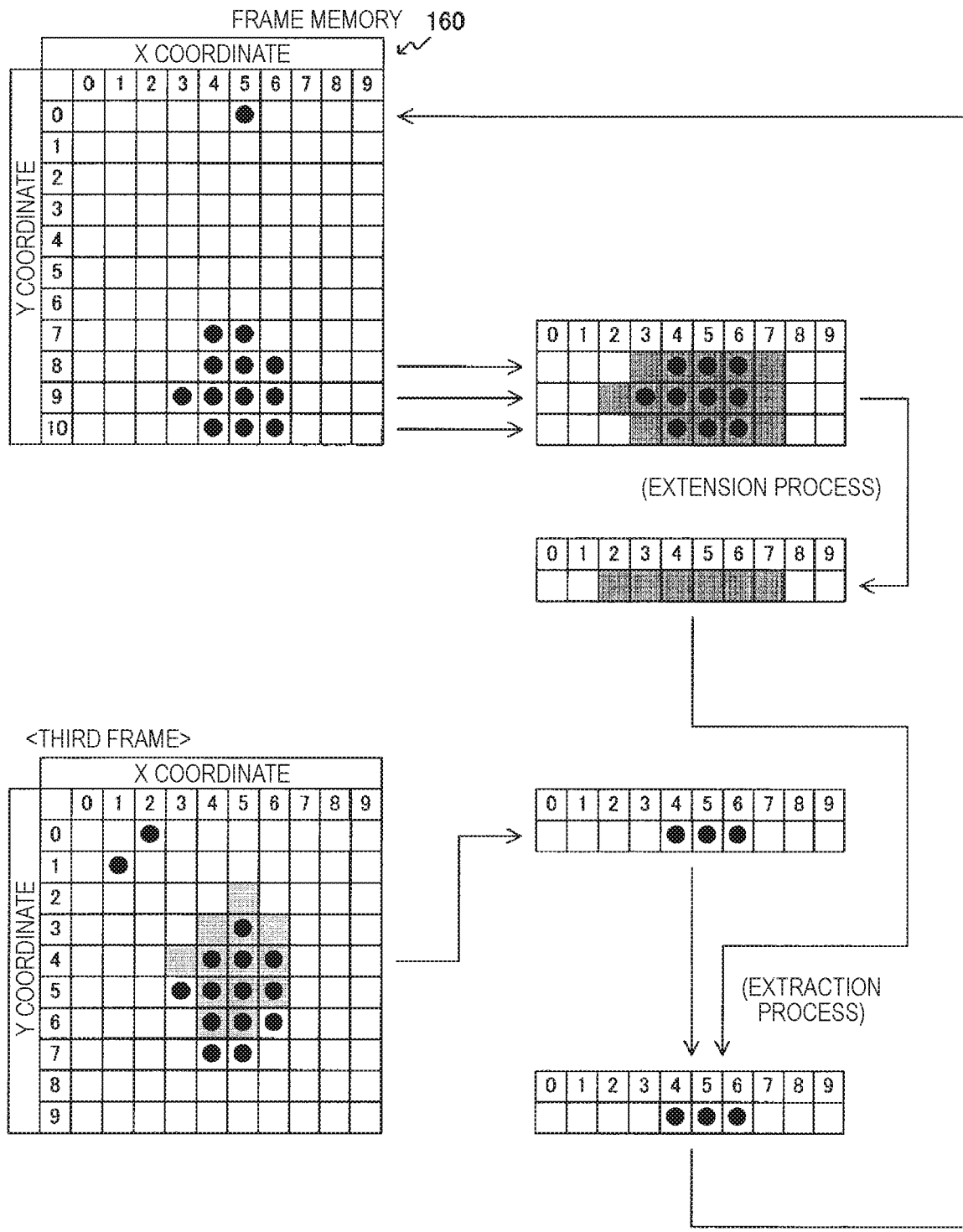
FIG. 18 is a diagram illustrating an example of a process of a fourth row of a third frame according to the embodiment of the present technology.
Figure 19:
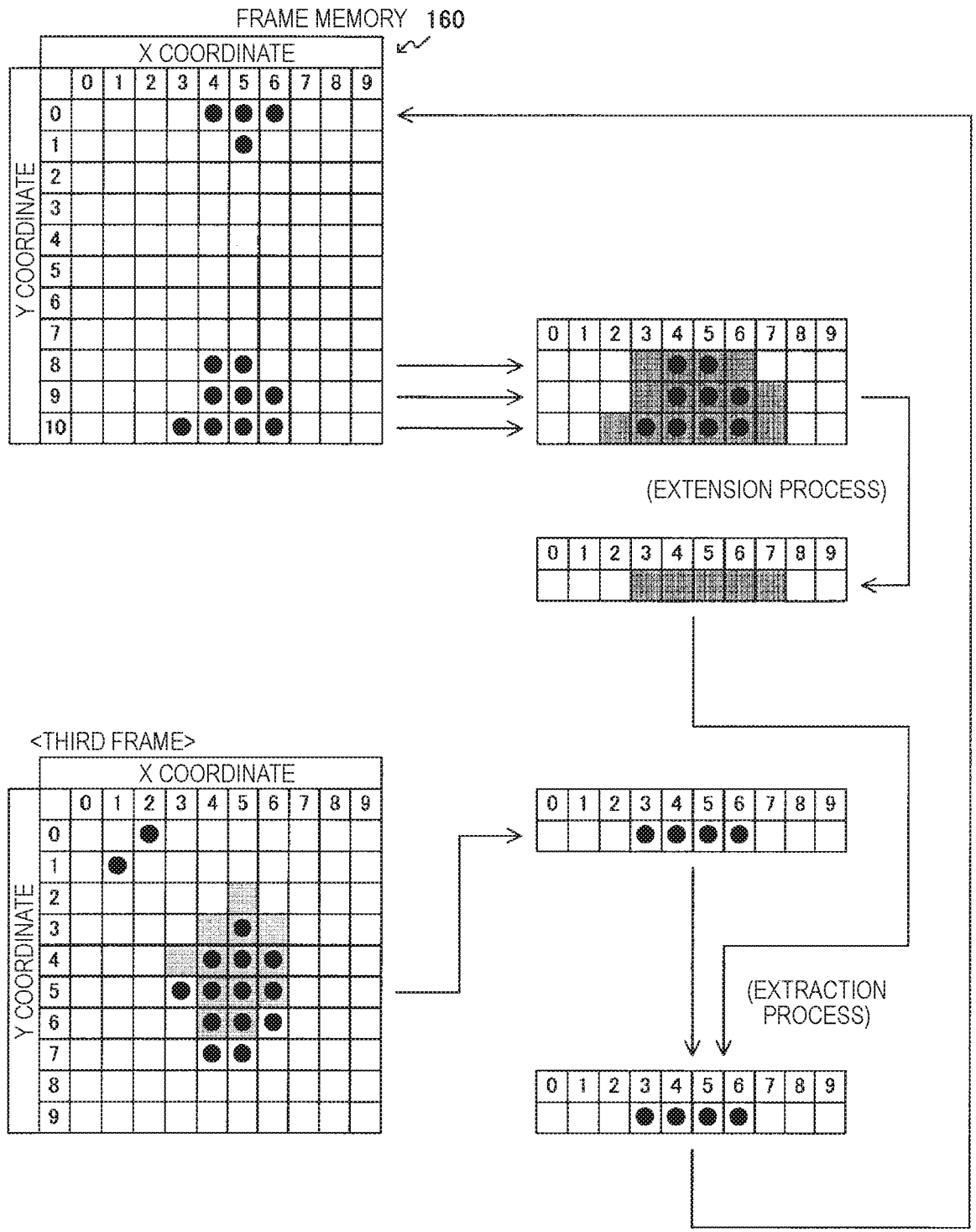
FIG. 19 is a diagram illustrating an example of a process of a fifth row of a third frame according to the embodiment of the present technology.
Figure 20:
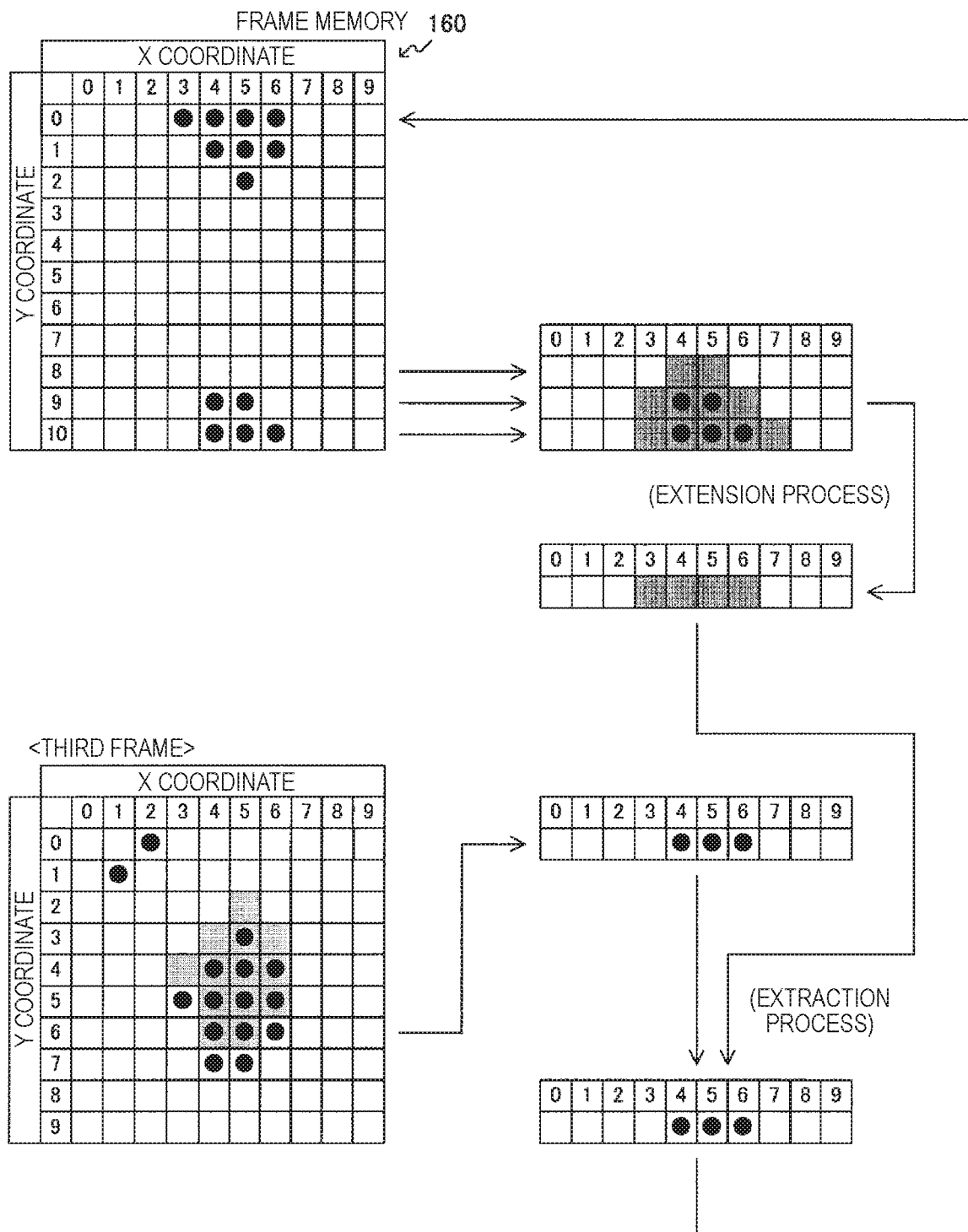
FIG. 20 is a diagram illustrating an example of a process of a sixth row of a third frame according to the embodiment of the present technology.
Figure 21:
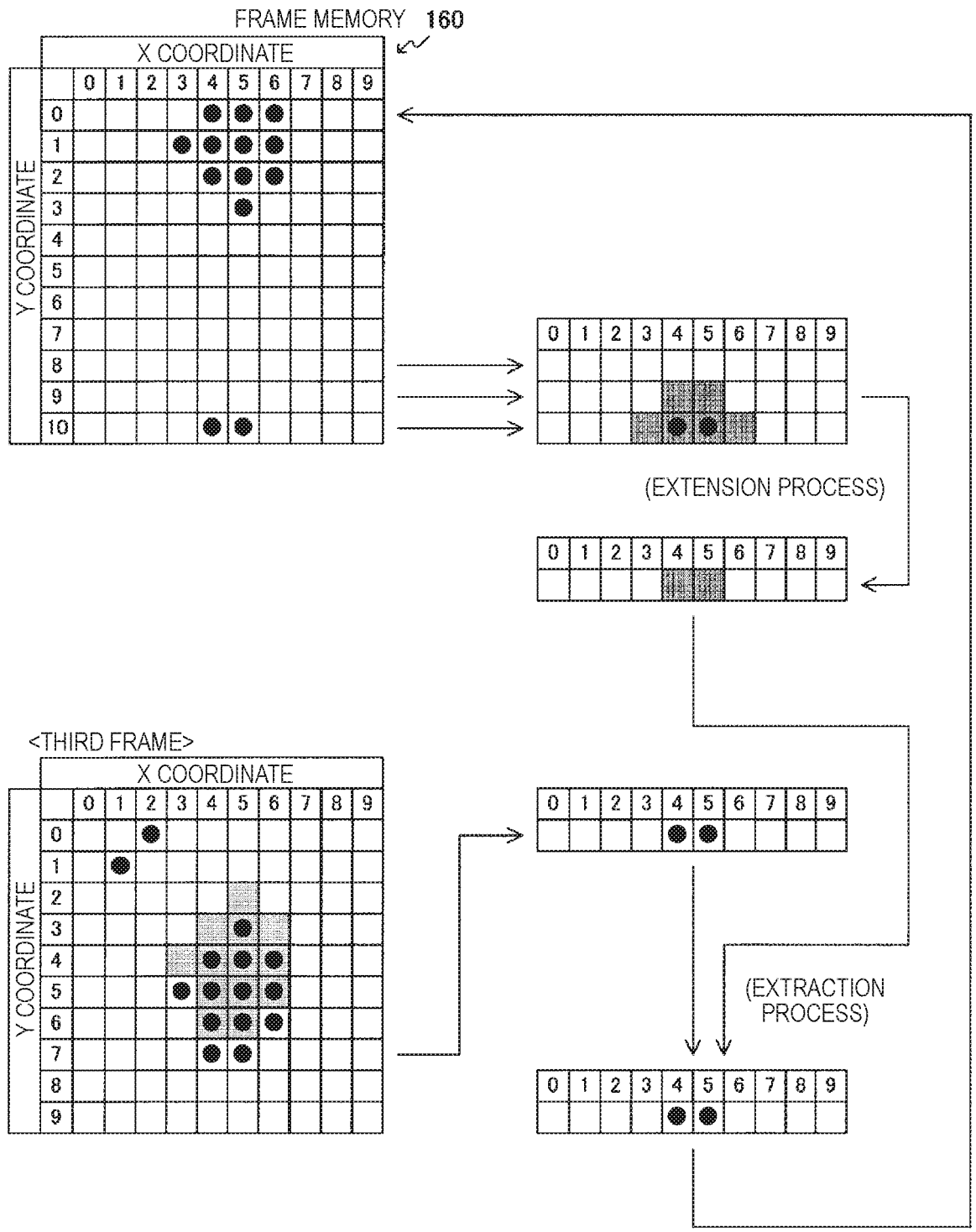
FIG. 21 is a diagram illustrating an example of a process of a seventh row of a third frame according to the embodiment of the present technology.
Figure 22:
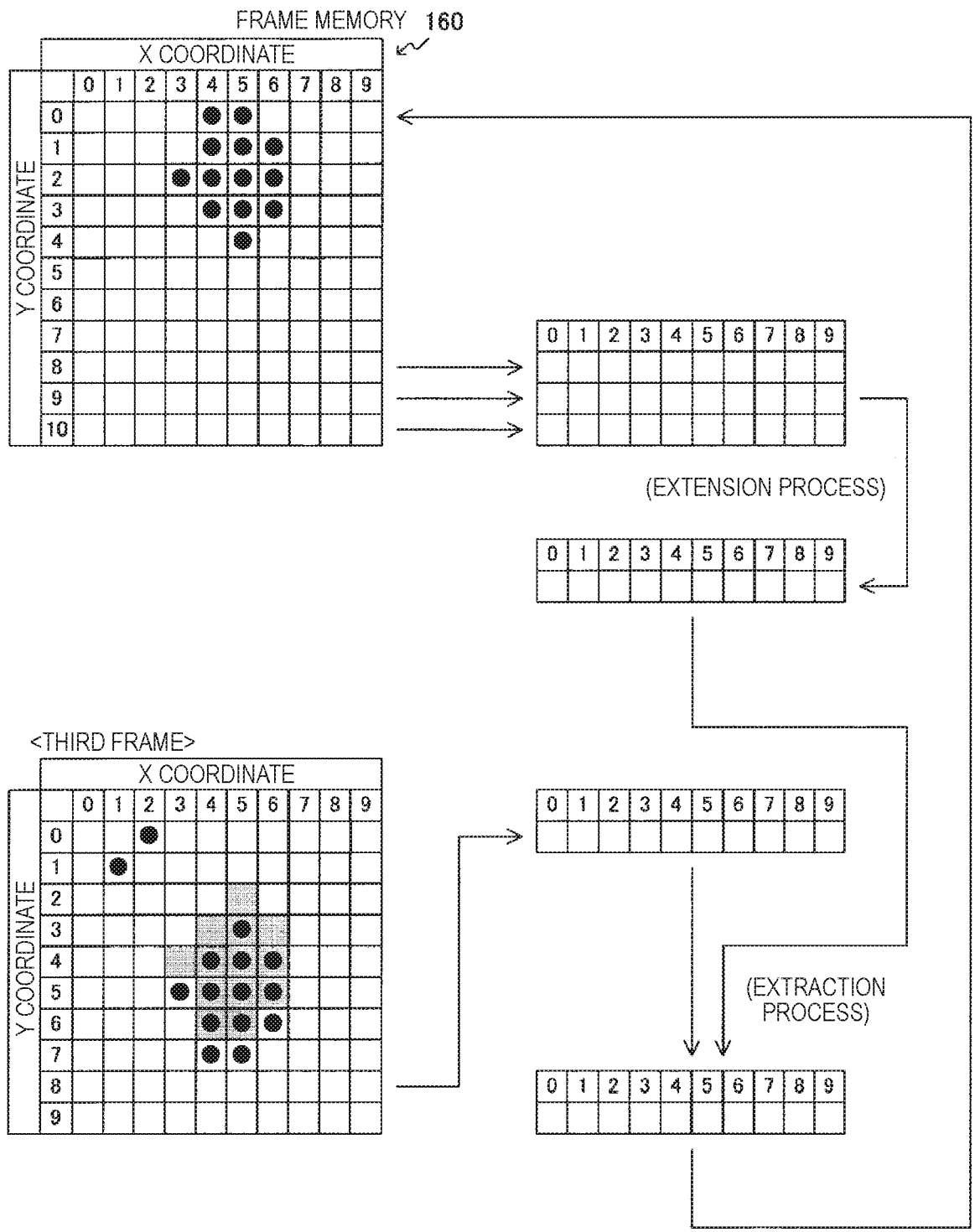
FIG. 22 is a diagram illustrating an example of a process of an eighth row of a third frame according to the embodiment of the present technology.

FIG. 15 is a diagram illustrating a process example of a first row of the third frame according to the embodiment of the present technology.

The inter-frame arithmetic processing unit 200 performs the extension process on the pixel data of the first row of the past frame stored in the frame memory 160. To this end, rows before and after the first row of the past frame are read. Since the first row of the past frame corresponds to the 9-th row in the frame memory 160, the 8-th to 10-th rows of the frame memory 160 are read. Here, since the object is present in a fifth column of the eighth row, the extended area obtained as the result of the extension process is effective in the fifth column (the area to be extracted).

In addition, the inter-frame arithmetic processing unit 200 reads the pixel data of the first row of the current frame from the binarization processing unit 140. In addition, the extraction process for obtaining the intersection of the first row of the current frame and the extended area is performed. Here, although the pixel data of the current frame indicates that the object is present in the first column, since the pixel data does not overlap with the fifth column where the extended area becomes effective, the object is not present in the obtained pixel data. The pixel data for one row is updated to the frame memory 160 as the past frame in preparation for the arithmetic process of the next frame.

Thereafter, a similar process is performed for each row of the third frame one by one. FIGS. 16 to 22 are diagrams illustrating process examples of second to eighth rows of the third frame according to the embodiment of the present technology.

Figure 23:
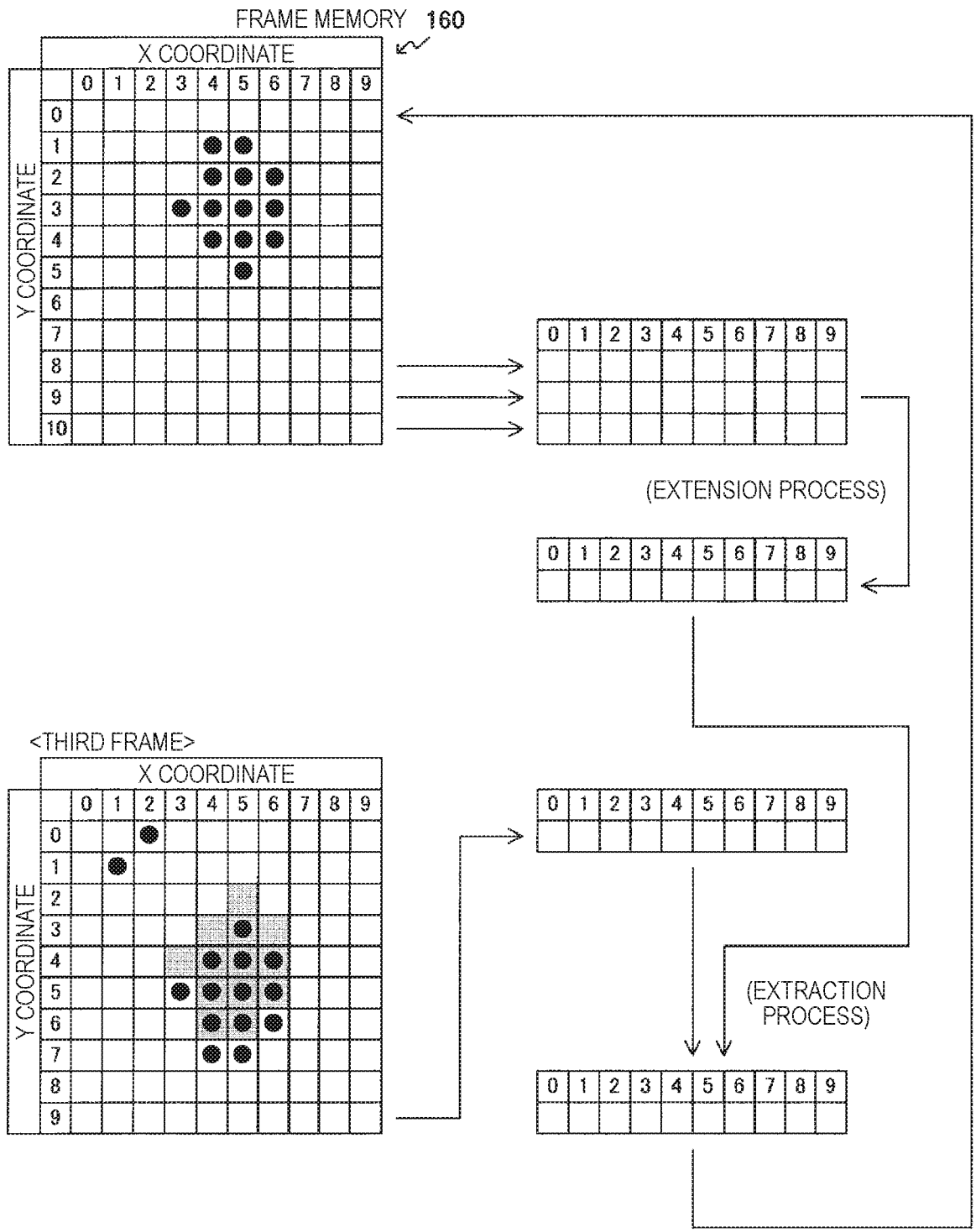
FIG. 23 is a diagram illustrating an example of a process of a ninth row of a third frame according to the embodiment of the present technology.

FIG. 23 is a diagram illustrating a process example of a ninth row of the third frame according to the embodiment of the present technology.

The inter-frame arithmetic processing unit 200 performs the extension process on the pixel data of the ninth row of the past frame stored in the frame memory 160. To this end, rows before and after the ninth row of the past frame are read. Since the ninth row of the past frame corresponds to the 9-th row in the frame memory 160, the 8-th to 10-th rows of the frame memory 160 are read. Here, since the object is not present in a corresponding range, the extended area obtained as the result of the extension process becomes an empty state.

In addition, the inter-frame arithmetic processing unit 200 reads the pixel data of the ninth row of the current frame from the binarization processing unit 140. In addition, the extraction process for obtaining the intersection of the ninth row of the current frame and the extended area is performed. Here, since the object is not present in the pixel data of the current frame and the extended area is also empty, the object is not present in the obtained pixel data. The pixel data for one row is updated to the frame memory 160 as the past frame in preparation for the arithmetic process of the next frame. As a result, at a time point when the update is performed, vertically inverted pixel data of the third frame is stored in the frame memory 160.

FIG. 24 is a diagram illustrating an example of a content of the frame memory 160 after the process of the ninth row of the third frame according to the embodiment of the present technology. As shown in the same figure, at the time point when the update is performed by the process of the ninth row of the third frame, the vertically inverted pixel data of the third frame is stored in the frame memory 160. That is, it can be seen that a trajectory of the movement of the object from the first frame to the third frame is tracked. In addition, it can be seen that noise in the third frame does not become a target of the tracking and only the movement of the object is tracked.

3. First Embodiment

Next, a specific configuration example of the inter-frame arithmetic processing unit 200 according to the embodiment of the present technology will be described. In the above-described pixel array unit 110, color filters of red (R), green (G), and blue (B) are provided for each light receiving element of each pixel, and only light of each color component passes through the color filter and is incident on the light receiving element. In the following example, a Bayer array is assumed as a pixel array in the pixel array unit 110.

Figure 25:
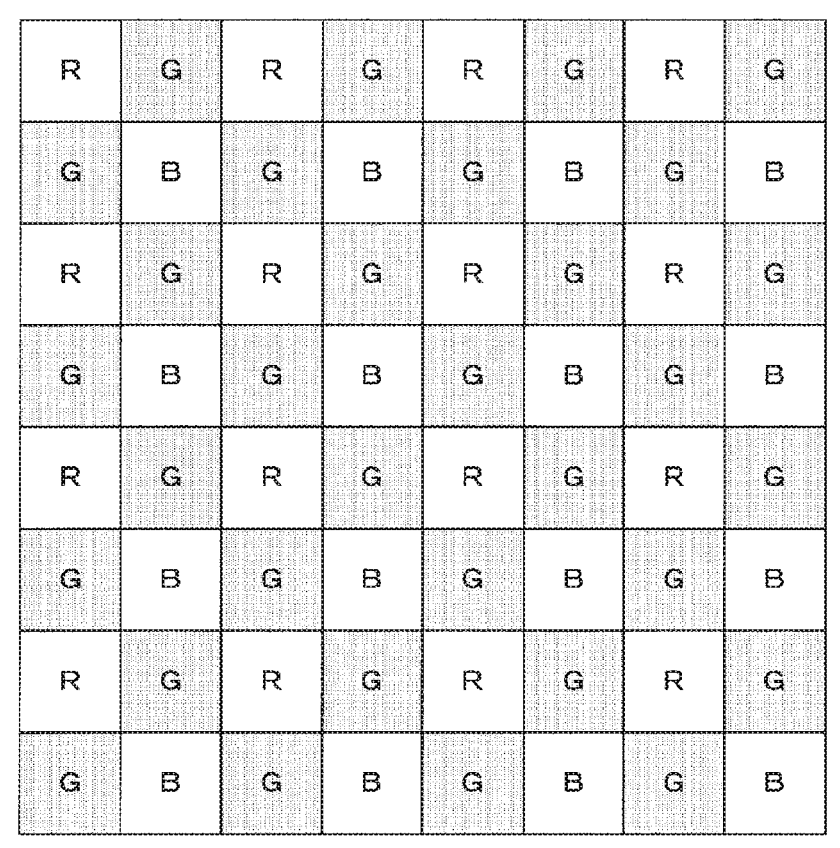

FIG. 25 is a diagram illustrating an example of the Bayer array of pixels in the pixel array unit 110 according to the embodiment of the present technology. In the Bayer array, rows in which R pixels and G pixels are alternately arranged and rows in which G pixels and B pixels are alternately arranged are alternately repeated. Focusing attention on the G pixel, the G pixel is disposed in a checkered pattern, and the R pixel or the B pixel is disposed in a spatial position where the G pixel is not present.

As described above, a pixel signal output from the pixel array unit 110 has alternately different color components in one row. Therefore, in the following example, pixel data is selected every other pixel and the same color components are to be arithmetic targets.

Figure 26:
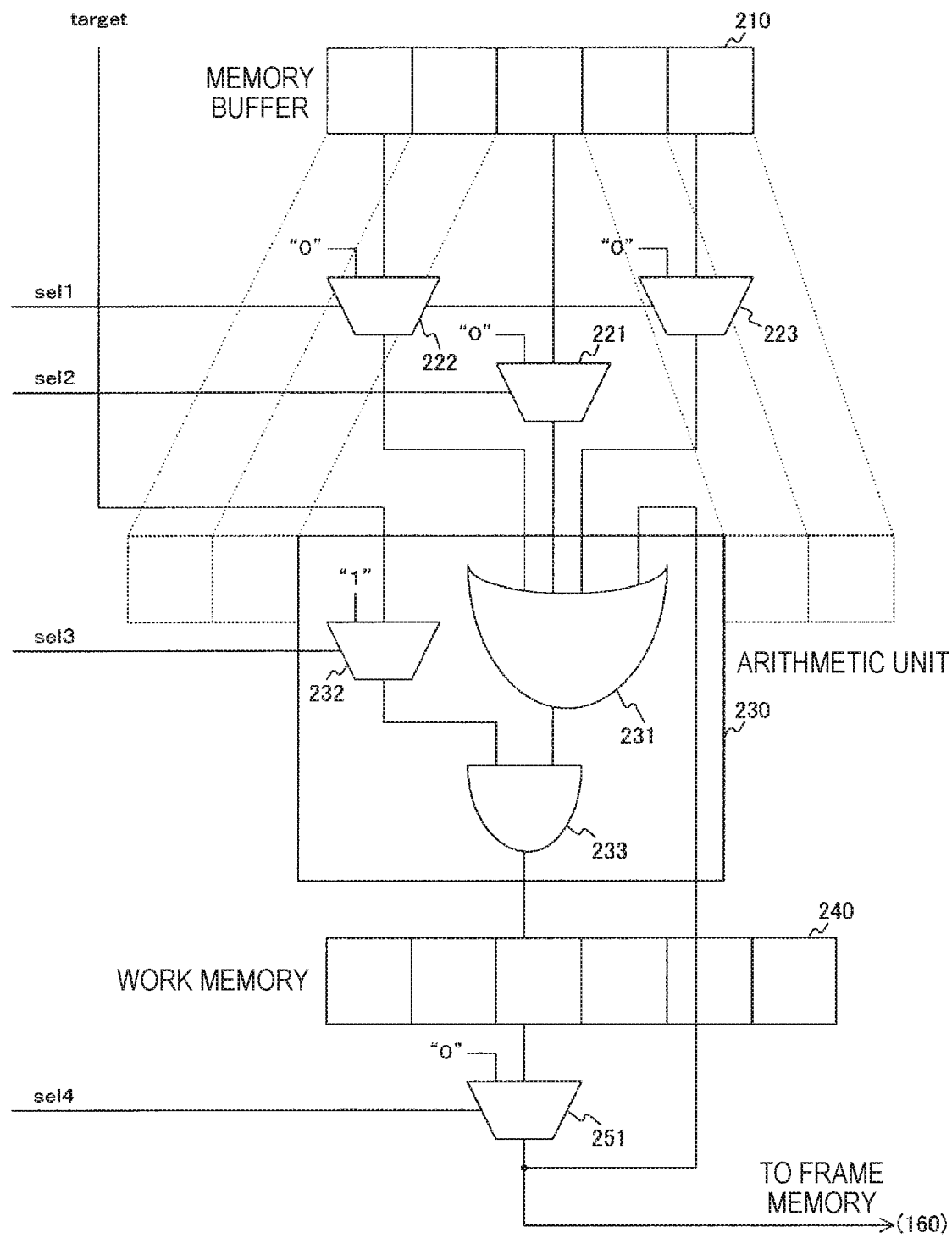
FIG. 26 is a diagram illustrating a configuration example of an inter-frame arithmetic processing unit 200 according to the first embodiment of the present technology.

FIG. 26 is a diagram illustrating a configuration example of the inter-frame arithmetic processing unit 200 according to the first embodiment of the present technology. In the first embodiment, it is assumed that parallel arithmetic of three columns is performed on a 3×3 pixel area. The inter-frame arithmetic processing unit 200 in the first embodiment includes a memory buffer 210, selectors 221 to 223, an arithmetic unit 230, a work memory 240, and a selector 251 corresponding to each column of one row. That is, these are basically provided for the number of columns of one row.

The memory buffer 210 is a buffer that stores the pixel data for one row read from the frame memory 160. The memory buffer 210 is used for performing the extension process.

The selectors 221 to 223 are selectors that select pixel data of one row to be supplied from the memory buffer 210 to the arithmetic unit 230. In this example, since it is assumed that at most three pixel data are referred to at once, the three selectors 221 to 223 are provided. The selector 221 selects pixel data at the center of the three pixel data. The selector 222 selects pixel data adjacent to the center leftward. The selector 223 selects pixel data adjacent to the center rightward. A selection signal sel2 is supplied from the control unit 190 to the selector 221. A common selection signal sel1 is supplied from the control unit 190 to the selectors 222 and 223. Note that, in the selectors 221 to 223, in a case in which the selection signal indicates "1", the pixel data from the memory buffer 210 of a right port is selected, and in a case in which the selection signal indicates "0", a value "0" of a left port is selected.

The arithmetic unit 230 is an arithmetic unit of column parallel provided corresponding to each pixel data of one row. In this figure, the configuration of the arithmetic unit 230 corresponding to the central pixel is shown, but the arithmetic unit 230 corresponding to another pixel has a similar configuration. One arithmetic unit 230 includes an OR circuit 231, a selector 232, and an AND circuit 233.

The OR circuit 231 is a circuit that performs an OR operation on the pixel data supplied from the selectors 221 to 223. That is, in a case in which an output from any one of the selectors 221 to 223 is "1", an output of the OR circuit 231 also becomes "1". On the other hand, in a case in which all outputs of the selectors 221 to 223 are "0", the output of the OR circuit 231 becomes "0".

The selector 232 is a selector that selects pixel data (target) of a row that becomes an arithmetic target in the current frame supplied from the binarization processing unit 140. A selection signal sel3 is supplied from the control unit 190 to the selector 232. In the selector 232, in a case in which the selection signal indicates "1", the pixel data from the binarization processing unit 140 of a right port is selected, and in a case in which the selection signal indicates "0", a value "1" of a left port is selected.

The AND circuit 233 is a circuit that performs an AND operation of the output of the OR circuit 231 and the output of the selector 232. That is, in a case in which the outputs of both of the OR circuit 231 and the selector 232 are "1", an output of the AND circuit 233 also becomes "1". On the other hand, in a case in which any of the outputs of the OR circuit 231 and the selector 232 is "0", the output of the OR circuit 231 becomes "0".

The work memory 240 is a memory that temporarily stores an arithmetic result of the pixel data of one row by the arithmetic unit 230. The arithmetic result stored in the work memory 240 is updated to the frame memory 160 through the selector 251 each time arithmetic of one row is completed.

The selector 251 is a selector that selects one of the arithmetic result and "0" corresponding to each of the arithmetic results stored in the work memory 240. A selection signal sel4 is supplied from the control unit 190 to the selector 251. In the selector 251, in a case in which the selection signal indicates "1", an arithmetic result from the work memory 240 of a right port is selected, and in a case in which the selection signal indicates "0", a value "0" of a left port is selected.

Figure 27:
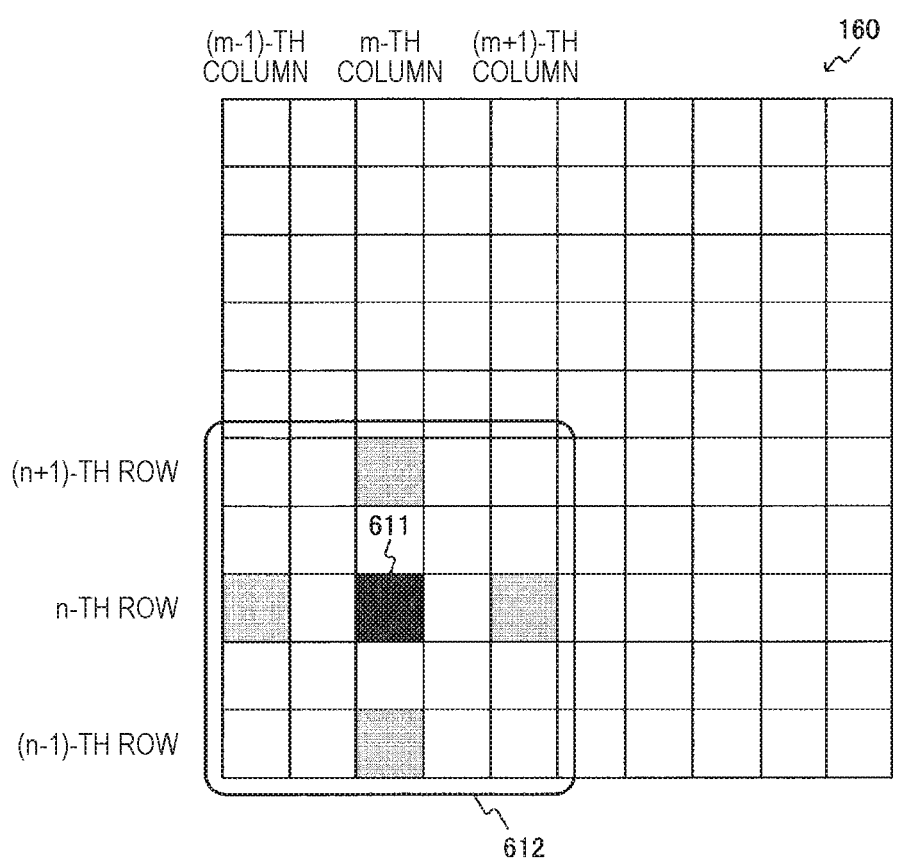
FIG. 27 is a diagram illustrating an example of a pixel disposition of an arithmetic target assumed in the first embodiment of the present technology.

FIG. 27 is a diagram illustrating an example of a pixel disposition of an arithmetic target assumed in the first embodiment of the present technology. In the first embodiment, the 3×3 pixel area is set as an arithmetic target 612 with respect to a center pixel 611. An adjacent pixel shown in gray is a candidate for the extended area. Note that, as described above, since the Bayer arrangement is assumed, in a case in which another color is included, it becomes a 5×5 pixel area. However, here, focusing on one color, it is referred to as the 3×3 pixel area. Hereinafter, a process procedure in this pixel disposition will be described with reference to a flowchart.

Figure 28:
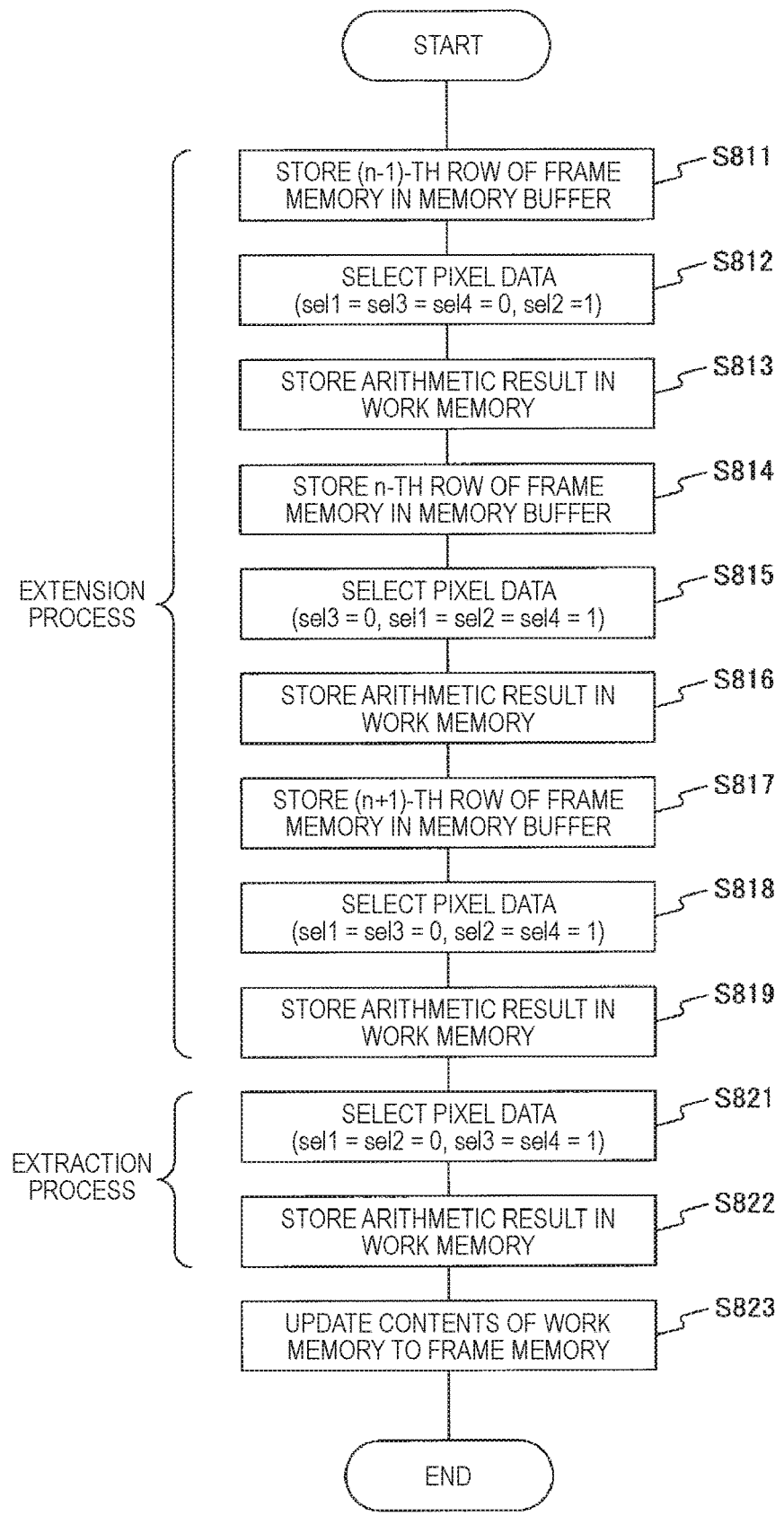
FIG. 28 is a flowchart illustrating an example of a process procedure by the inter-frame arithmetic processing unit 200 according to the first embodiment of the present technology.

FIG. 28 is a flowchart illustrating an example of a process procedure by the inter-frame arithmetic processing unit 200 according to the first embodiment of the present technology. In this example, in order to perform a process of an n-th row of the current frame, the extension process is performed with reference to the past frame in an order of an (n−1)-th row, the n-th row, and an (n+1)-th row, using the 3×3 pixel area as the arithmetic target 612. In addition, the extraction process is performed using the extended area obtained by the extension process. In the process of the n-th row of such a current frame, the process is performed in parallel on each column at the same time.

First, pixel data of the (n−1)-th row of the frame memory 160 is read and stored in the memory buffer 210 (step S811). In addition, each of sel1="0", sel2="1", sel3="0", and sel4="0" is supplied as the selection signals (step S812). Therefore, pixel data of an m-th column of the (n−1)-th row is selected. The arithmetic result by the arithmetic unit 230 is stored in the work memory 240 (step S813).

Next, pixel data of the n-th row of the frame memory 160 is read and stored in the memory buffer 210 (step S814). In addition, each of sel1="1", sel2="1", sel3="0", and sel4="1" is supplied as the selection signals (step S815). Therefore, pixel data of an (m−1)-th column, an m-th column, and an (m+1)-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S816).

Next, pixel data of the (n+1)-th row of the frame memory 160 is read and stored in the memory buffer 210 (step S817). In addition, each of sel1="0", sel2="1", sel3="0", and sel4="1" is supplied as the selection signals (step S818). Therefore, pixel data of an m-th column of the (n+1)-th row is selected. In addition, the content stored in the immediately preceding work memory 240 is also selected, and the OR operation by the OR circuit 231 is performed. The arithmetic result by the arithmetic unit 230 is stored in the work memory 240 (step S819).

The process up to this point corresponds to the extension process. Hereinafter, the extraction process is performed. Each of sel1="0", sel2="0", sel3="1", and sel4="1" is supplied as the selection signals (step S821). Therefore, the AND operation between the pixel data of the current frame and the extended area is performed by the AND circuit 233. The arithmetic result by the arithmetic unit 230 is stored in the work memory 240 (step S822).

Therefore, since the process for the n-th row of the current frame is completed, the contents of the work memory 240 are updated to the frame memory 160 (step S823). In this manner, the process for each row of the current frame is repeated.

4. Second Embodiment

Figure 29:
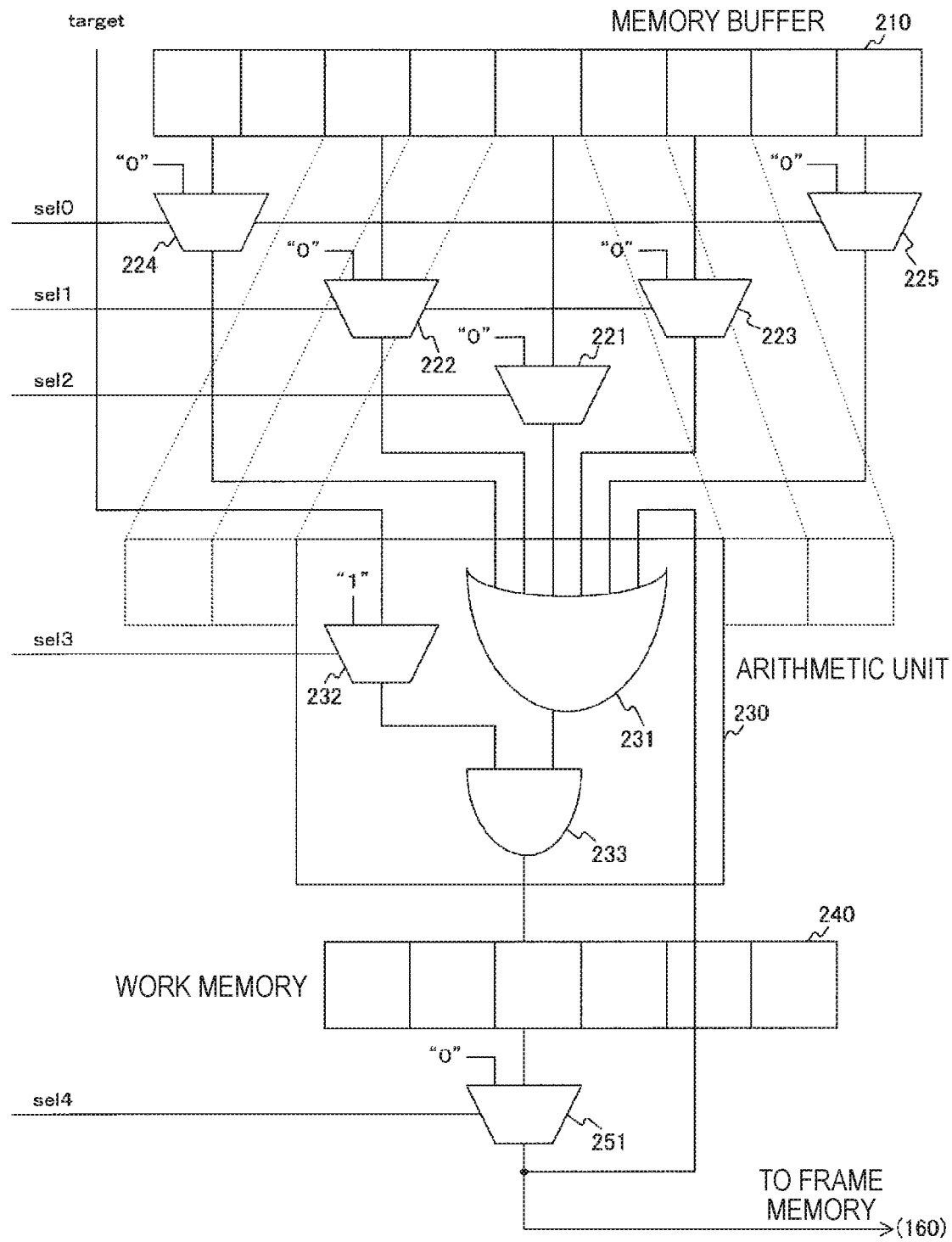
FIG. 29 is a diagram illustrating a configuration example of the inter-frame arithmetic processing unit 200 according to a second embodiment of the present technology.

FIG. 29 is a diagram illustrating a configuration example of the inter-frame arithmetic processing unit 200 according to the second embodiment of the present technology. In the second embodiment, it is assumed that parallel arithmetic of five columns is performed on a 5×5 pixel area. The inter-frame arithmetic processing unit 200 in the second embodiment includes the memory buffer 210, selectors 221 to 225, the arithmetic unit 230, the work memory 240, and the selector 251 corresponding to each column of one row. Compared to the first embodiment, the number of selectors increases as the input pixel data increases, and the number of inputs to the OR circuit 231 also increases. The other points are similar to those of the first embodiment.

The selectors 221 to 225 are selectors that select pixel data of one row to be supplied from the memory buffer 210 to the arithmetic unit 230. In this example, since it is assumed that at most five pixel data are referred to at once, the five selectors 221 to 225 are provided. The selector 221 selects pixel data at the center of the five pixel data. The selector 222 selects pixel data adjacent to the center leftward. The selector 223 selects pixel data adjacent to the center rightward. The selector 224 selects two pixel data adjacent to the center leftward. The selector 225 selects two pixel data adjacent to the center rightward.

A selection signal sel2 is supplied from the control unit 190 to the selector 221. A common selection signal sel1 is supplied from the control unit 190 to the selectors 222 and 223. A common selection signal sel0 is supplied from the control unit 190 to the selectors 224 and 225. Note that, in the selectors 221 to 225, in a case in which the selection signal indicates "1", the pixel data from the memory buffer 210 of the right port is selected, and in a case in which the selection signal indicates "0", the value "0" of the left port is selected.

Figure 30:
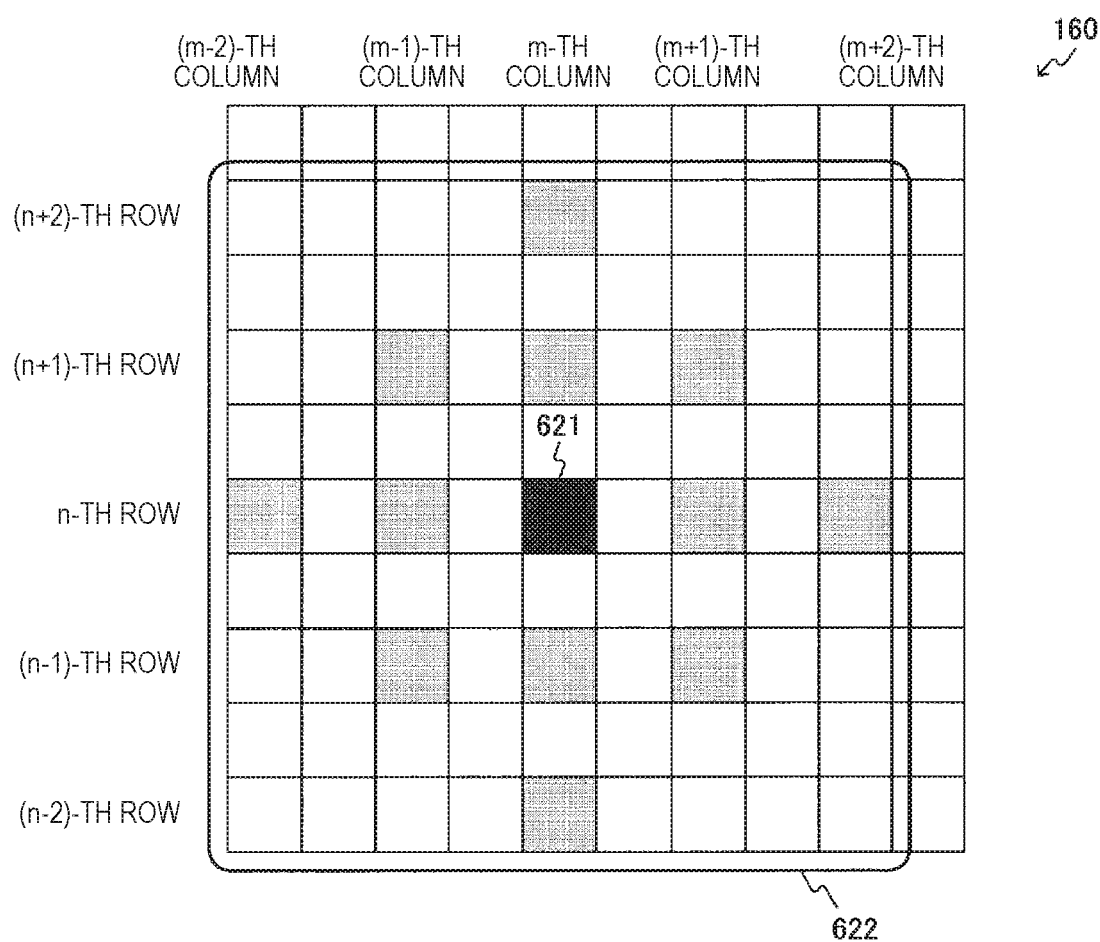
FIG. 30 is a diagram illustrating an example of a pixel disposition of an arithmetic target assumed in the second embodiment of the present technology.

FIG. 30 is a diagram illustrating an example of a pixel disposition of an arithmetic target assumed in the second embodiment of the present technology. In the second embodiment, the 5×5 pixel area is set as an arithmetic target 622 with respect to a center pixel 621. An adjacent pixel shown in gray is a candidate for the extended area. Note that, as described above, since the Bayer arrangement is assumed, in a case in which another color is included, it becomes a 9×9 pixel area. However, here, focusing on one color, it is referred to as the 5×5 pixel area. Hereinafter, a process procedure in this pixel disposition will be described with reference to a flowchart.

Figure 31:
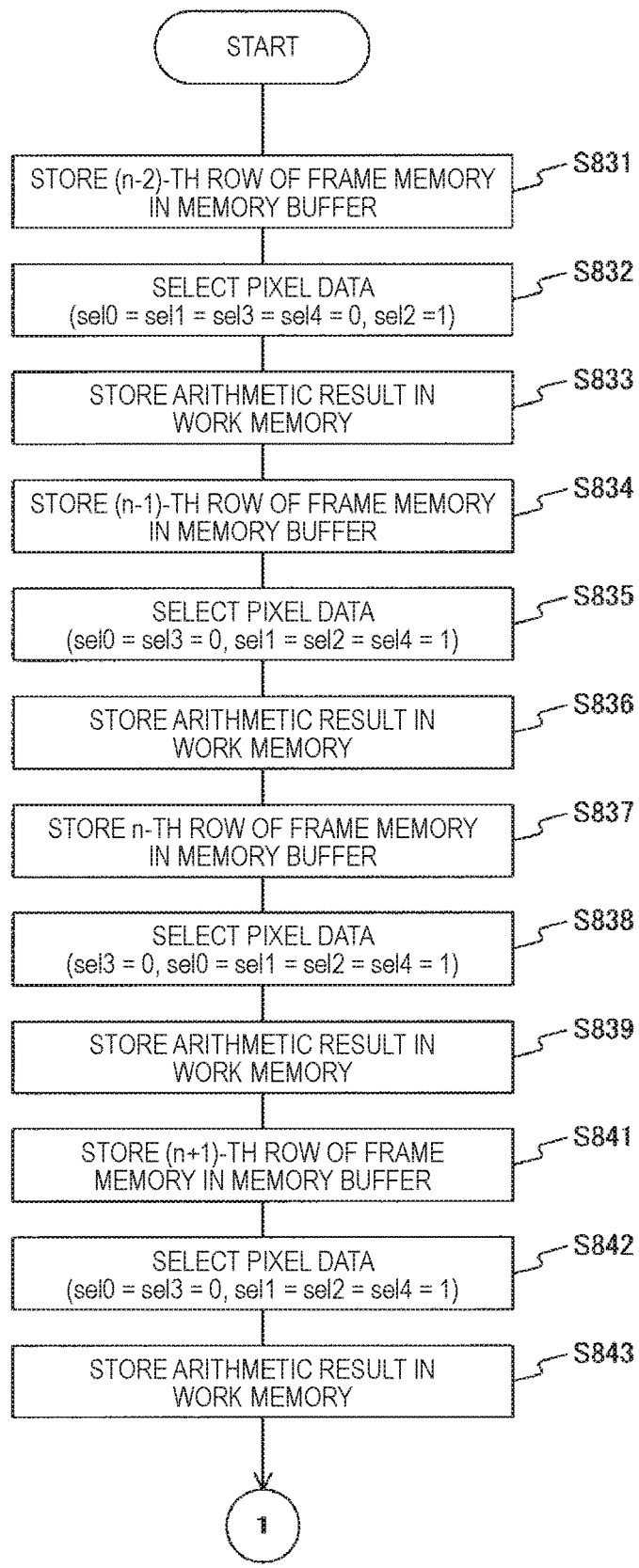
FIG. 31 is a flowchart illustrating an example of a process procedure by the inter-frame arithmetic processing unit 200 according to the second embodiment of the present technology.
Figure 32:
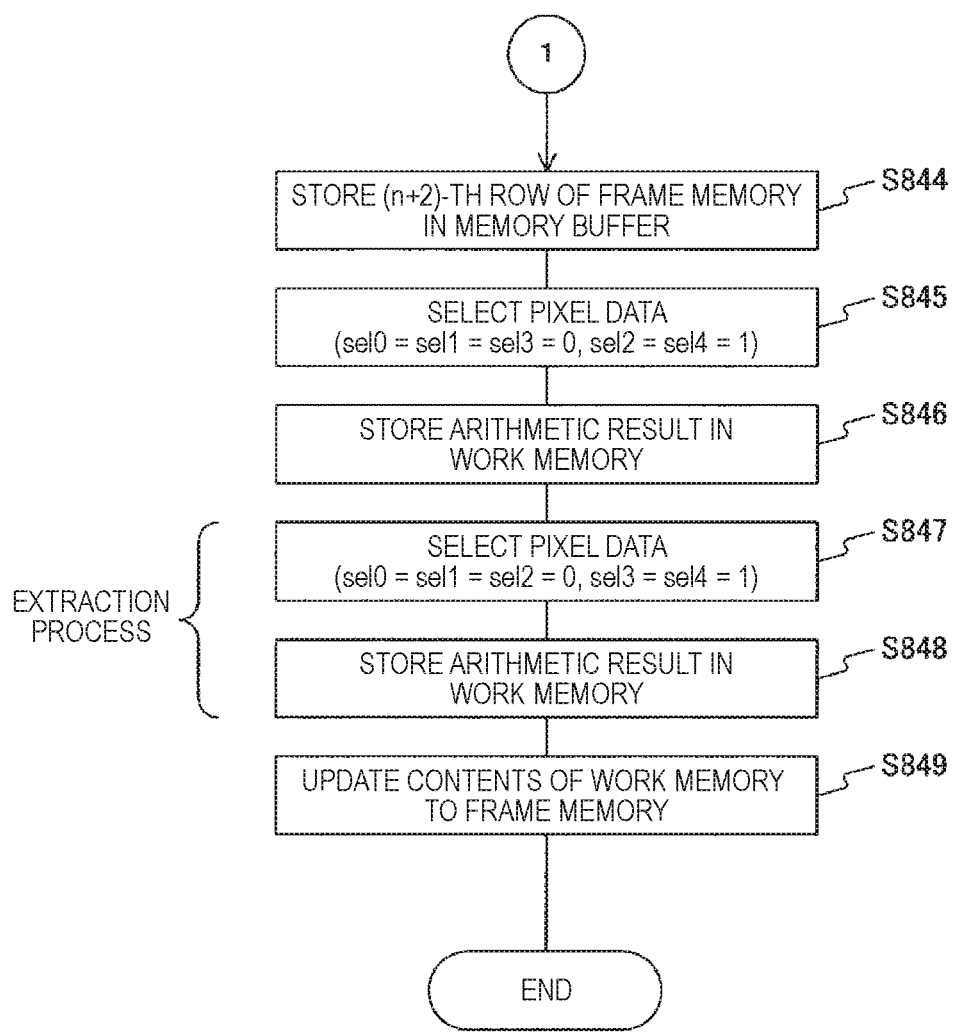
FIG. 32 is a flowchart illustrating an example of a process procedure by the inter-frame arithmetic processing unit 200 according to the second embodiment of the present technology.

FIGS. 31 and 32 are flowcharts illustrating a process procedure example by the inter-frame arithmetic processing unit 200 according to the second embodiment of the present technology. In this example, in order to perform a process of an n-th row of the current frame, the extension process is performed with reference to the past frame in an order of an (n−2)-th row, an (n−1)-th row, the n-th row, an (n+1)-th row, and an (n+2)-th row using the 5×5 pixel area as the arithmetic target 622. In addition, the extraction process is performed using the extended area obtained by the extension process. In the process of the n-th row of such a current frame, the process is performed in parallel on each column at the same time.

First, pixel data of the (n−2)-th row of the frame memory 160 is read and stored in the memory buffer 210 (step S831). In addition, each of sel0="0", sel1="0", sel2="1", sel3="0", and sel4="0" is supplied as the selection signals (step S832). Therefore, pixel data of an m-th column of the (n−2)-th row is selected. The arithmetic result by the arithmetic unit 230 is stored in the work memory 240 (step S833).

Next, pixel data of the (n−1)-th row of the frame memory 160 is read and stored in the memory buffer 210 (step S834). In addition, each of sel0="0", sel1="1", sel2="1", sel3="0", and sel4="1" is supplied as the selection signals (step S835). Therefore, pixel data of an (m−1)-th column, an m-th column, and an (m+1)-th column of the (n−1)-th row are selected. In addition, the content stored in an immediately preceding work memory 240 is also selected, and the OR operation by the OR circuit 231 is performed. The arithmetic result by the arithmetic unit 230 is stored in the work memory 240 (step S836).

Next, pixel data of the n-th row of the frame memory 160 is read and stored in the memory buffer 210 (step S837). In addition, each of sel0="1", sel1="1", sel2="1", sel3="0", and sel4="1" is supplied as the selection signals (step S838). Therefore, pixel data of an (m−2)-th column, an (m−1)-th column, an m-th column, an (m+1)-th column, and an (m+2)-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S839).

Next, pixel data of the (n+1)-th row of the frame memory 160 is read and stored in the memory buffer 210 (step S841). In addition, each of sel0="0", sel1="1", sel2="1", sel3="0", and sel4="1" is supplied as the selection signals (step S842). Therefore, pixel data of an (m−1)-th column, an m-th column, and (m+1)-th column of the (n+1)-th row is selected. In addition, the content stored in the immediately preceding work memory 240 is also selected, and the OR operation by the OR circuit 231 is performed. The arithmetic result by the arithmetic unit 230 is stored in the work memory 240 (step S843).

Next, pixel data of the (n+2)-th row of the frame memory 160 is read and stored in the memory buffer 210 (step S844). In addition, each of sel0="0", sel1="0", sel2="1", sel3="0", and sel4="1" is supplied as the selection signals (step S845). Therefore, pixel data of an m-th column of the (n+2)-th row is selected. In addition, the content stored in the immediately preceding work memory 240 is also selected, and the OR operation by the OR circuit 231 is performed. The arithmetic result by the arithmetic unit 230 is stored in the work memory 240 (step S846).

The process up to this point corresponds to the extension process. Hereinafter, the extraction process is performed. Each of sel0="0", sel1="0", sel2="0", sel3="1", and sel4="1" is supplied as the selection signals (step S847). Therefore, the AND operation between the pixel data of the current frame and the extended area is performed by the AND circuit 233. The arithmetic result by the arithmetic unit 230 is stored in the work memory 240 (step S848).

Therefore, since the process for the n-th row of the current frame is completed, the contents of the work memory 240 are updated to the frame memory 160 (step S849). In this manner, the process for each row of the current frame is repeated.

5. Third Embodiment

In the third embodiment of the present technology, it is assumed that parallel arithmetic of three columns is performed for a 5×5 pixel area. The inter-frame arithmetic processing unit 200 in the third embodiment has a configuration similar to that of the inter-frame arithmetic processing unit 200 described in the first embodiment as described above. Therefore, here, a detailed description of the configuration is omitted.

Figure 33:
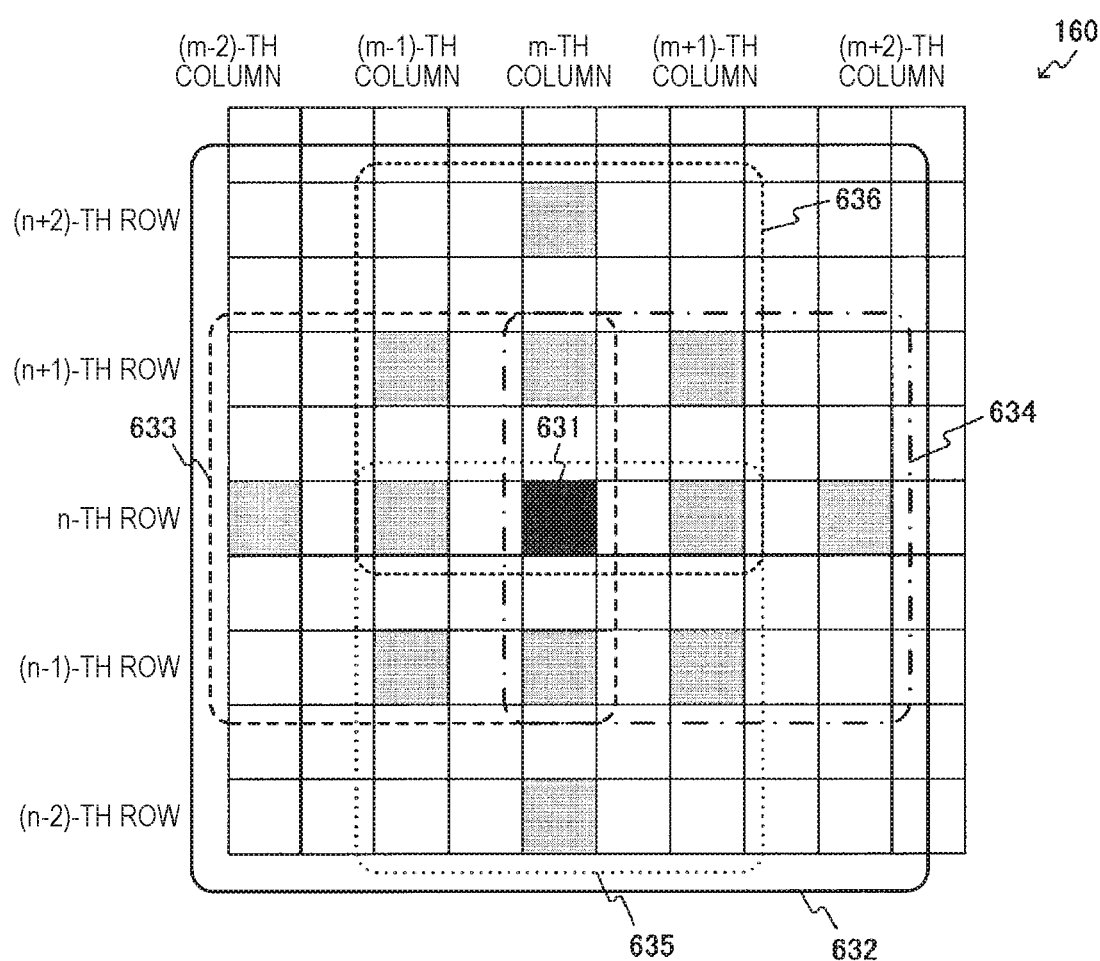
FIG. 33 is a diagram illustrating an example of a pixel disposition of an arithmetic target assumed in a third embodiment of the present technology.
Figure 34:
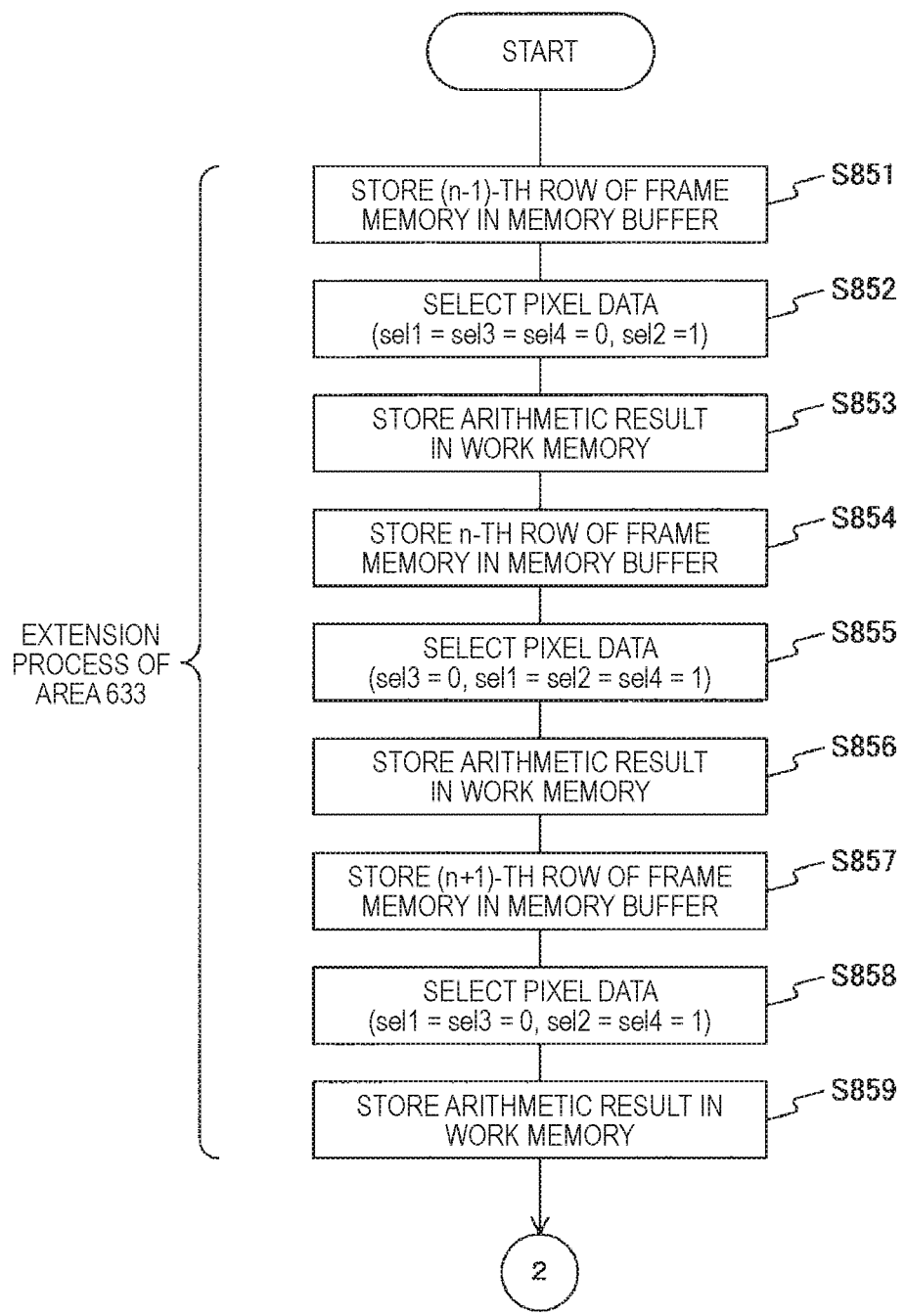
FIG. 34 is a flowchart illustrating an example of a process procedure by the inter-frame arithmetic processing unit 200 according to the third embodiment of the present technology.
Figure 35:
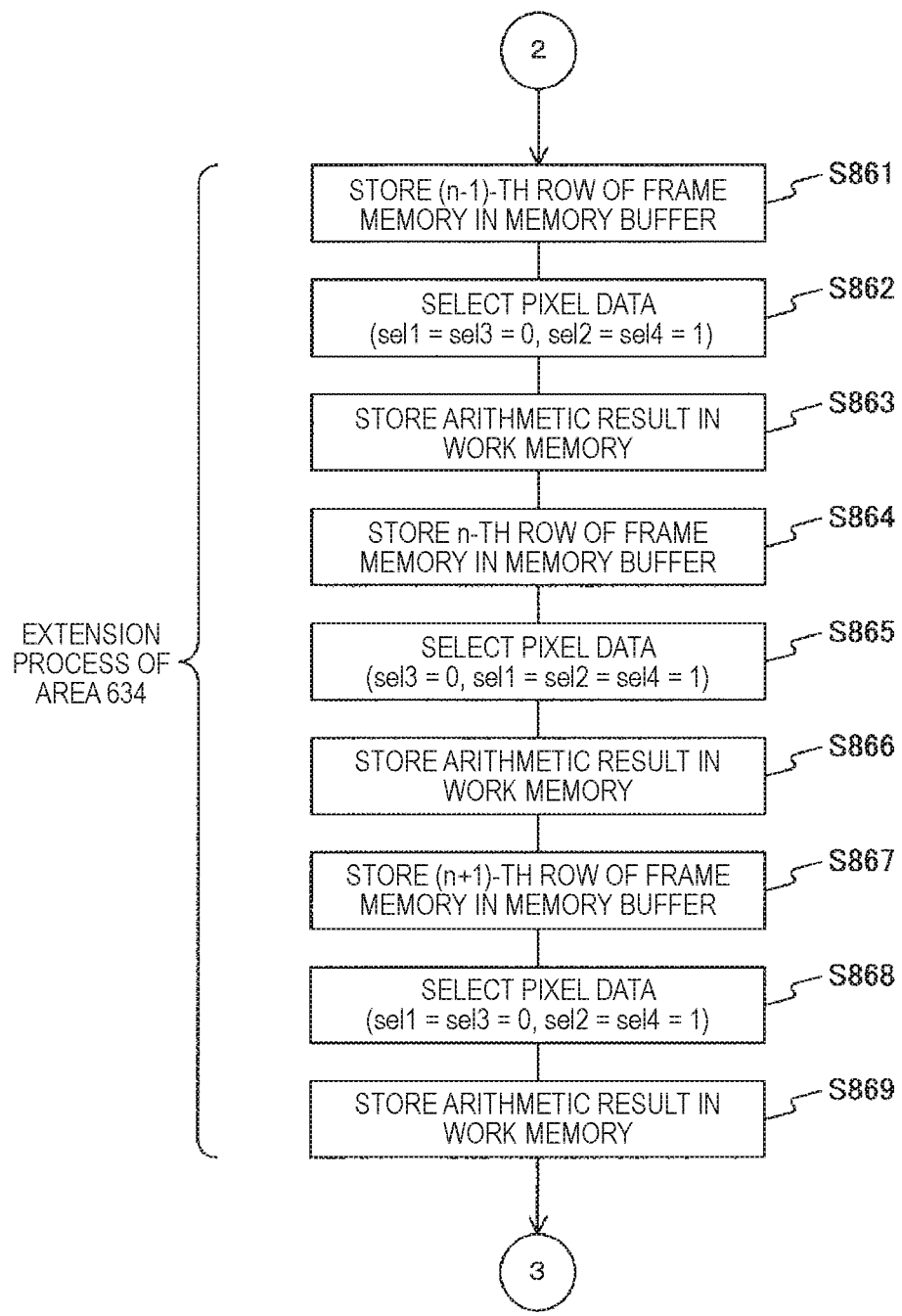
FIG. 35 is a flowchart illustrating an example of a process procedure by the inter-frame arithmetic processing unit 200 according to the third embodiment of the present technology.
Figure 36:
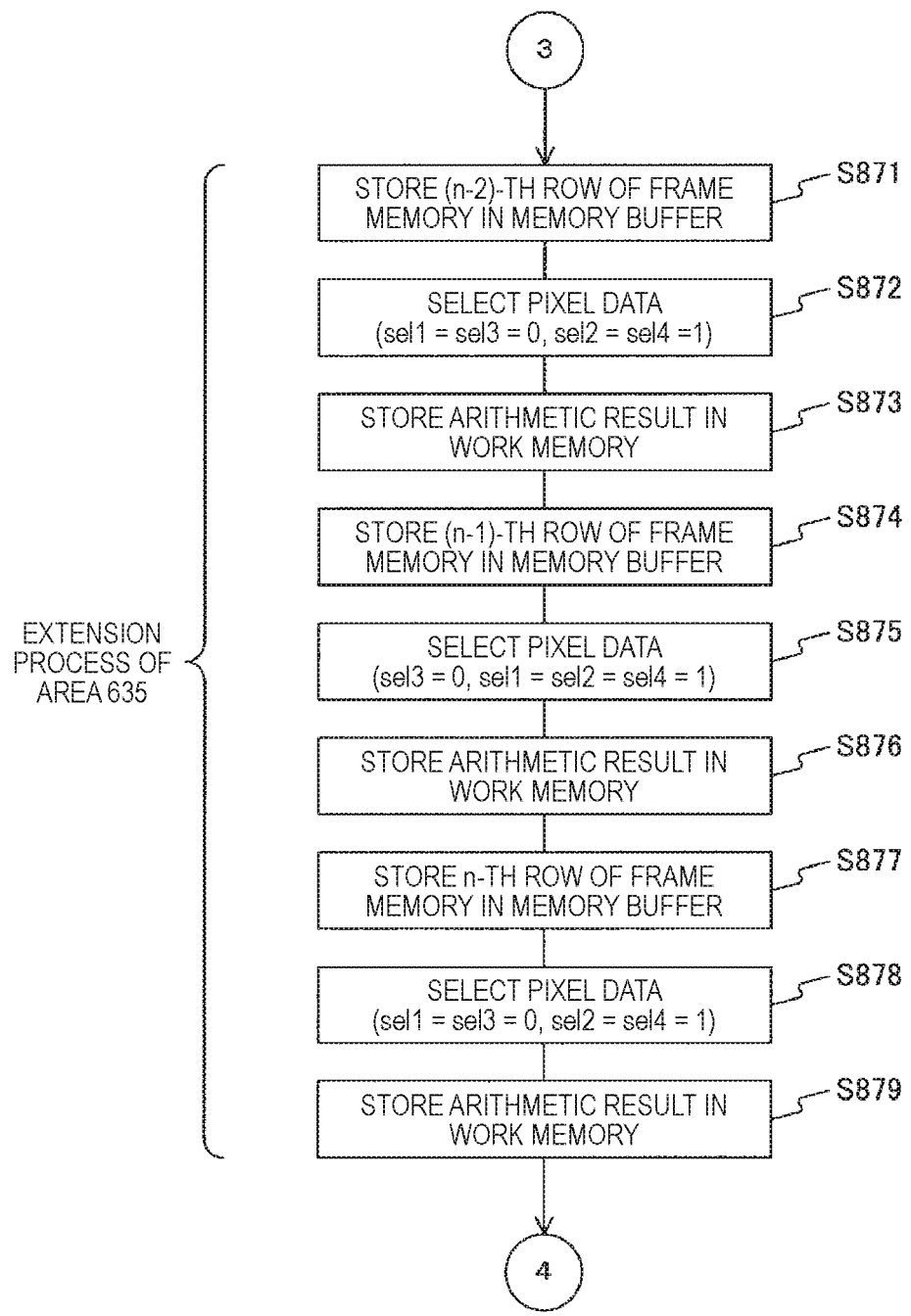
FIG. 36 is a flowchart illustrating an example of a process procedure by the inter-frame arithmetic processing unit 200 according to the third embodiment of the present technology.
Figure 37:
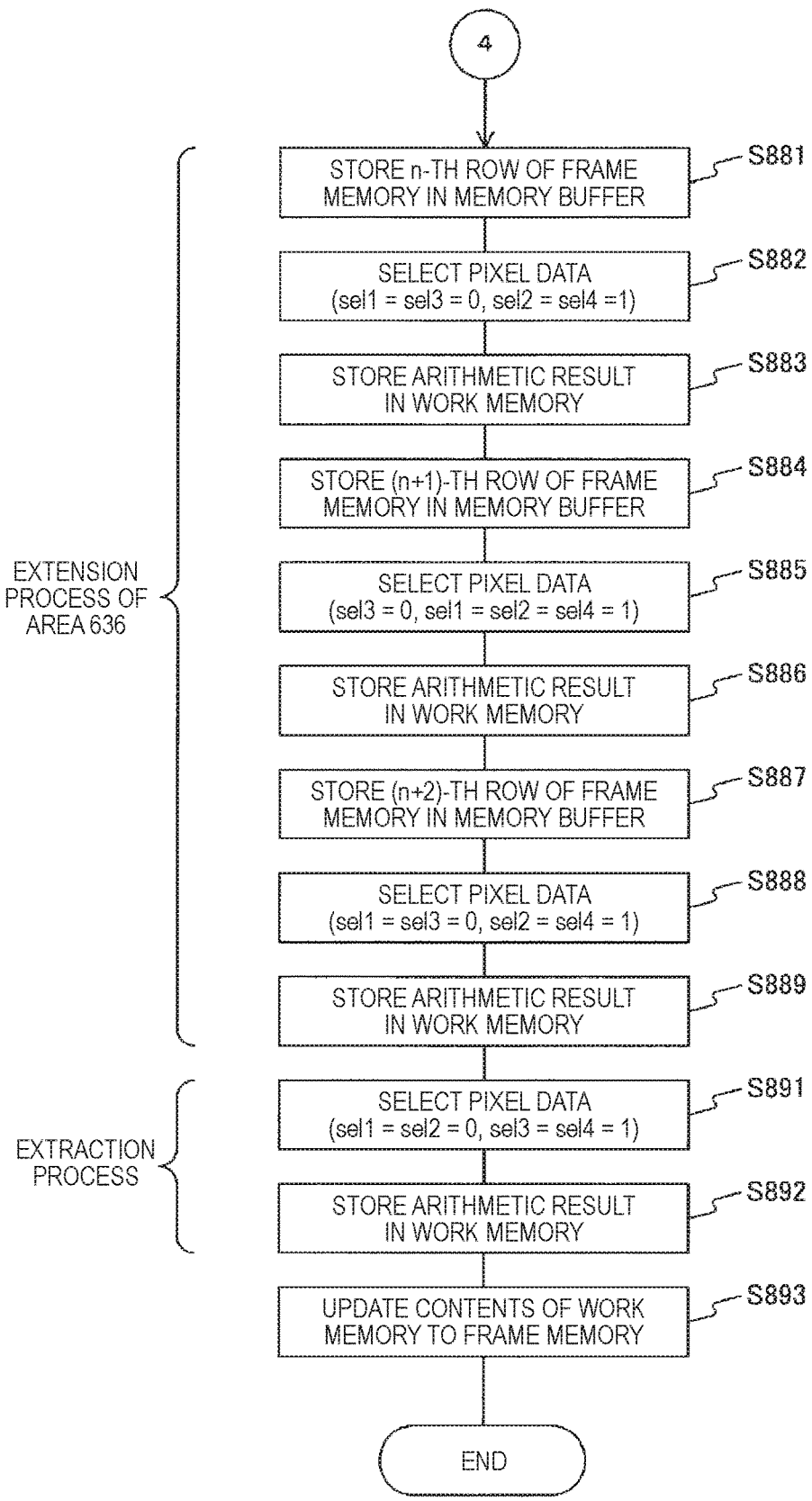
FIG. 37 is a flowchart illustrating an example of a process procedure by the inter-frame arithmetic processing unit 200 according to the third embodiment of the present technology.

FIG. 33 is a diagram illustrating an example of a pixel disposition of an arithmetic target assumed in the third embodiment of the present technology. In the third embodiment, the 5×5 pixel area is set as an arithmetic target 632 with respect to a center pixel 631. An adjacent pixel shown in gray is a candidate for the extended area. Note that, as described above, since the Bayer arrangement is assumed, in a case in which another color is included, it becomes a 9×9 pixel area. However, here, focusing on one color, it is referred to as the 5×5 pixel area.

In addition, in the third embodiment, since it is assumed that the parallel arithmetic of the three columns is performed in each of the arithmetic units 230, the arithmetic target 632 is divided into four arithmetic areas 633 to 636 and arithmetic is performed. Each of the arithmetic areas 633 to 636 are 3×3 pixel areas centered on pixels shifted upward, downward, leftward and rightward by one pixel from the center pixel 631, and are bilateral symmetry. Hereinafter, a process procedure in this pixel disposition will be described with reference to a flowchart.

FIGS. 34 to 37 are flowcharts illustrating a process procedure example by the inter-frame arithmetic processing unit 200 according to the third embodiment of the present technology. In this example, in order to perform a process of an n-th row of the current frame, the extension process is performed with reference to the past frame in an order of the four arithmetic areas 633 to 636. In addition, the extraction process is performed using the extended area obtained by the extension process. In the process of the n-th row of such a current frame, the process is performed in parallel on each column at the same time.

First, the following steps S851 to S859 are performed on the arithmetic area 633 offset from the center pixel 631 leftward by one pixel. First, pixel data of the (n−1)-th row of the frame memory 160 is read and stored in the memory buffer 210 (step S851). In addition, each of sel1="0", sel2="1", sel3="0", and sel4="0" is supplied as the selection signals (step S852). Therefore, pixel data of an (m−1)-th column of the (n−1)-th row is selected. The arithmetic result by the arithmetic unit 230 is stored in the work memory 240 (step S853).

Next, pixel data of the n-th row of the frame memory 160 is read and stored in the memory buffer 210 (step S854). In addition, each of sel1="1", sel2="1", sel3="0", and sel4="1" is supplied as the selection signals (step S855). Therefore, pixel data of an (m−2)-th column, an (m−1)-th column, and an m-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S856).

Next, pixel data of the (n+1)-th row of the frame memory 160 is read and stored in the memory buffer 210 (step S857). In addition, each of sel1="0", sel2="1", sel3="0", and sel4="1" is supplied as the selection signals (step S858). Therefore, pixel data of an (m−1)-th column of the (n+1)-th row is selected. In addition, the content stored in an immediately preceding work memory 240 is also selected, and the OR operation by the OR circuit 231 is performed. The arithmetic result by the arithmetic unit 230 is stored in the work memory 240 (step S859).

Next, processes of the following steps S861 to S869 are performed on the arithmetic area 634 offset from the center pixel 631 rightward by one pixel. First, pixel data of the (n−1)-th row of the frame memory 160 is read and stored in the memory buffer 210 (step S861). In addition, each of sel1="0", sel2="1", sel3="0", and sel4="1" is supplied as the selection signals (step S862). Therefore, pixel data of an (m+1)-th column of the (n−1)-th row is selected. The arithmetic result by the arithmetic unit 230 is stored in the work memory 240 (step S863).

Next, pixel data of the n-th row of the frame memory 160 is read and stored in the memory buffer 210 (step S864). In addition, each of sel1="1", sel2="1", sel3="0", and sel4="1" is supplied as the selection signals (step S865). Therefore, pixel data of an m-th column, an (m+1)-th column, and an (m+2)-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S866).

Next, pixel data of the (n+1)-th row of the frame memory 160 is read and stored in the memory buffer 210 (step S867). In addition, each of sel1="0", sel2="1", sel3="0", and sel4="1" is supplied as the selection signals (step S868). Therefore, pixel data of an (m+1)-th column of the (n+1)-th row is selected. In addition, the content stored in an immediately preceding work memory 240 is also selected, and the OR operation by the OR circuit 231 is performed. The arithmetic result by the arithmetic unit 230 is stored in the work memory 240 (step S869).

Next, processes of the following steps S871 to S879 are performed on the arithmetic area 635 offset from the center pixel 631 downward by one pixel. First, pixel data of the (n−2)-th row of the frame memory 160 is read and stored in the memory buffer 210 (step S871). In addition, each of sel1="0", sel2="1", sel3="0", and sel4="1" is supplied as the selection signals (step S872). Therefore, pixel data of an m-th column of the (n−2)-th row is selected. The arithmetic result by the arithmetic unit 230 is stored in the work memory 240 (step S873).

Next, pixel data of the (n−1)-th row of the frame memory 160 is read and stored in the memory buffer 210 (step S874). In addition, each of sel1="1", sel2="1", sel3="0", and sel4="1" is supplied as the selection signals (step S875). Therefore, pixel data of an (m−1)-th column, an m-th column, and an (m+1)-th column of the (n−1)-th row are selected. In addition, the content stored in an immediately preceding work memory 240 is also selected, and the OR operation by the OR circuit 231 is performed. The arithmetic result by the arithmetic unit 230 is stored in the work memory 240 (step S876).

Next, pixel data of the n-th row of the frame memory 160 is read and stored in the memory buffer 210 (step S877). In addition, each of sel1="0", sel2="1", sel3="0", and sel4="1" is supplied as the selection signals (step S878). Therefore, pixel data of an m-th column of the n-th row is selected. In addition, the content stored in an immediately preceding work memory 240 is also selected, and the OR operation by the OR circuit 231 is performed. The arithmetic result by the arithmetic unit 230 is stored in the work memory 240 (step S879).

Next, processes of the following steps S881 to S889 are performed on the arithmetic area 636 offset from the center pixel 631 upward by one pixel. First, pixel data of the n-th row of the frame memory 160 is read and stored in the memory buffer 210 (step S881). In addition, each of sel1="0", sel2="1", sel3="0", and sel4="1" is supplied as the selection signals (step S882). Therefore, pixel data of an m-th column of the n-th row is selected. The arithmetic result by the arithmetic unit 230 is stored in the work memory 240 (step S883).

Next, pixel data of the (n+1)-th row of the frame memory 160 is read and stored in the memory buffer 210 (step S884). In addition, each of sel1="1", sel2="1", sel3="0", and sel4="1" is supplied as the selection signals (step S885). Therefore, pixel data of an (m−1)-th column, an m-th column, and an (m+1)-th column of the (n+1)-th row are selected. In addition, the content stored in an immediately preceding work memory 240 is also selected, and the OR operation by the OR circuit 231 is performed. The arithmetic result by the arithmetic unit 230 is stored in the work memory 240 (step S886).

Next, pixel data of the (n+2)-th row of the frame memory 160 is read and stored in the memory buffer 210 (step S887). In addition, each of sel1="0", sel2="1", sel3="0", and sel4="1" is supplied as the selection signals (step S888). Therefore, pixel data of an m-th column of the (n+2)-th row is selected. In addition, the content stored in an immediately preceding work memory 240 is also selected, and the OR operation by the OR circuit 231 is performed. The arithmetic result by the arithmetic unit 230 is stored in the work memory 240 (step S889).

The process up to this point corresponds to the extension process. Hereinafter, the extraction process is performed. Each of sel1="0", sel2="0", sel3="1", and sel4="1" is supplied as the selection signals (step S891). Therefore, the AND operation between the pixel data of the current frame and the extended area is performed by the AND circuit 233. The arithmetic result by the arithmetic unit 230 is stored in the work memory 240 (step S892).

Therefore, since the process for the n-th row of the current frame is completed, the contents of the work memory 240 are updated to the frame memory 160 (step S893). In this manner, the process for each row of the current frame is repeated.

6. Fourth Embodiment

In the third embodiment described above, since the selection signal of the selectors 222 and 223 are controlled to be common, the process is performed bilaterally symmetrically with respect to the center pixel 631, the target areas overlap. On the other hand, in the fourth embodiment, selection signals of the selectors 222 and 223 are individually provided, thereby improving process efficiency.

Figure 38:
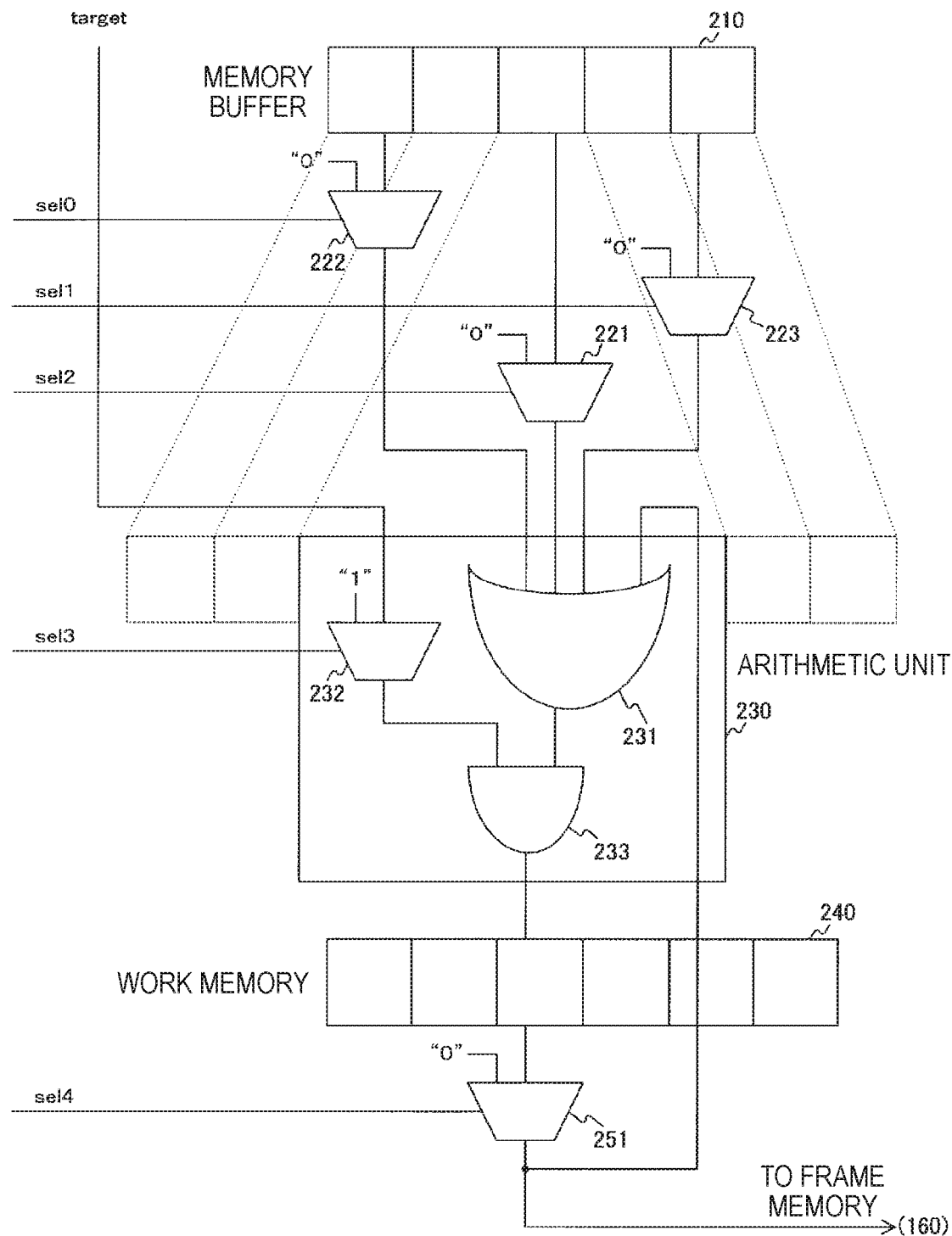
FIG. 38 is a diagram illustrating a configuration example of the inter-frame arithmetic processing unit 200 according to a fourth embodiment of the present technology.

FIG. 38 is a diagram illustrating a configuration example of the inter-frame arithmetic processing unit 200 according to the fourth embodiment of the present technology. In the fourth embodiment, it is assumed that parallel arithmetic of three columns is performed on a 5×5 pixel area. Basically, the inter-frame arithmetic processing unit 200 according to the fourth embodiment has a configuration similar to that of the third embodiment. However, the fourth embodiment is different from the third embodiment in that the selection signals of the selectors 222 and 223 are individually provided, the selection signal sel0 is supplied from the control unit 190 to the selector 222, and the selection signal sel1 is supplied to the selector 223.

Figure 39:
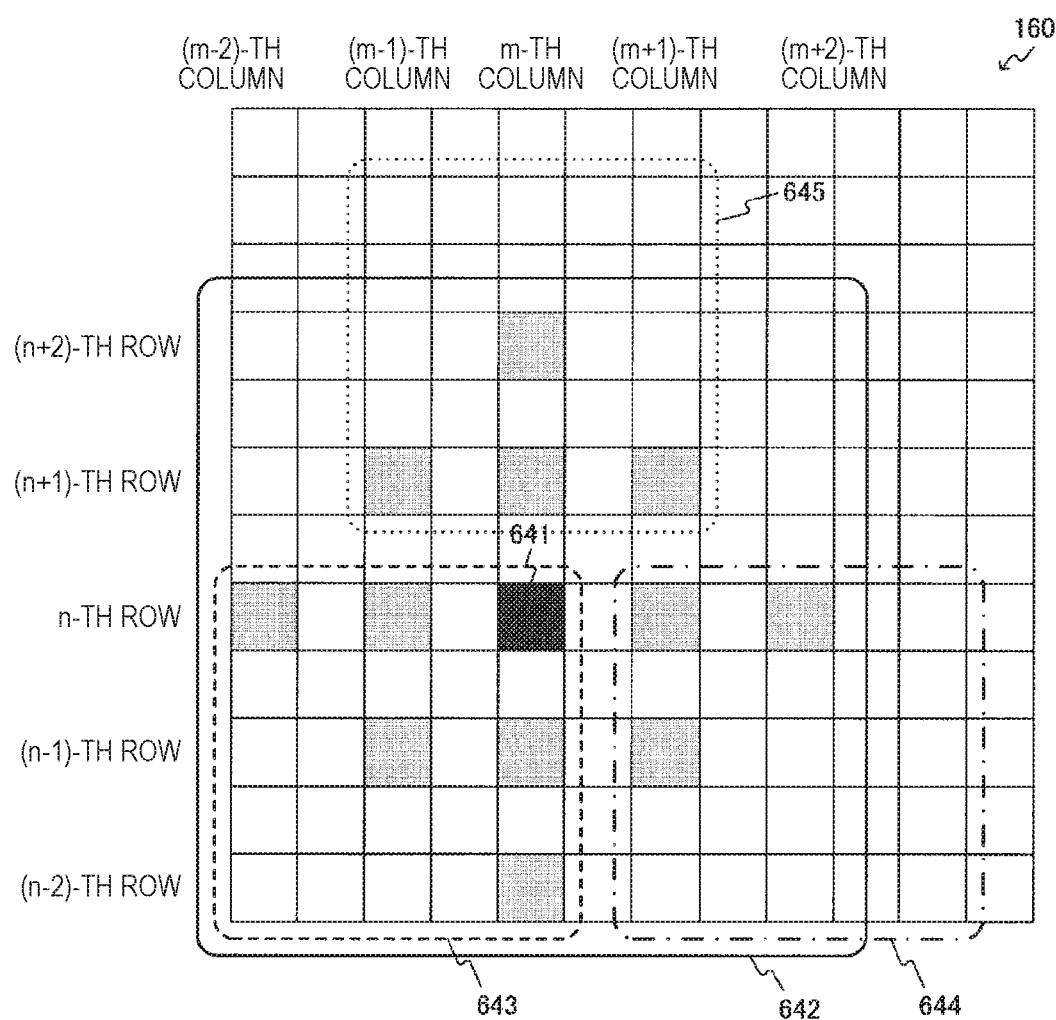
FIG. 39 is a diagram illustrating an example of a pixel disposition of an arithmetic target assumed in the fourth embodiment of the present technology.

FIG. 39 is a diagram illustrating an example of a pixel disposition of an arithmetic target assumed in the fourth embodiment of the present technology. In the fourth embodiment, the 5×5 pixel area is set as an arithmetic target 642 with respect to a center pixel 641. An adjacent pixel shown in gray is a candidate for the extended area. In addition, in the fourth embodiment, the arithmetic target 642 is divided into three arithmetic areas 643 to 645 which are left-right asymmetric and arithmetic is performed. Hereinafter, a process procedure in this pixel disposition will be described with reference to a flowchart.

Figure 40:
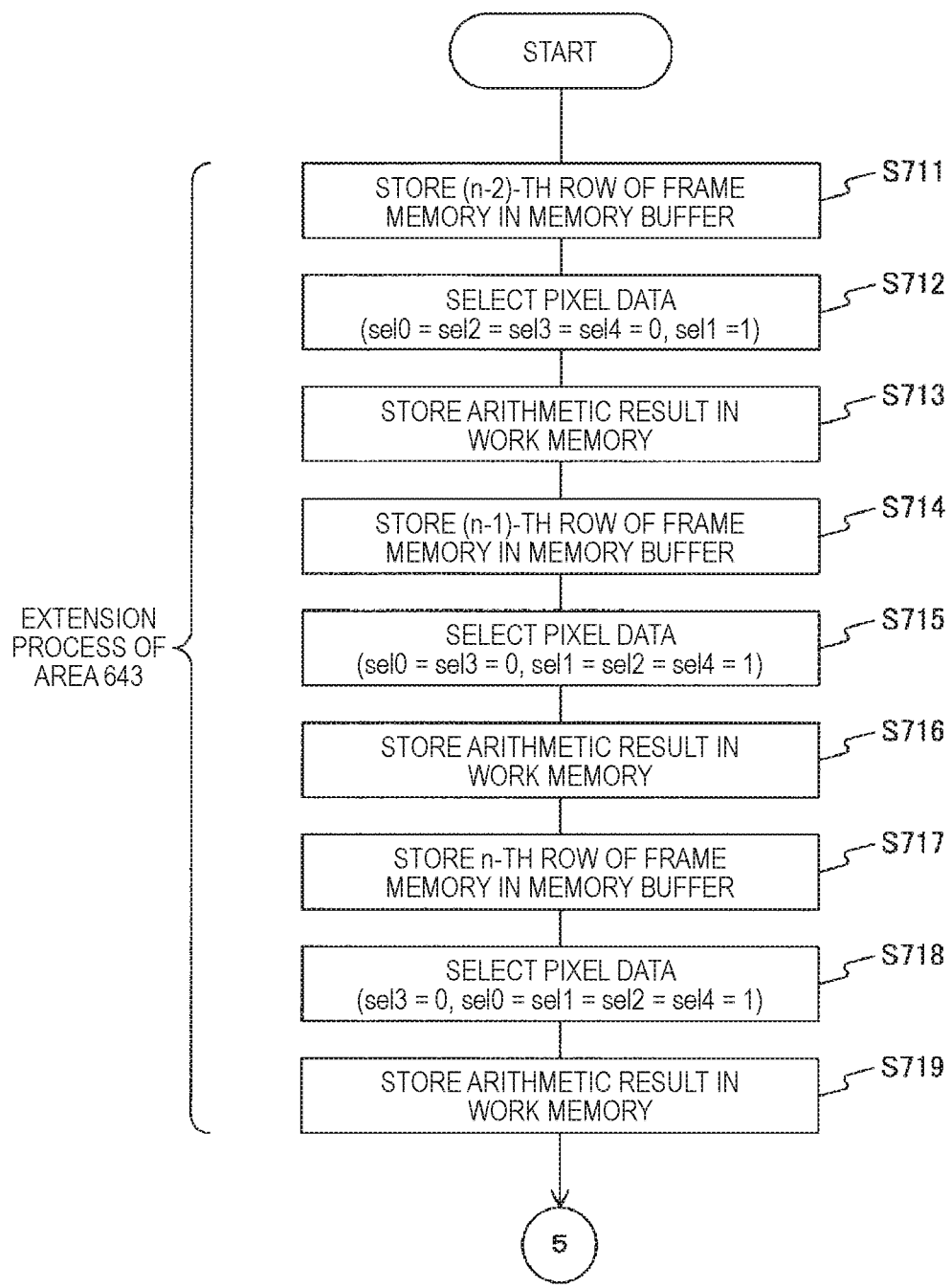
FIG. 40 is a flowchart illustrating an example of a process procedure by the inter-frame arithmetic processing unit 200 according to the fourth embodiment of the present technology.
Figure 41:
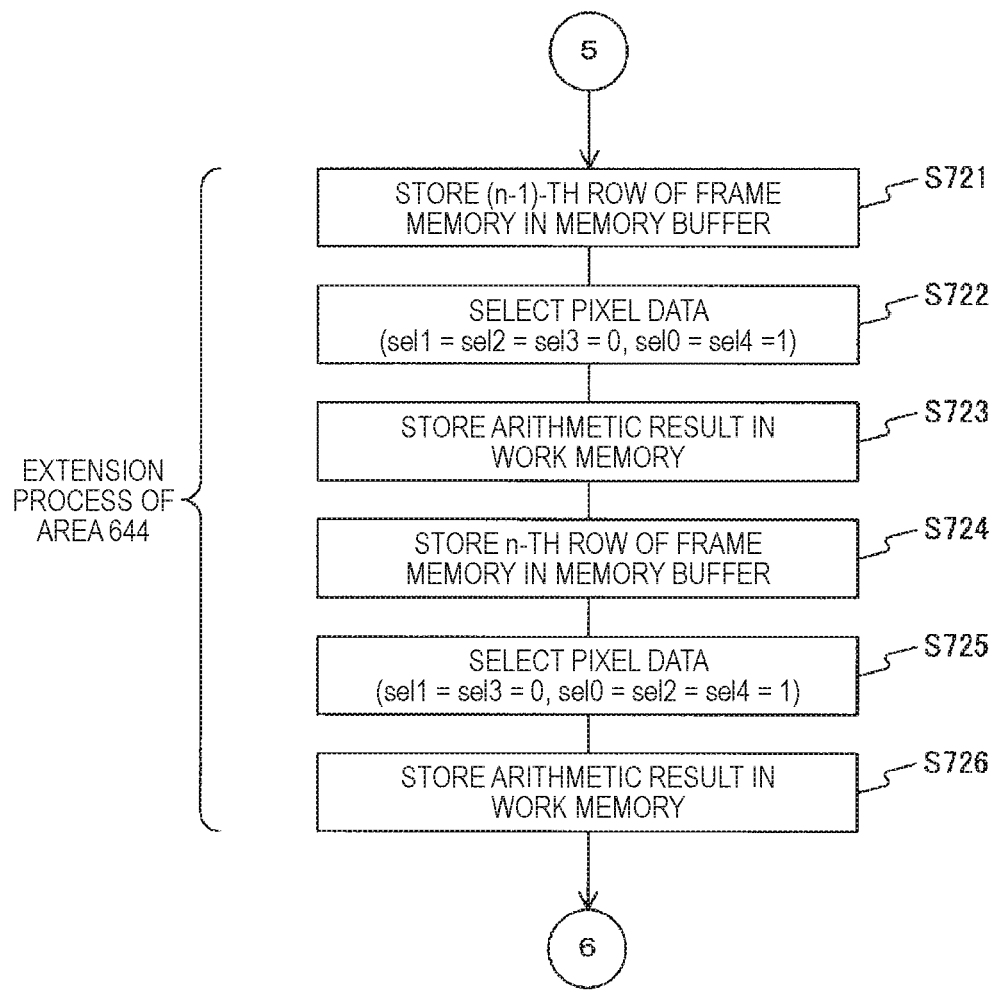
FIG. 41 is a flowchart illustrating an example of a process procedure by the inter-frame arithmetic processing unit 200 according to the fourth embodiment of the present technology.
Figure 42:
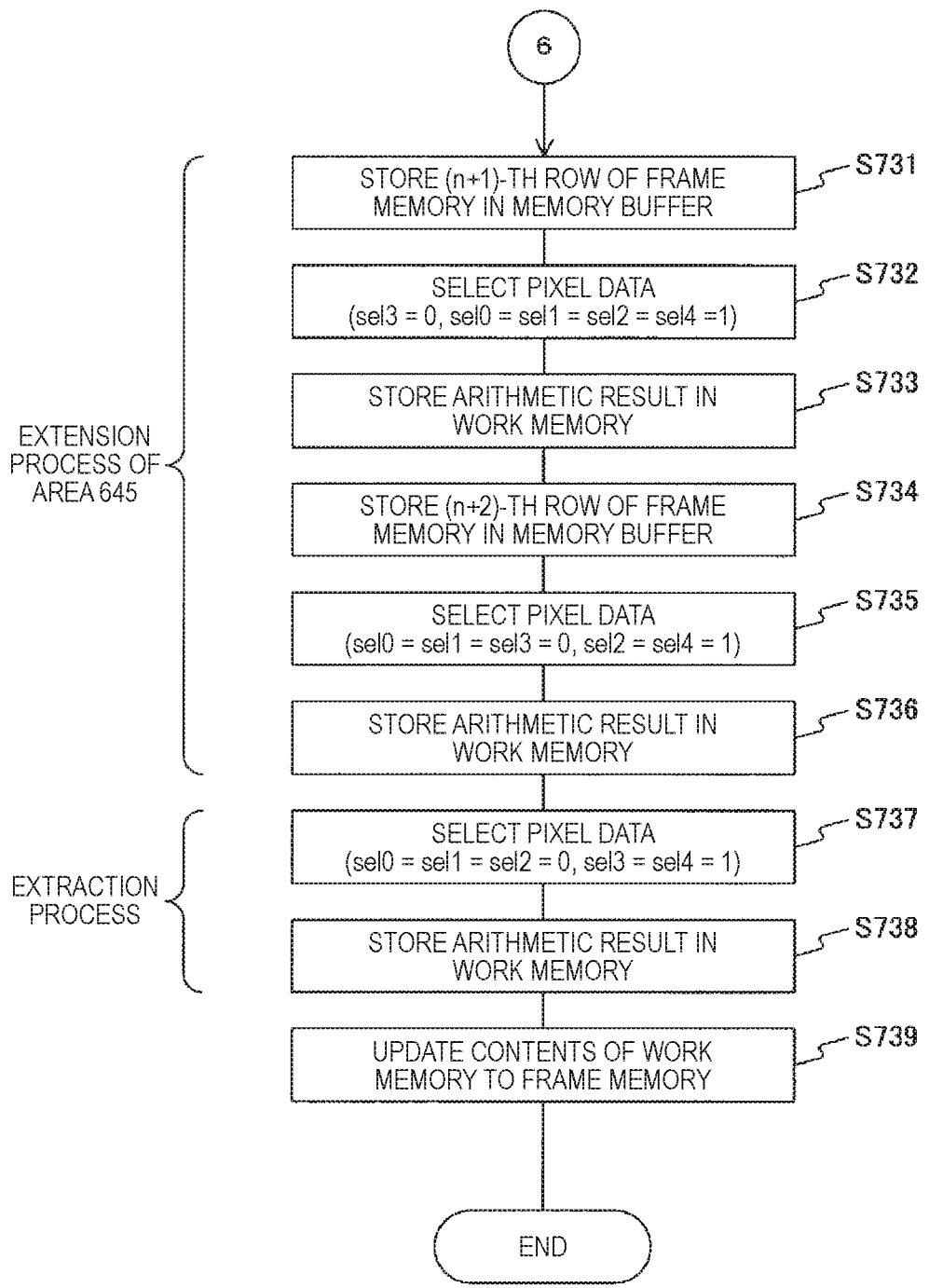
FIG. 42 is a flowchart illustrating an example of a process procedure by the inter-frame arithmetic processing unit 200 according to the fourth embodiment of the present technology.

FIGS. 40 to 42 are flowcharts illustrating a process procedure example by the inter-frame arithmetic processing unit 200 according to the fourth embodiment of the present technology. In this example, in order to perform a process of an n-th row of the current frame, the extension process is performed with reference to the past frame in an order of the three arithmetic areas 643 to 645. In addition, the extraction process is performed using the extended area obtained by the extension process. In the process of the n-th row of such a current frame, the process is performed in parallel on each column at the same time.

First, processes of the following steps S711 to S719 are performed on the arithmetic area 643 offset from the center pixel 641 leftward and downward by one pixel. First, pixel data of the (n−2)-th row of the frame memory 160 is read and stored in the memory buffer 210 (step S711). In addition, each of sel0="0", sel1="1", sel2="0", sel3="0", and sel4="0" is supplied as the selection signals (step S712). Therefore, pixel data of an m-th column of the (n−2)-th row is selected. The arithmetic result by the arithmetic unit 230 is stored in the work memory 240 (step S713).

Next, pixel data of the (n−1)-th row of the frame memory 160 is read and stored in the memory buffer 210 (step S714). In addition, each of sel0="0", sel1="1", sel2="1", sel3="0", and sel4="1" is supplied as the selection signals (step S715). Therefore, pixel data of an (m−1)-th column and an m-th column of the (n−1)-th row are selected. In addition, the content stored in an immediately preceding work memory 240 is also selected, and the OR operation by the OR circuit 231 is performed. The arithmetic result by the arithmetic unit 230 is stored in the work memory 240 (step S716).

Next, pixel data of the n-th row of the frame memory 160 is read and stored in the memory buffer 210 (step S717). In addition, each of sel0="1", sel1="1", sel2="1", sel3="0", and sel4="1" is supplied as the selection signals (step S718). Therefore, pixel data of an (m−2)-th column, an (m−1)-th column, and an m-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S719).

Next, processes of the following steps S721 to S726 are performed on the arithmetic area 644 offset from the center pixel 641 rightward by two pixels and downward by one pixel. First, pixel data of the (n−1)-th row of the frame memory 160 is read and stored in the memory buffer 210 (step S721). In addition, each of sel0="1", sel1="0", sel2="0", sel3="0", and sel4="1" is supplied as the selection signals (step S722). Therefore, pixel data of an (m+1)-th column of the (n−1)-th row is selected. In addition, the content stored in an immediately preceding work memory 240 is also selected, and the OR operation by the OR circuit 231 is performed. The arithmetic result by the arithmetic unit 230 is stored in the work memory 240 (step S723).

Next, pixel data of the n-th row of the frame memory 160 is read and stored in the memory buffer 210 (step S724). In addition, each of sel0="1", sel1="0", sel2="1", sel3="0", and sel4="1" is supplied as the selection signals (step S725). Therefore, pixel data of an (m+1)-th column and an (m+2)-th column of the n-th row are selected. In addition, the content stored in an immediately preceding work memory 240 is also selected, and the OR operation by the OR circuit 231 is performed. The arithmetic result by the arithmetic unit 230 is stored in the work memory 240 (step S726).

Next, processes of the following steps S731 to S736 are performed on the arithmetic area 645 offset from the center pixel 641 upward by two pixels. First, pixel data of the (n+1)-th row of the frame memory 160 is read and stored in the memory buffer 210 (step S731). In addition, each of sel0="1", sel1="1", sel2="1", sel3="0", and sel4="1" is supplied as the selection signals (step S732). Therefore, pixel data of an (m−1)-th column, an m-th column, and an (m+1)-th column of the (n+1)-th row are selected. The arithmetic result by the arithmetic unit 230 is stored in the work memory 240 (step S733).

Next, pixel data of the (n+2)-th row of the frame memory 160 is read and stored in the memory buffer 210 (step S734). In addition, each of sel0="0", sel1="0", sel2="1", sel3="0", and sel4="1" is supplied as the selection signals (step S735). Therefore, pixel data of an m-th column of the (n+2)-th row is selected. The arithmetic result by the arithmetic unit 230 is stored in the work memory 240 (step S736).

The process up to this point corresponds to the extension process. Hereinafter, the extraction process is performed. Each of sel0="0", sel1="0", sel2="0", sel3="1", and sel4="1" is supplied as the selection signals (step S737). Therefore, the AND operation between the pixel data of the current frame and the extended area is performed by the AND circuit 233. The arithmetic result by the arithmetic unit 230 is stored in the work memory 240 (step S738).

Therefore, since the process for the n-th row of the current frame is completed, the contents of the work memory 240 are updated to the frame memory 160 (step S739). In this manner, the process for each row of the current frame is repeated.

<7. Example of Application>

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 43:
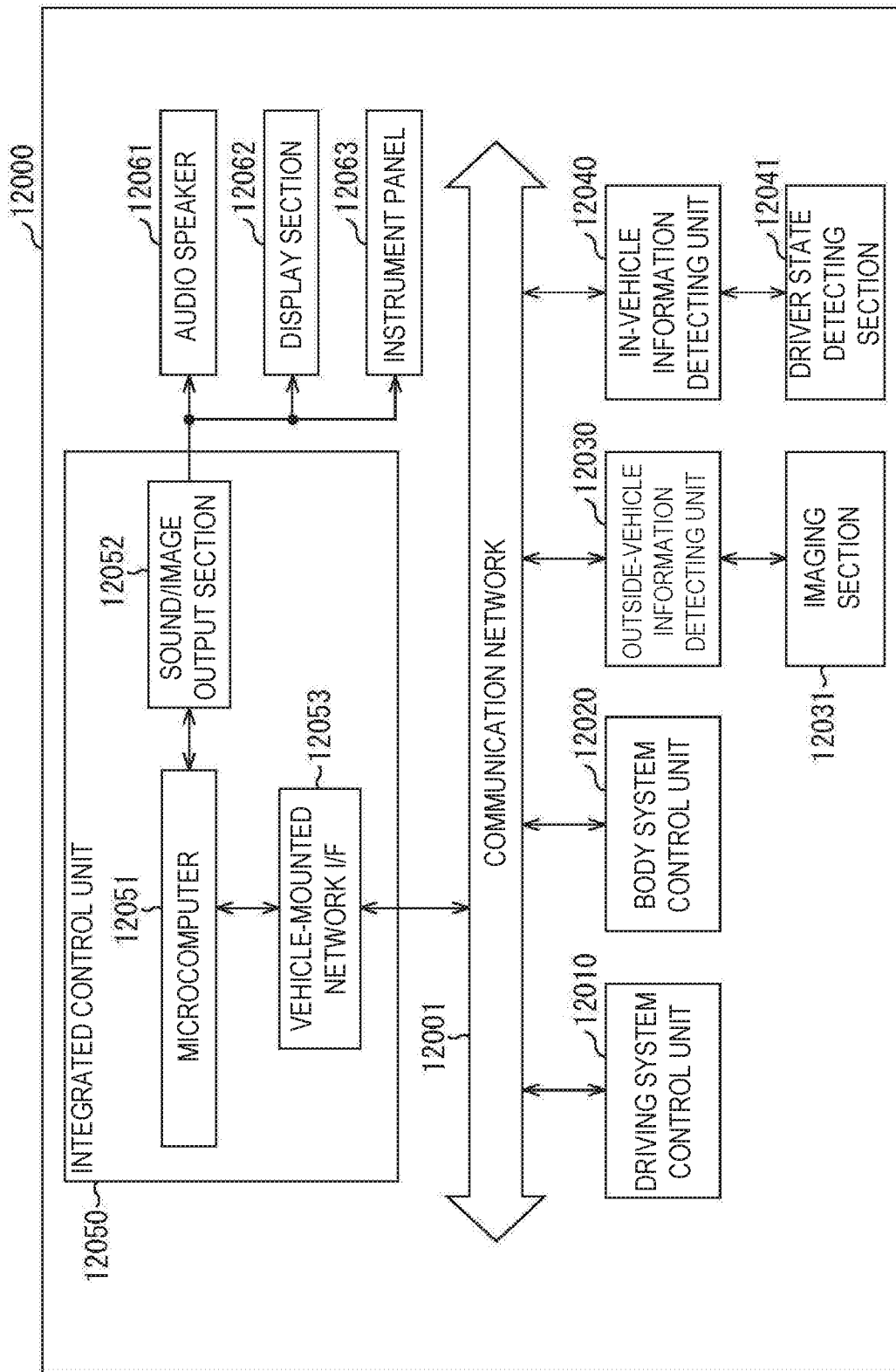
FIG. 43 is a block diagram depicting an example of schematic configuration of a vehicle control system.

FIG. 43 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 43, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 43, an audio speaker 12061, a display section 12062, and an instrument panel 12063 are illustrated as the output device. The display section 12062 may, for example, include at least one of an on-board display and a head-up display.

Figure 44:
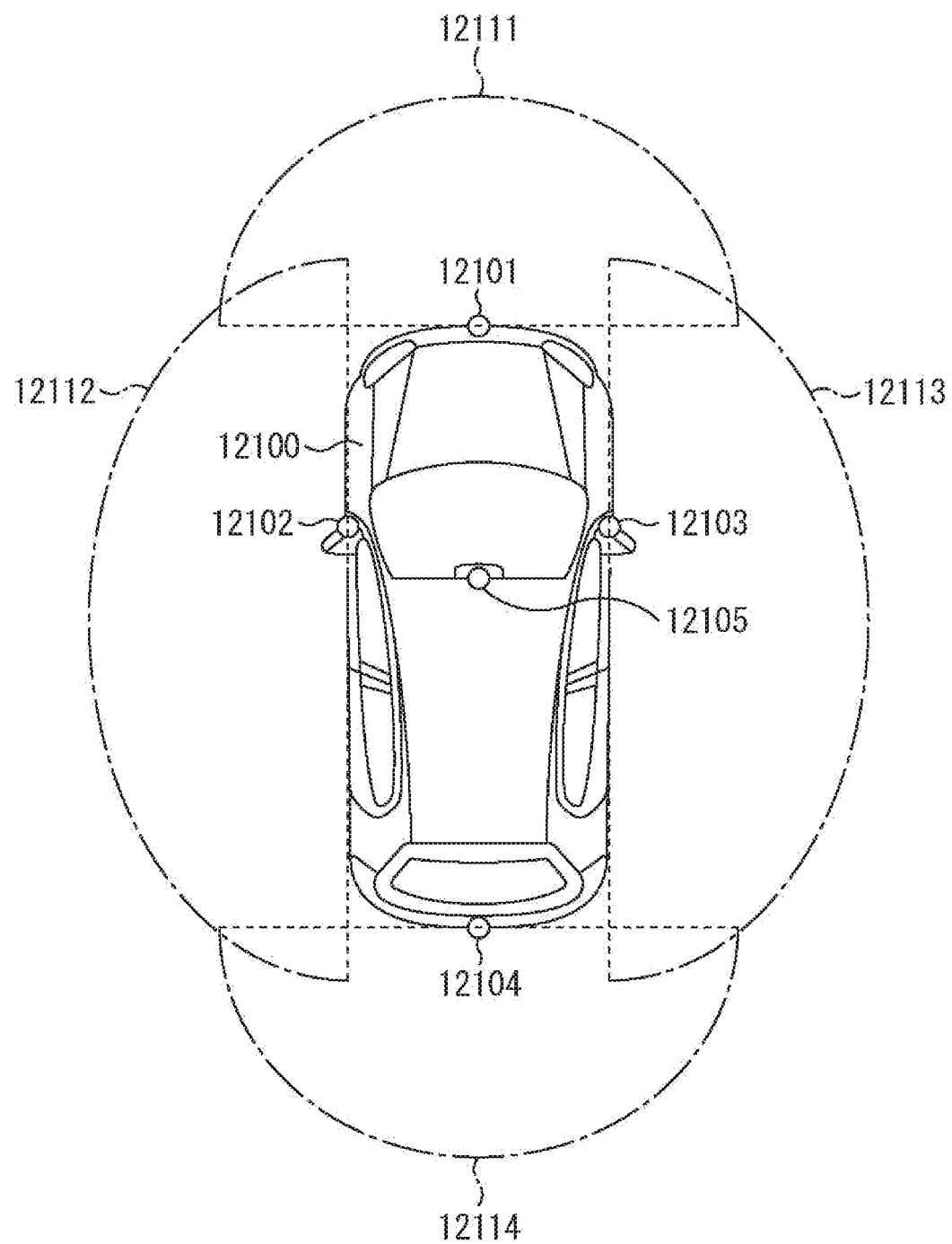
FIG. 44 is a diagram of assistance in explaining an example of installation positions of an imaging section.

FIG. 44 is a diagram depicting an example of the installation position of the imaging section 12031.

In FIG. 44, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 44 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 in the above-described configuration. Specifically, it is possible to realize the above-described automatic driving or driving support by performing the tracking arithmetic for tracking the object with respect to the pixel data imaged by the imaging section 12031.

As described above, according to the embodiment of the present technology, the two-dimensional pixel data obtained in the pixel array unit 110 are processed in column parallel of each row in the inter-frame arithmetic processing unit 200. Therefore, it is possible to reduce hardware scale.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)
An arithmetic device including:
a frame memory that stores pixel data of a frame that transitions in time sequence; and
an inter-frame arithmetic processing unit that implements a predetermined arithmetic by column parallel in a row unit on the pixel data of a current frame and the pixel data of a past frame stored in the frame memory and updates the pixel data of the past frame stored in the frame memory on the basis of a result of the predetermined arithmetic.

(2)
The arithmetic device according to (1), in which the pixel data is binary data indicating any of presence or absence of an object, and
the predetermined arithmetic is a tracking arithmetic for tracking the object.

(3)
The arithmetic device according to (1) or (2), in which the inter-frame arithmetic processing unit updates the pixel data of the current frame to the frame memory as the pixel data of the past frame in an area where an extension process is implemented on the pixel data of the past frame.

(4)
The arithmetic device according to (3), in which the inter-frame arithmetic processing unit includes, for each of the pixel data of the row unit,
an OR circuit that generates an area extended to a periphery of an area where the pixel data of the past frame indicates presence of the object, and
an AND circuit that generates a logical product of the extended area and the pixel data of the current frame as new pixel data of the past frame.

(5)
The arithmetic device according to (4), in which the OR circuit refers to the pixel data of an adjacent row in order to generate the extended area.

(6)
The arithmetic device according to (4), in which the OR circuit simultaneously refers to p pixel data of a past frame stored in the frame memory in order to generate the extended area for an area of p pixels×p pixels (p is an odd number equal to or greater than 3) in the frame.

(7)
The arithmetic device according to (4), in which the OR circuit simultaneously refers to q (q is an odd number less than p) pixel data of a past frame stored in the frame memory in order to generate the extended area for an area of p pixels×p pixels (p is an odd number equal to or greater than 3) in the frame.

(8)
The arithmetic device according to (4), in which the inter-frame arithmetic processing unit further includes a selector that selects necessary pixel data among the pixel data of the row unit, and
the OR circuit generates an area extended to a periphery of an area where the pixel data selected by the selector indicates the presence of the object.

(9)
The arithmetic device according to (8), in which the selector bilaterally-symmetrically determines presence or absence of a selection when selecting the necessary pixel data.

(10)
The arithmetic device according to (8), in which the selector bilaterally-asymmetrically determines presence or absence of a selection when selecting the necessary pixel data.

(11)
A sensor including:
a pixel array unit that captures an image and generates pixel data of a frame that transits in time sequence;
a frame memory that stores the pixel data of the frame; and
an inter-frame arithmetic processing unit that implements a predetermined arithmetic by column parallel in a row unit on the pixel data of a current frame and the pixel data of a past frame stored in the frame memory in the frame and updates the pixel data of the past frame stored in the frame memory on the basis of a result of the predetermined arithmetic.

REFERENCE SIGNS LIST

100 vision sensor
110 pixel array unit
120 analog-to-digital conversion unit
130 pixel data memory
140 binarization processing unit
160 frame memory 170 parallel-to-serial conversion unit
180 signal processing unit
190 control unit
200 inter-frame arithmetic processing unit
210 memory buffer
221 to 225 selector
230 arithmetic unit
231 OR circuit
232 selector
233 AND circuit
240 work memory
251 selector
12031 imaging section

What is claimed is:

1. An arithmetic device, comprising:
a frame memory configured to store pixel data of a frame that transitions in time sequence; and
an inter-frame arithmetic processing unit configured to:
implement a determined arithmetic by column parallel in a row unit on the pixel data of a current frame and the pixel data of a past frame stored in the frame memory;
update the pixel data of the past frame stored in the frame memory based on a result of the determined arithmetic; and
update the pixel data of the current frame to the frame memory as the pixel data of the past frame in an area where an extension process is implemented on the pixel data of the past frame,
wherein, for each of the pixel data of the row unit, the inter-frame arithmetic processing unit includes:
an OR circuit configured to generate an area extended to a periphery of an area where the pixel data of the past frame indicates presence of an object, wherein
the OR circuit is configured to simultaneously refer to p pixel data of the past frame stored in the frame memory in order to generate the extended area for an area of p pixels×p pixels in the frame, and
p is an odd number equal to or greater than 3; and
an AND circuit configured to generate a logical product of the extended area and the pixel data of the current frame as new pixel data of the past frame.

2. The arithmetic device according to claim 1, wherein
the pixel data is binary data indicating any of the presence of the object or an absence of the object, and
the determined arithmetic is a tracking arithmetic to track the object.

3. The arithmetic device according to claim 1, wherein the OR circuit is further configured to refer to the pixel data of an adjacent row in order to generate the extended area.

4. The arithmetic device according to claim 1, wherein
the inter-frame arithmetic processing unit further includes a selector configured to select necessary pixel data among the pixel data of the row unit, and
the OR circuit is further configured to generate the area extended to the periphery of the area where the pixel data selected by the selector indicates the presence of the object.

5. The arithmetic device according to claim 4, wherein the selector is further configured to bilaterally-symmetrically determine presence or absence of a selection based on selection of the necessary pixel data.

6. The arithmetic device according to claim 4, wherein the selector is further configured to bilaterally-asymmetrically determine presence or absence of a selection based on selection of the necessary pixel data.

7. A sensor, comprising:
a pixel array unit configured to:
capture an image; and
generate pixel data of a frame that transits in time sequence;
a frame memory configured to store the pixel data of the frame; and
an inter-frame arithmetic processing unit configured to:
implement a determined arithmetic by column parallel in a row unit on the pixel data of a current frame and the pixel data of a past frame stored in the frame memory;
update the pixel data of the past frame stored in the frame memory based on a result of the determined arithmetic; and
update the pixel data of the current frame to the frame memory as the pixel data of the past frame in an area where an extension process is implemented on the pixel data of the past frame,
wherein, for each of the pixel data of the row unit, the inter-frame arithmetic processing unit includes:
an OR circuit configured to generate an area extended to a periphery of an area where the pixel data of the past frame indicates presence of an object, wherein
the OR circuit is configured to simultaneously refer to p pixel data of the past frame stored in the frame memory in order to generate the extended area for an area of p pixels×p pixels in the frame, and
p is an odd number equal to or greater than 3; and
an AND circuit configured to generate a logical product of the extended area and the pixel data of the current frame as new pixel data of the past frame.

8. An arithmetic device, comprising:
a frame memory configured to store pixel data of a frame that transitions in time sequence; and
an inter-frame arithmetic processing unit configured to:
implement a determined arithmetic by column parallel in a row unit on the pixel data of a current frame and the pixel data of a past frame stored in the frame memory;
update the pixel data of the past frame stored in the frame memory based on a result of the determined arithmetic; and
update the pixel data of the current frame to the frame memory as the pixel data of the past frame in an area where an extension process is implemented on the pixel data of the past frame,
wherein, for each of the pixel data of the row unit, the inter-frame arithmetic processing unit includes:
an OR circuit configured to generate an area extended to a periphery of an area where the pixel data of the past frame indicates presence of an object, wherein
the OR circuit is configured to simultaneously refer to q pixel data of the past frame stored in the frame memory in order to generate the extended area for an area of p pixels×p pixels in the frame,
p is an odd number equal to or greater than 3, and
q is an odd number less than p; and
an AND circuit configured to generate a logical product of the extended area and the pixel data of the current frame as new pixel data of the past frame.

9. An arithmetic device, comprising:
a frame memory configured to store pixel data of a frame that transitions in time sequence; and
an inter-frame arithmetic processing unit configured to:
- implement a determined arithmetic by column parallel in a row unit on the pixel data of a current frame and the pixel data of a past frame stored in the frame memory;
- update the pixel data of the past frame stored in the frame memory based on a result of the determined arithmetic; and
- update the pixel data of the current frame to the frame memory as the pixel data of the past frame in an area where an extension process is implemented on the pixel data of the past frame,
- wherein, for each of the pixel data of the row unit, the inter-frame arithmetic processing unit includes:
  - an OR circuit configured to generate an area extended to a periphery of an area where the pixel data of the past frame indicates presence of an object;
  - an AND circuit configured to generate a logical product of the extended area and the pixel data of the current frame as new pixel data of the past frame; and
  - a selector configured to:
    - select necessary pixel data among the pixel data of the row unit; and
    - bilaterally-symmetrically determine presence or absence of a selection based on selection of the necessary pixel data,
  - wherein the OR circuit is further configured to generate the area extended to the periphery of the area where the pixel data selected by the selector indicates the presence of the object.

10. An arithmetic device, comprising:
a frame memory configured to store pixel data of a frame that transitions in time sequence; and
an inter-frame arithmetic processing unit configured to:
- implement a determined arithmetic by column parallel in a row unit on the pixel data of a current frame and the pixel data of a past frame stored in the frame memory;
- update the pixel data of the past frame stored in the frame memory based on a result of the determined arithmetic; and
- update the pixel data of the current frame to the frame memory as the pixel data of the past frame in an area where an extension process is implemented on the pixel data of the past frame,
- wherein, for each of the pixel data of the row unit, the inter-frame arithmetic processing unit includes:
  - an OR circuit configured to generate an area extended to a periphery of an area where the pixel data of the past frame indicates presence of an object;
  - an AND circuit configured to generate a logical product of the extended area and the pixel data of the current frame as new pixel data of the past frame; and
  - a selector configured to:
    - select necessary pixel data among the pixel data of the row unit; and
    - bilaterally-asymmetrically determine presence or absence of a selection based on selection of the necessary pixel data,
  - wherein the OR circuit is further configured to generate the area extended to the periphery of the area where the pixel data selected by the selector indicates the presence of the object.

* * * * *